(12) United States Patent
Genter

(10) Patent No.: US 7,703,431 B2
(45) Date of Patent: Apr. 27, 2010

(54) CONNECTING ROD APPARATUS AND METHOD

(75) Inventor: David P. Genter, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 1255 days.

(21) Appl. No.: 10/521,123

(22) PCT Filed: Jul. 28, 2003

(86) PCT No.: PCT/US03/23542

§ 371 (c)(1),
(2), (4) Date: Sep. 19, 2005

(87) PCT Pub. No.: WO2004/011792

PCT Pub. Date: Feb. 5, 2004

(65) Prior Publication Data

US 2006/0081211 A1 Apr. 20, 2006

Related U.S. Application Data

(60) Provisional application No. 60/398,707, filed on Jul. 26, 2002.

(51) Int. Cl.
B22D 19/02 (2006.01)
(52) U.S. Cl. .................................. 123/197.3; 74/579
(58) Field of Classification Search .............. 123/197.3, 123/197.4; 74/579
See application file for complete search history.

(56) References Cited

U.S. PATENT DOCUMENTS

| 2,145,864 | A | 2/1939 | Denneen et al. |
|---|---|---|---|
| 3,361,007 | A | 1/1968 | Belsanti et al. |
| 3,818,577 | A | 6/1974 | Bailey et al. |
| 3,978,566 | A | 9/1976 | Ladin |
| 4,422,348 | A | 12/1983 | Campbell |
| 4,458,555 | A | 7/1984 | Holtzberg et al. |
| 4,688,446 | A | 8/1987 | Iahikawa |
| 4,836,044 | A | 6/1989 | Lobig |

(Continued)

FOREIGN PATENT DOCUMENTS

DE 3904020 A1 2/1989

(Continued)

OTHER PUBLICATIONS

Official Action issued by the Japanese Patent Office Jun. 15, 2009 in related application No. JP 2004-524951.

(Continued)

*Primary Examiner*—M. McMahon
(74) *Attorney, Agent, or Firm*—Hamre, Schumann, Mueller & Larson, P.C.; J. Bruce Schelkopf

(57) ABSTRACT

An improved two-piece connecting rod (800) that connects a reciprocating piston with a crankshaft in an internal combustion engine. The connecting rod (800) has a shank portion (810, 860), a cap portion (820, 870) and projections (830, 880, 882) extending from one or both of the shank (810, 860) and cap portions (820, 870). When the shank (810, 860) and the cap (820, 870) are connected, the projections (830, 880, 882) mate with the opposite side with an interference fit, thereby resisting relative motion between the shank (810, 860) and the cap (820, 870) along the split-line (A').

26 Claims, 46 Drawing Sheets

U.S. PATENT DOCUMENTS

| | | | |
|---|---|---|---|
| 4,860,419 A | 8/1989 | Hekman | |
| 4,884,900 A | 12/1989 | Pirault et al. | |
| 4,936,163 A | 6/1990 | Hoag et al. | |
| 4,970,783 A | 11/1990 | Olaniran et al. | |
| 4,993,134 A | 2/1991 | Hoag et al. | |
| 5,109,605 A | 5/1992 | Hoag et al. | |
| 5,131,577 A | 7/1992 | Hoag et al. | |
| 5,135,587 A | 8/1992 | Olaniran et al. | |
| 5,243,878 A * | 9/1993 | Santi | 74/579 R |
| 5,507,093 A | 4/1996 | Wittenstein et al. | |
| 5,524,507 A | 6/1996 | Olmr et al. | |
| 5,722,036 A | 2/1998 | Shikata et al. | |
| 5,758,550 A | 6/1998 | Lenczyk | |
| 5,799,565 A | 9/1998 | Bo | |
| 5,826,331 A | 10/1998 | Myers et al. | |
| 6,027,784 A | 2/2000 | Taguchi | |
| 6,257,768 B1 | 7/2001 | Martin | |
| 6,431,759 B1 | 8/2002 | Luchner et al. | |
| 6,435,723 B1 | 8/2002 | Wolf et al. | |
| 2002/0148434 A1 | 10/2002 | Iida et al. | |

FOREIGN PATENT DOCUMENTS

| | | |
|---|---|---|
| EP | 0 696 688 A1 | 2/1996 |
| GB | 2 133 329 A | 7/1984 |
| JP | 59-77118 A | 5/1984 |
| JP | 60-8522 | 1/1985 |
| JP | 2-116016 U | 9/1990 |
| JP | 5-178259 A | 7/1993 |
| JP | H06042525 A | 2/1994 |
| JP | 2000-127987 A | 5/2000 |
| JP | 2000-199515 A | 7/2000 |

OTHER PUBLICATIONS

Search report for Great Britain application No. GB0609186.2. Date of search: Jun. 28, 2006; 1 page.

Office Action issued Dec. 1, 2009 by the Japanese Patent Office in co-pending application No. JP 2004-524951.

* cited by examiner

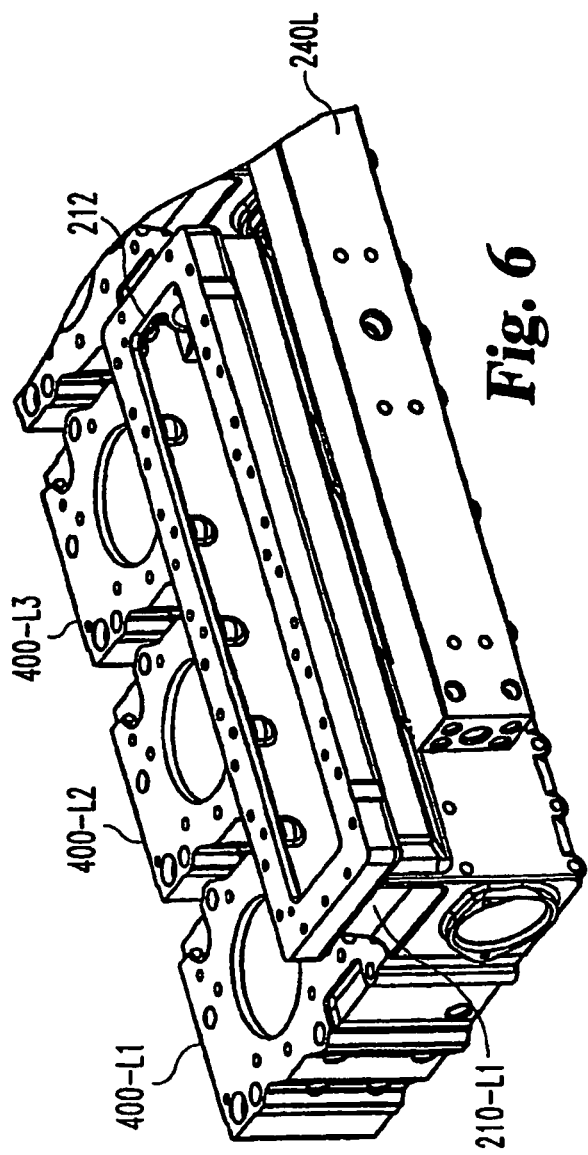
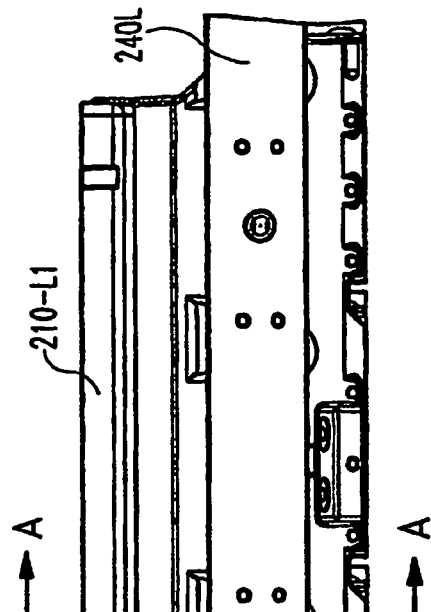
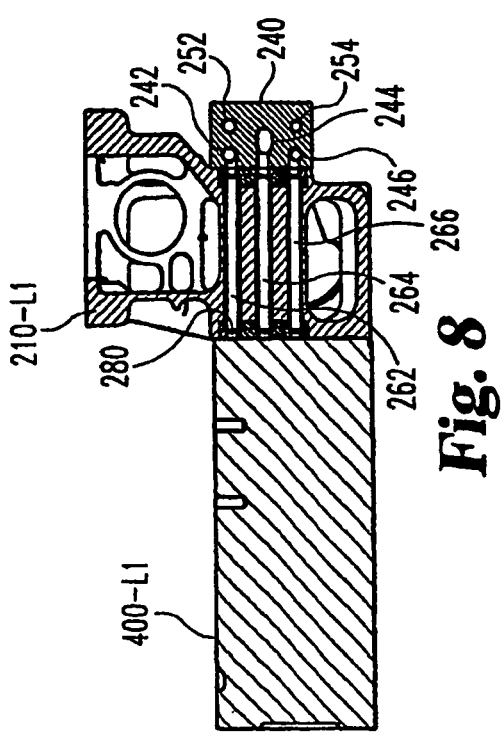
Fig. 6
Fig. 7
Fig. 8

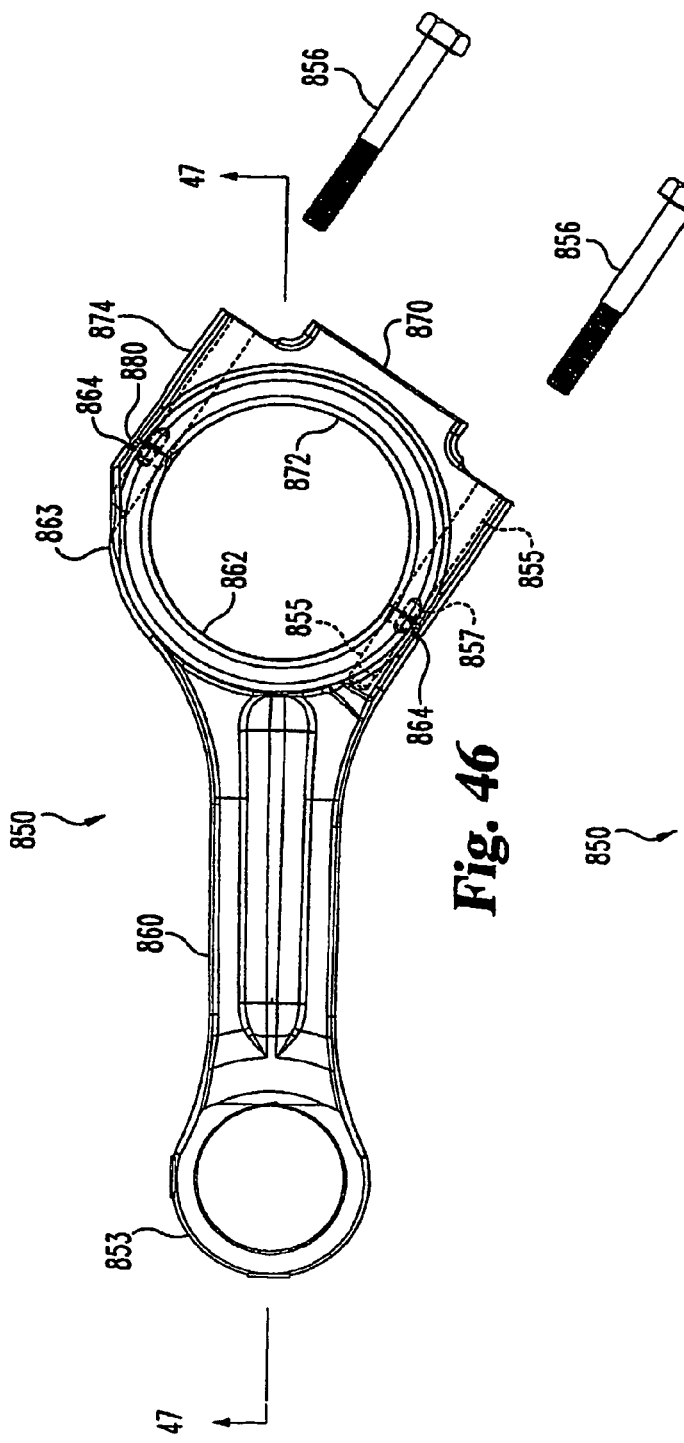
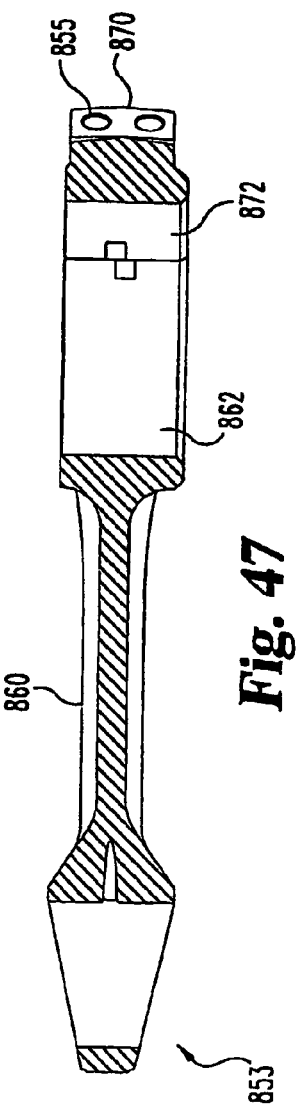
Fig. 46
Fig. 47

CONNECTING ROD APPARATUS AND METHOD

CROSS-REFERENCE TO RELATED APPLICATIONS

The present application is the national stage of International Patent Application PCT/US03/023542, filed Jul. 28, 2003 (published in English and designating the United States), which claims the benefit of U.S. Provisional Application No. 60/398,707, filed Jul. 26, 2002, all of which are hereby incorporated by reference.

This application claims the benefit of priority to U.S. provisional patent application Ser. No. 60/398,707, filed Jul. 26, 2002, which is incorporated herein by reference.

FIELD OF THE INVENTION

The present invention relates to various improvements for internal combustion engines, and in particular for an improved rod for connecting a reciprocating piston to a crankshaft.

BACKGROUND OF THE INVENTION

This invention relates to connecting rods that connect a crankshaft and a piston in an internal combustion engine, including internal combustion engines powering an electric generator. However, certain applications for the present invention may be outside of this field.

In engines utilizing one-piece connecting rods, installation or replacement of the connecting rods is difficult and typically requires removal of the crankshaft. Utilizing two-piece, or split, connecting rods typically alleviates this difficulty and allows the rod to be installed or replaced without removing the crankshaft. However, stresses imposed on the connecting rod may cause movement between the two pieces. This movement between the two pieces of the connecting rod, although potentially very slight, results in accelerated wear and deterioration of the connecting rod and/or the crankshaft.

There is a need for an improved two-piece connecting rod that connects a crankshaft and piston of an internal combustion engine and that resists relative motion between the two pieces.

SUMMARY OF THE INVENTION

One aspect of the present invention provides an improved apparatus and method for resisting the relative motion between the two pieces of a split connecting rod that connects a piston to a crankshaft in an internal combustion engine. The connecting rod includes a shank portion and a cap portion, and one or more projections that resist the relative motion between the shank and the cap along the split-line.

One object is to provide an improved split connecting rod for an internal combustion engine.

Related objects of the present invention will be apparent from the description of the preferred embodiment.

DESCRIPTION OF THE DRAWINGS

FIG. 6 is a perspective drawing of a portion of a fuel manifold, air intake manifold, and cylinder heads.

FIG. 7 is a side view of the apparatus of FIG. 6.

FIG. 8 is a cross sectional view of the apparatus of FIG. 7 as taken along line A-A of FIG. 7.

FIG. 46 is a plan view of a two-piece connecting rod according to another embodiment of the present invention.

FIG. 47 is a cross sectional view of the rod of FIG. 46 as taken along line 47-47 of FIG. 46.

DESCRIPTION OF THE PREFERRED EMBODIMENT

For the purposes of promoting an understanding of the principles of the invention, reference will now be made to the embodiments and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

The present invention relates to multiple improvements in various aspects related to internal combustion engines. As one example, these improvements also relate to a diesel engine used to power an electric generator. However, the present invention is not so limited, and for example also contemplates other internal combustion engines, including spark-ignition engines powered by natural gas or gasoline. Further, the invention relates to internal combustion engines powering loads other than an electric generator, including loads such as a pump or the propeller of a ship. Further, the present invention also relates to internal combustion engines used in vehicles such as trucks, buses, and automobiles.

Figure 1:
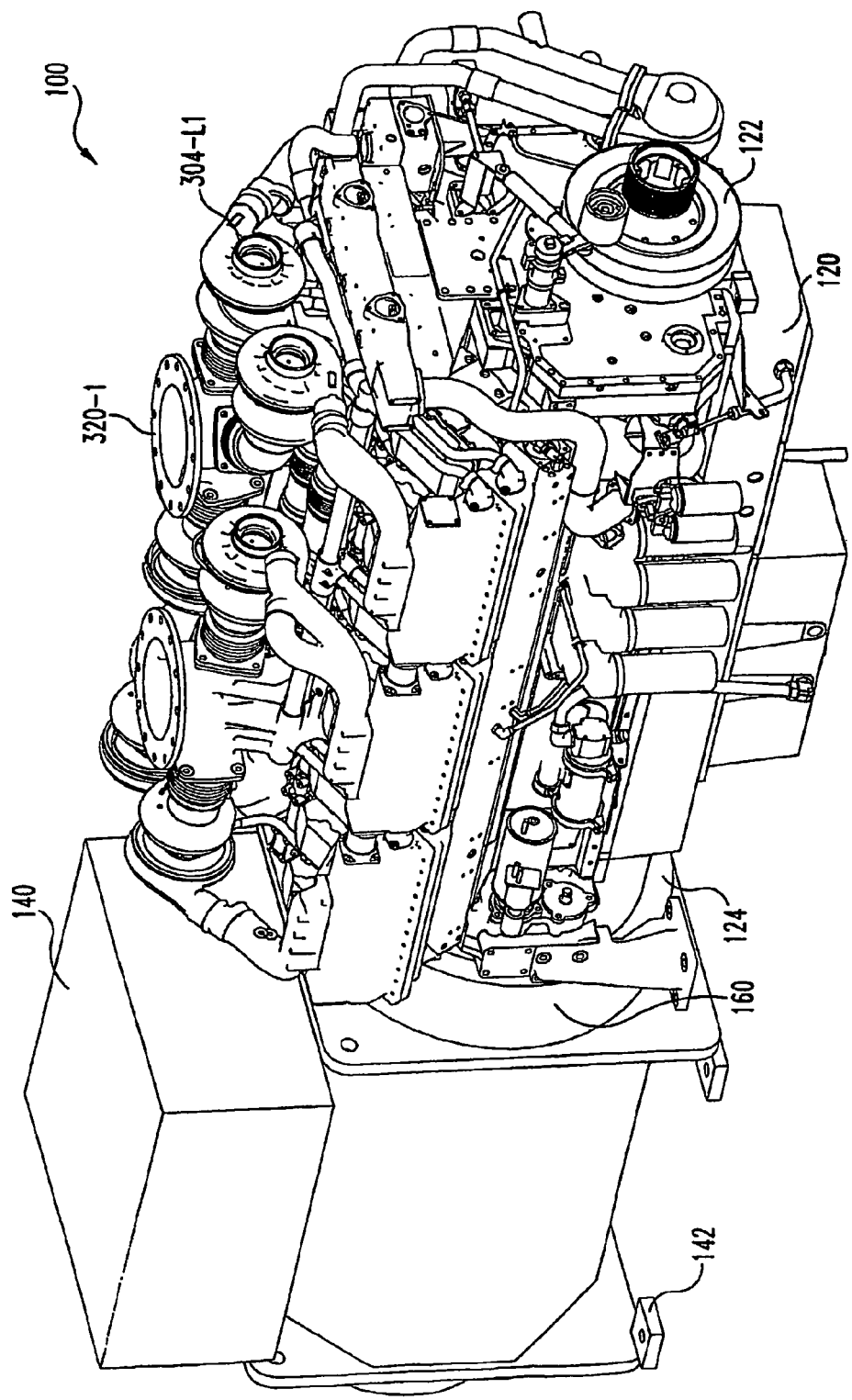
FIG. 1 is a front, right, and top perspective drawing of a generator set according to one embodiment of the present invention.
Figure 2:
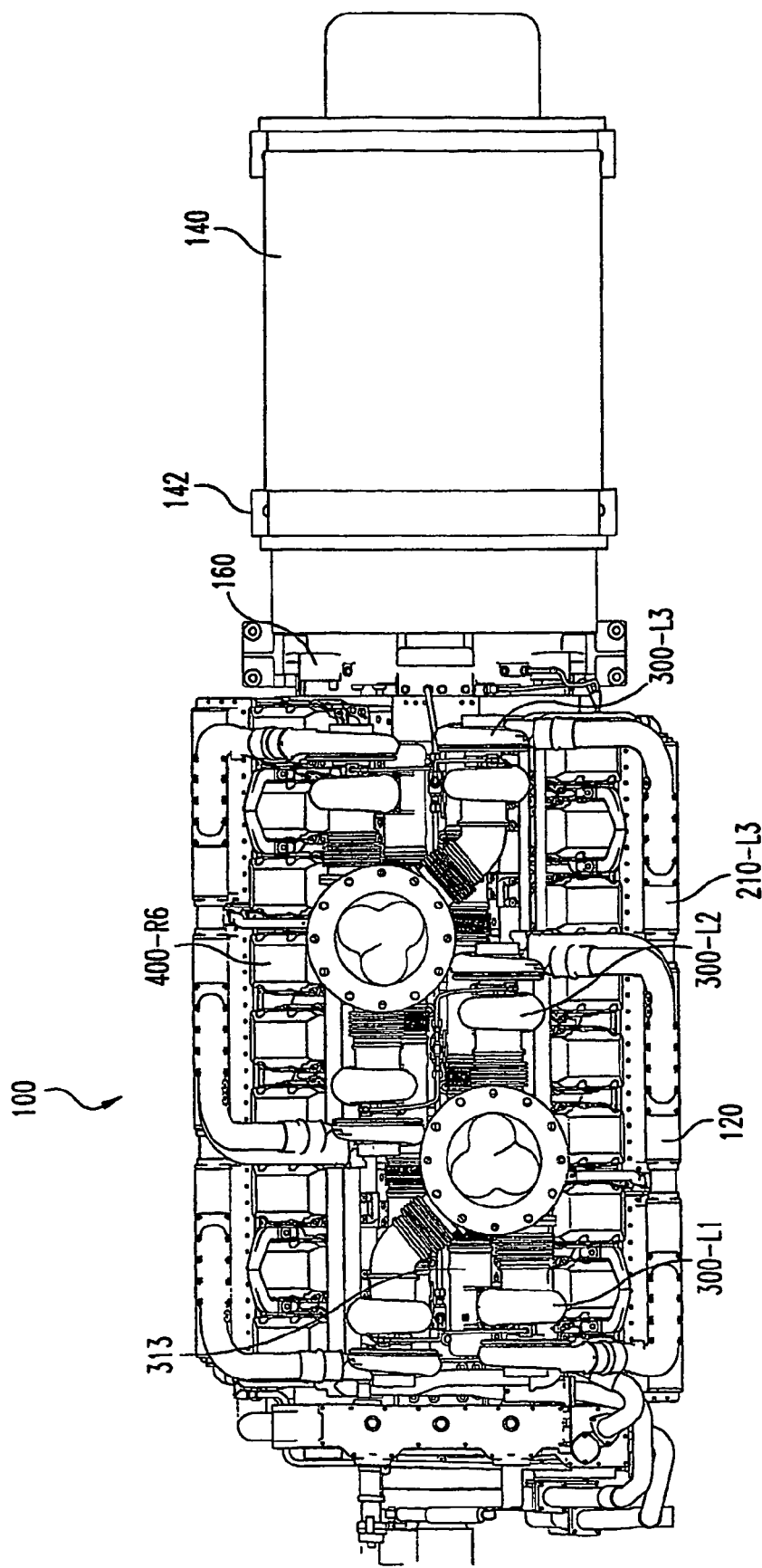
FIG. 2 is a top plan view of the generator set of FIG. 1.
Figure 3:
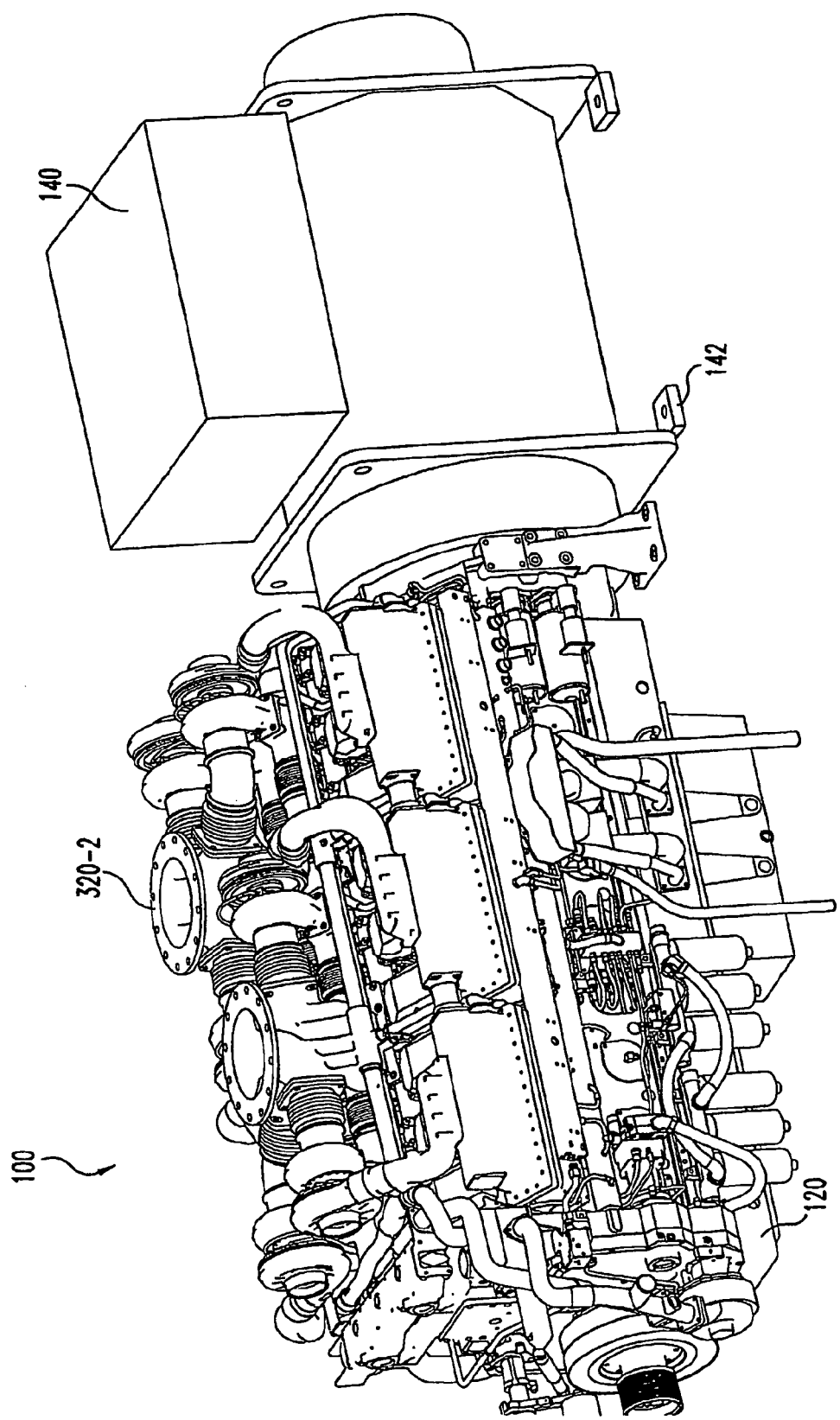
FIG. 3 is a front, left, and top perspective view of the generator set of FIG. 1.

FIG. 1 shows a power generator assembly 100 used in stationary power generating applications, such as hospitals. Generator assembly 100 includes an engine 120 powering an electric generator 140 through a coupling 160. Engine 120 has a front 122 and a rear 124. In one embodiment of the present invention, engine 120 is a Vee-configured diesel engine having 18 cylinders and a total displacement of 78 liters. However, the present invention is not limited to Vee-configuration engines, nor are the inventions limited to engines of a particular displacement. For example, the present invention also relates to natural gas powered spark ignition engines, including a V-12 engine displacing 60 liters and a V-12 displacing 45 liters.

In one embodiment, electric generator 140 is a dual main bearing-type which is supported by a plurality of feet 142. These feet are coupled by fasteners to a skid plate (not shown), which also couples to engine 120. In this application, the generator can produce 2.5 megawatts of electrical power at 60 hertz, or 3 megawatts of power at 50 hertz. In one application, engine 120 is a constant speed engine running at 1800 rpm. A gear reduction system within coupling assembly 160 can be changed to generate either 50 hertz or 60 hertz power.

Figure 4:
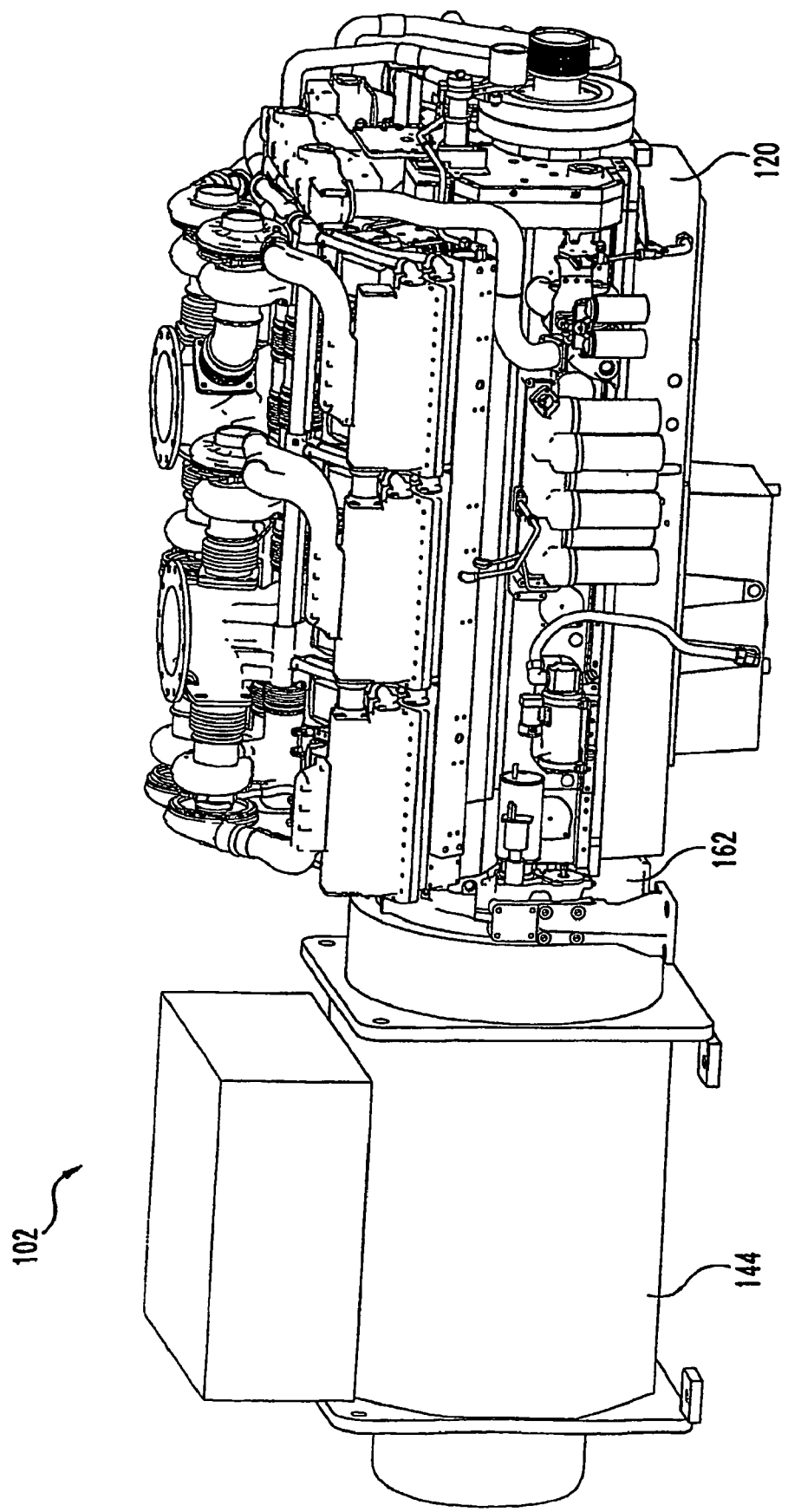
FIG. 4 is a front, right, and top perspective view of a generator set according to another embodiment of the present invention.

FIG. 4 depicts another embodiment of the present invention. Power generator assembly 102 is coupled by a coupling assembly 162 to an electric generator 144. Electric generator 144 is mounted in cantilever fashion from the rear 124 of engine 120, and is a single main bearing-type generator. Generator assembly 102 is used in applications where mobility is preferred, such as construction sites and mining sites, where generator assembly 102 is attached to a truck bed.

Figure 5:
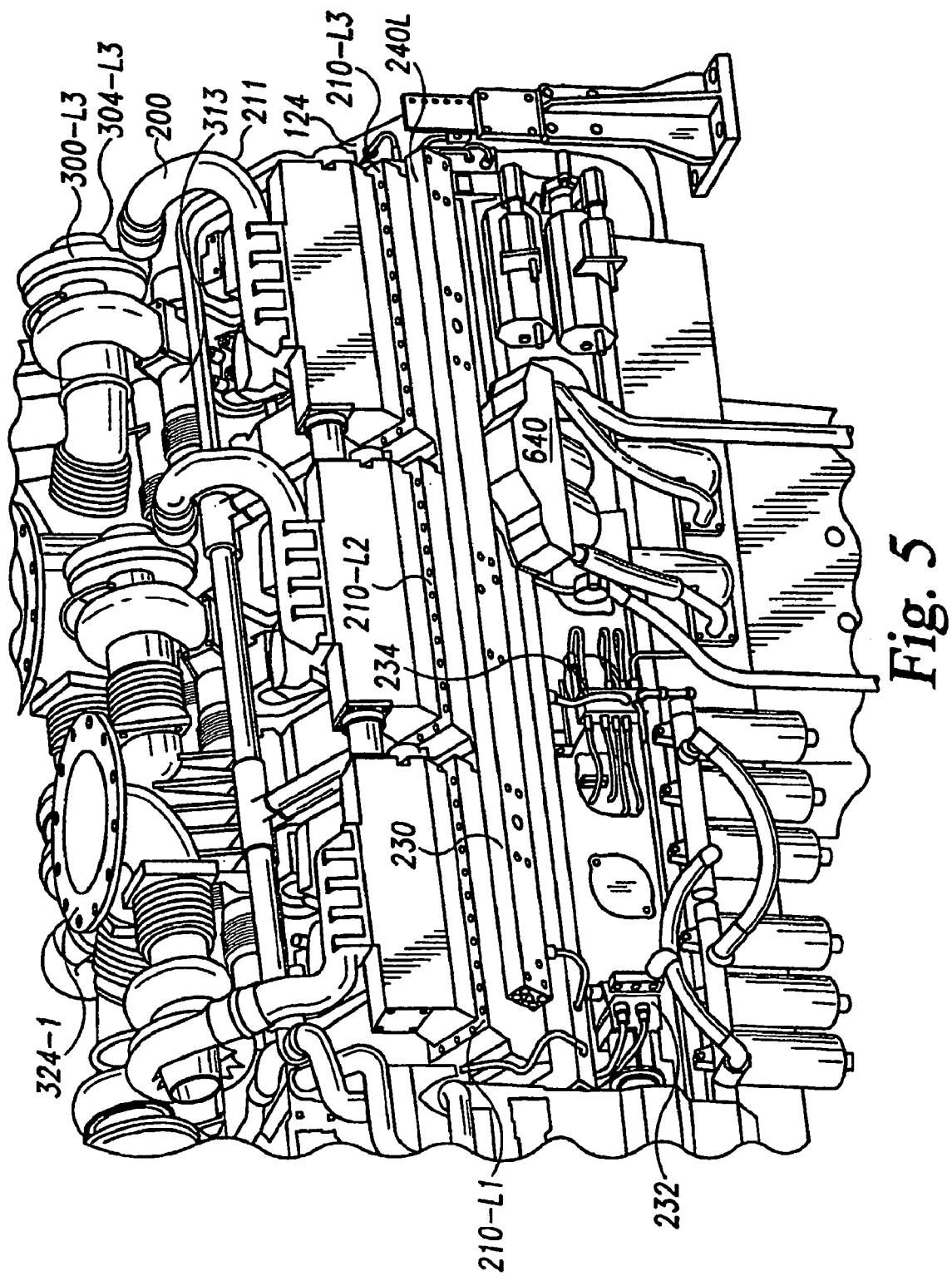
FIG. 5 is a front, left, top perspective view of a portion of engine 120.

FIGS. 5, 6, 7, and 8 depict various views related to the fuel and air manifolds. Engine 120 includes an air intake system 200 which includes one or more turbo charges providing compressed air to a plurality of air intake manifolds 210. Referring to FIG. 5, engine 120 includes three air intake manifolds 210-L1, 210-L2, and 210-L3 on the left side of the engine. (As used herein, the suffix "L" refers to components mounted to the left bank of the V, and "R" refers to components mounted to the right bank of the V. The number following "L" or "R" in the suffix refers to position along that particular bank with number "1" being the forwardmost component.)

Referring to FIG. 5, engine 120 includes an air intake system 200 and a fuel system 230 which provide the combustible air fuel mixture to the engine's cylinder. In one embodiment, air intake system 200 includes a plurality of turbochargers 300 which provide compressed air through a plurality of air supply ducts 211 to a plurality of air intake manifolds 210. FIG. 5 shows the forwardmost air intake manifold on the left side (210-L1), the middle air intake manifold (210-L2), and the rearmost intake manifold on the left side (210-L3). In one embodiment, each of these air intake manifolds provides air to three corresponding cylinder heads 400.

Fuel system 230 includes a fuel pump 232 which provides pressurized fuel to a fuel actuator 234. An electronic controller (not shown) provides various signals to actuator 234 so that engine 120 is controlled in accordance with a desired control algorithm.

Fuel actuator 234 provides pressurized fuel via a plurality of tubes to various internal passageways of fuel manifolds 240L Deft bank) and 240R (right bank). Each of the fuel manifolds 240L and 240R provide pressurized fuel to fuel injectors (not shown) of engine 120, both for purposes of combustion and also for purposes of injector control.

FIGS. 6, 7, and 8 depict a subassembly of a fuel manifold 240L, air intake manifold 210-L1, and cylinder heads 400-L1, 400-L2, and 400-L3. As best seen in FIG. 8, fuel manifold 240L includes pressurized fuel within five internal passages, fuel delivery passages 242, 244, and 246; and two injector timing passages 252 and 254. This fuel is provided to a cylinder head such as cylinder head 400-L1 by a plurality of delivery tubes 262, 264, and 266, each of which pass through intake manifold 210-L1. In one embodiment, intake manifolds 210 are cast from a lightweight material such as aluminum. In one embodiment, fuel delivery tubes 262, 264 and 266 are steel and are placed in the mold prior to casting of manifold 210. Although the use of steel for fabrication of the fuel delivery tubes has been discussed, the present invention is not so limited and contemplates the use of other materials which can be cast in place in a cast aluminum manifold.

Fuel delivery tubes 262, 264 and 266 are separately fabricated components which are cast in place within intake manifold 210. Fuel delivery tubes 262, 264, and 266 pass completely through intake manifold 210 from a first outer side of manifold 210 to a second, opposite, inner side of manifold 210. Fuel manifold 240 is attached to the outer side of intake manifold 210. At least one cylinder head 400 is attached to the inner side of manifold 210. To establish fuel-tight connections on either side of intake manifold 210, there can be a plurality of o-rings and/or tube connector components (such as ferrules) that interlock a fuel delivery tube 262, 264, and 266 to either fuel manifold 240 or cylinder head 400. Internal passages within the cylinder head (not shown) carry the pressurized fuel to the injector. In one embodiment of the present invention, cylinder head 400 includes a passage for the return of fuel back to the fuel manifold. As one example, this return fuel can be fuel which was used to time or sequence the fuel injector. This fuel is returned by an internal passage within the cylinder head (not shown) which couples to a fuel delivery tube cast within air manifold 210. This fuel delivery tube is coupled to a port on the fuel manifold 240 which provides the fuel to a manifold drain, which subsequently returns the fuel either to the tank, inlet of the fuel pump, or other low pressure reservoir.

Figure 9:
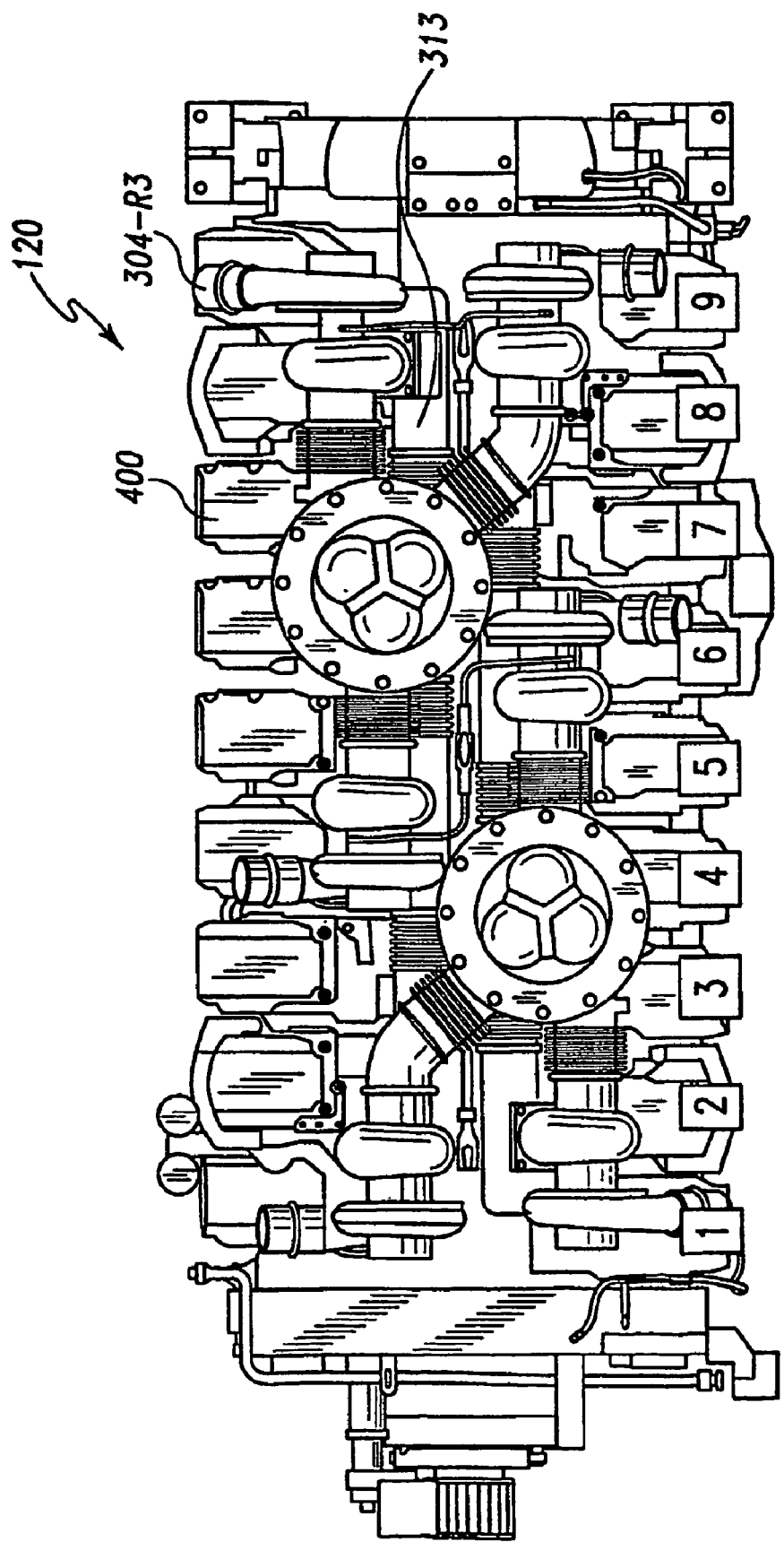
FIG. 9 is a top view of engine 120 including labeling of the cylinders.

Some embodiments of the present invention include a cylinder firing order that reduces vibratory stress in the crankpins of the crankshaft. This improved firing order for an 18 cylinder engine is a variation in the Ker Wilson algorithm. FIG. 9 illustrates the numbering system for the engine. Cylinders are numbered 1-9, corresponding to front to back, respectively. Left bank cylinders (left as viewed from the rear) are labeled with an "L", and right bank cylinders are labeled with a "R". One embodiment of the improved firing order is as follows:

1R-8L-2R-9L-4R-7L-6R-5L-8R-3L-9R-1L-7R-2L-5R-4L-3R-6L.

This improved firing order has been shown to reduce crankpin vibratory stresses by about 19 percent. It is believed that this reduction in crankpin stress is a result of reduction in vibratory torque at the 0.5 rotational order of the engine (subharmonic).

The firing order shown above includes a repetitive pattern related to the distances between consecutively firing cylinders. This pattern can be perceived in the following manner.

The firing order presented above describes the consecutive firing of cylinders. Preferably, the firing of cylinders alternates between the left and right sides. There is also a "distance" between consecutive firings. For example, the first two firings shown above are:

1R-8L

The "distance" between these consecutive firings is 7. The second cylinder fired (8L) is seven cylinders spaced away from the first cylinder fired (1R). With this approach, the distances between consecutive firings for the firing order shown above is as follows:

7-6-7-5-3-1-1-3-5-6-8-6-5-3-1-1-3

This firing distance pattern twice includes the subpattern (5-3-1-1-3). Further, each of these repetitive patterns are spaced apart by more radical (more distant) patterns (7-6-7) and (5-6-8-6).

Figure 10A:
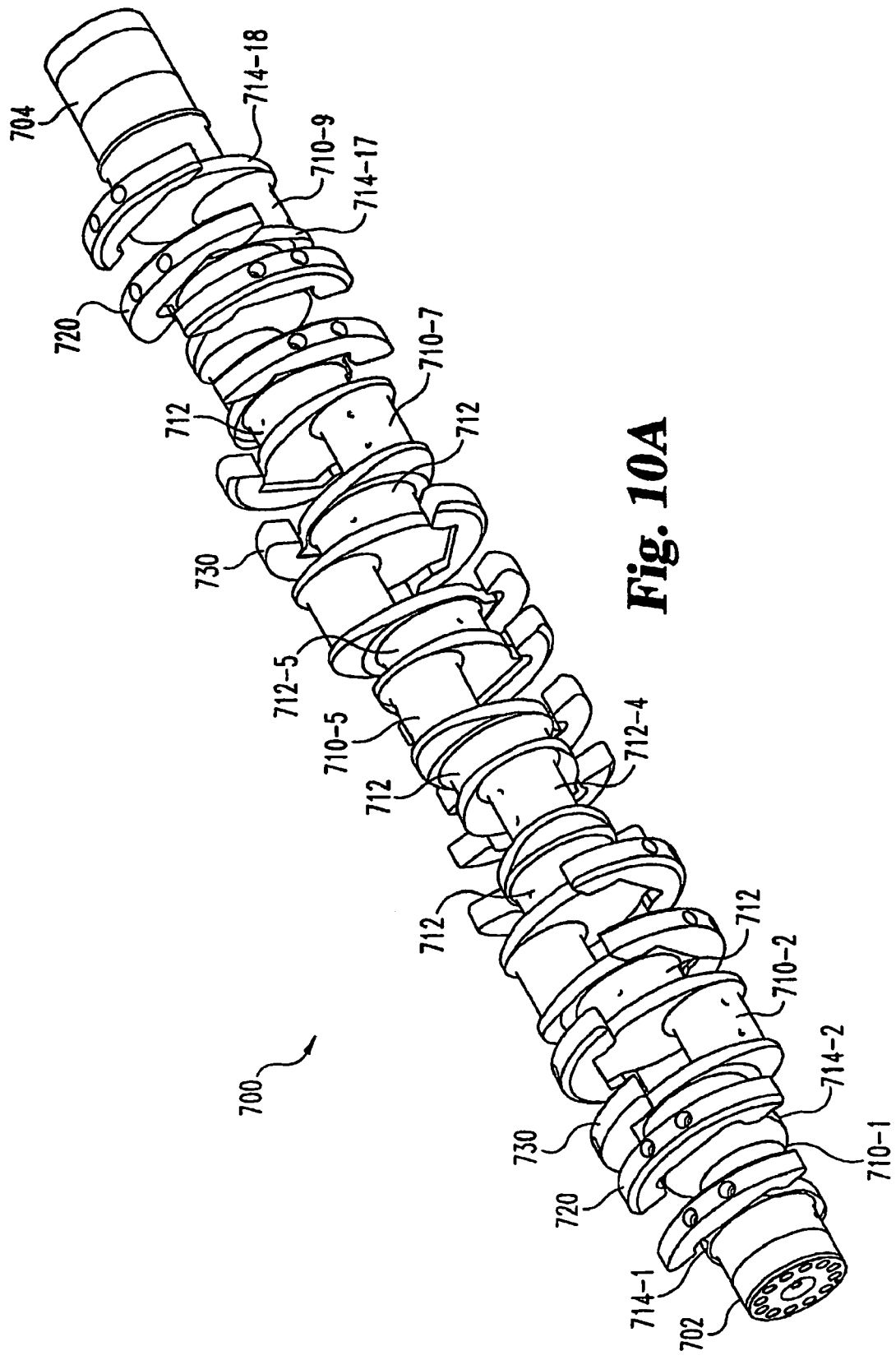
FIG. 10A is perspective view of a crankshaft with counterweights according to one embodiment of the present invention.
Figure 10B:
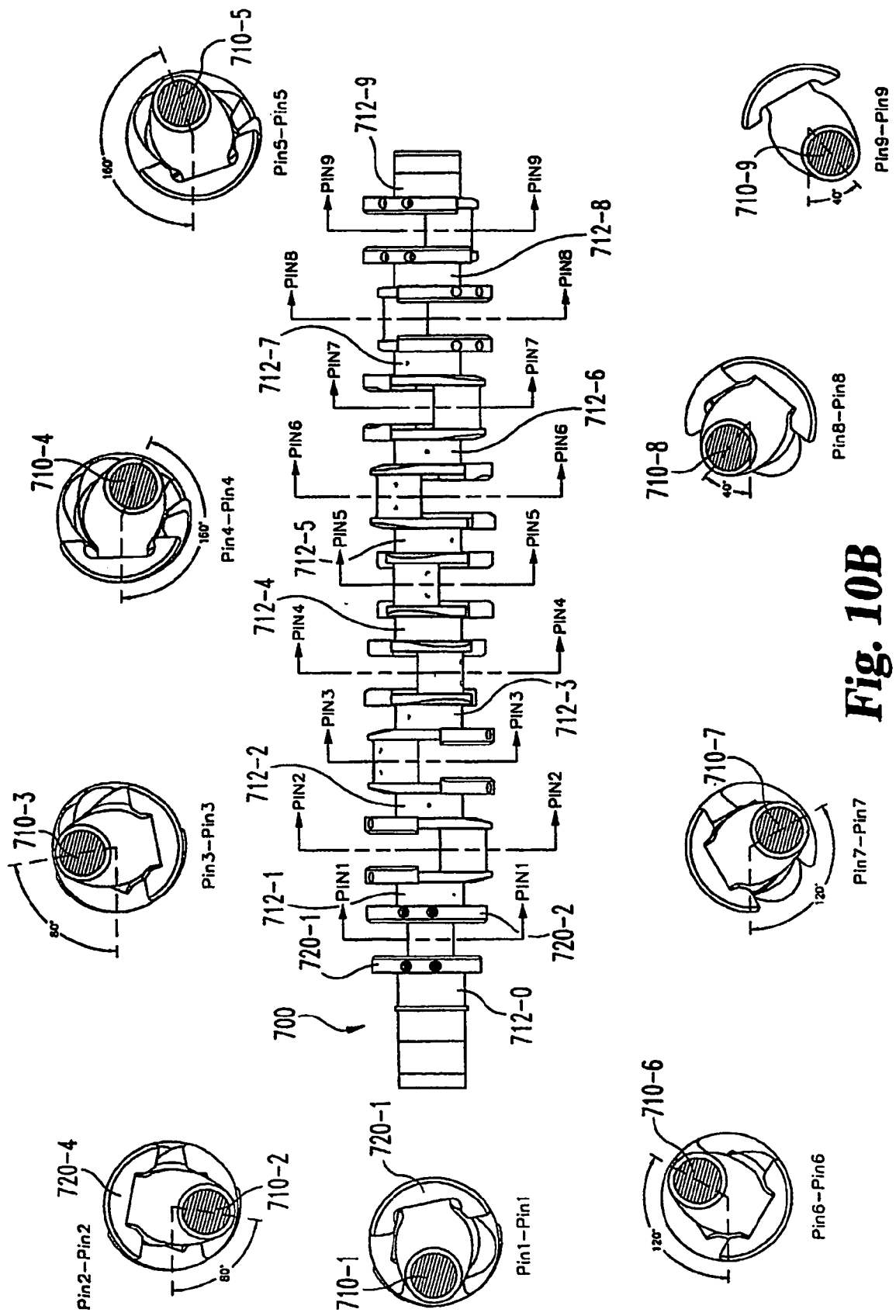
FIG. 10B is a plan view of a crankshaft according to one embodiment of the present invention, including nine cross sectional drawings of the nine crankpins.
Figure 11:
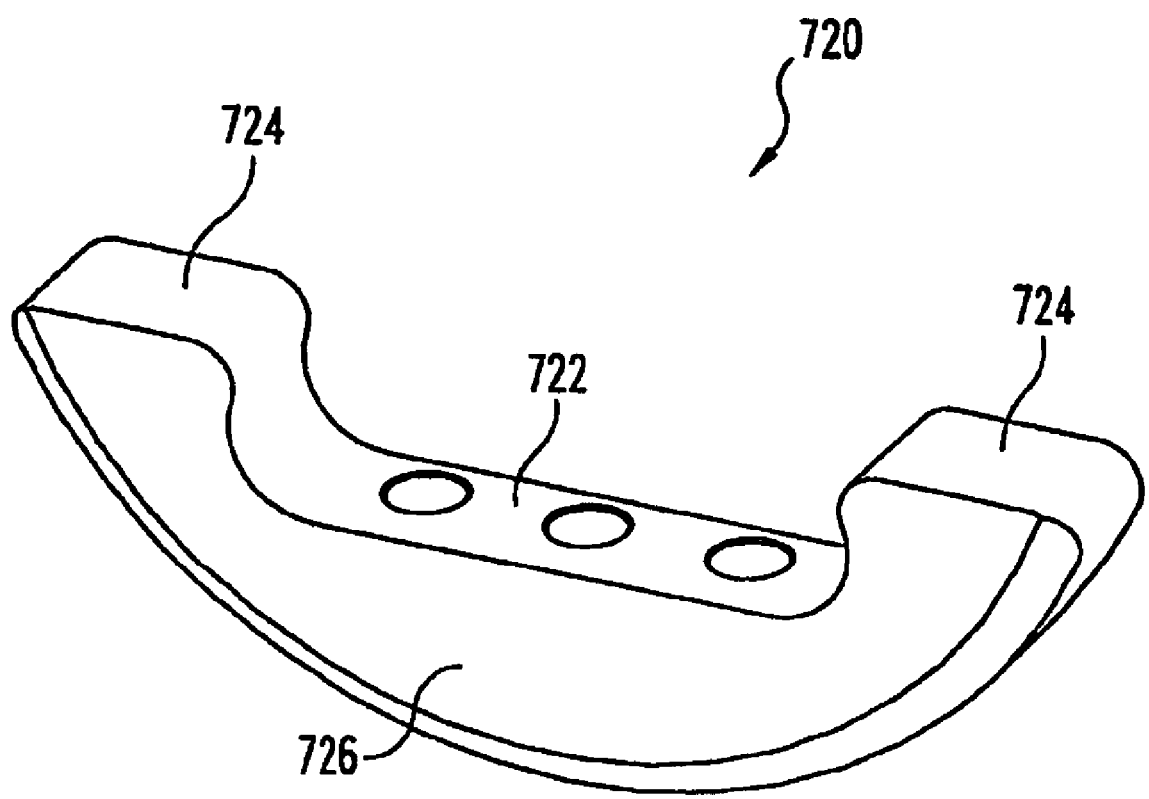
FIG. 11 is a perspective view of a counterweight as shown in FIG. 10.

FIGS. 10 and 11 depict embodiments of the present invention that relate to crankshaft 700 of engine 120. Crankshaft 700 has a front 702 and a rear 704. A plurality of crankpins 710 and bearing journals 712 are distributed along the length of crankshaft 700. A pair of webs 714 couple the offset crankpins 710 from the bearing journals 712. There are nine crankpins along the length of crankshaft 700 (from 710-1 near front 702 to 710-9 located near rear 704). Each crankpin is rotatably coupled to a pair of connecting rods. The numbering nomenclature of FIG. 10 is consistent with that shown in FIG. 9. Therefore, crankpin 710-1 is coupled to connecting rods for cylinders R1 and L1; crankpin 710-9 is coupled to connecting rods for cylinders R9 and L9.

One aspect of the present invention relates to the use of counterweights for crankshaft 700 that are attached by fasteners to webs 714. Some or all of these counterweights are fabricated from tungsten, a material chosen for adequate strength and high density. Tungsten counterweights 720 are attached to webs 714-1 and 714-2 (on either side of crankpin 710-1); to webs 714-8 and 714-9 (on either side of bearing journal 7124); to webs 714-10 and 714-11 (on either side of bearing journal 712-5); and to webs 714-17 and 714-18 (on either side of crankpin 710-9). In some embodiments of the present invention, the remaining crankshaft webs (714-3, -4, -5, -6, -7, -12, -13, -14, -15, and -16) are coupled to counterweights fabricated from steel. This placement of tungsten counterweights 720 and steel counterweights 730 have been found to be effective in reducing bending of the crankshaft during engine operation.

FIG. 11 depicts a tungsten counterweight 720 according to one embodiment of the present invention. Counterweight 720 includes a central weight 726 having a cylindrical outer shape compatible with clearances within the crankcase of engine 120. An attachment boss 722 provides a flat face for attachment of counterweight 720 to a web 714 by a plurality of fasteners (not shown). A pair of ears 724 project on either side of a web 714 when installed.

Figure 12:
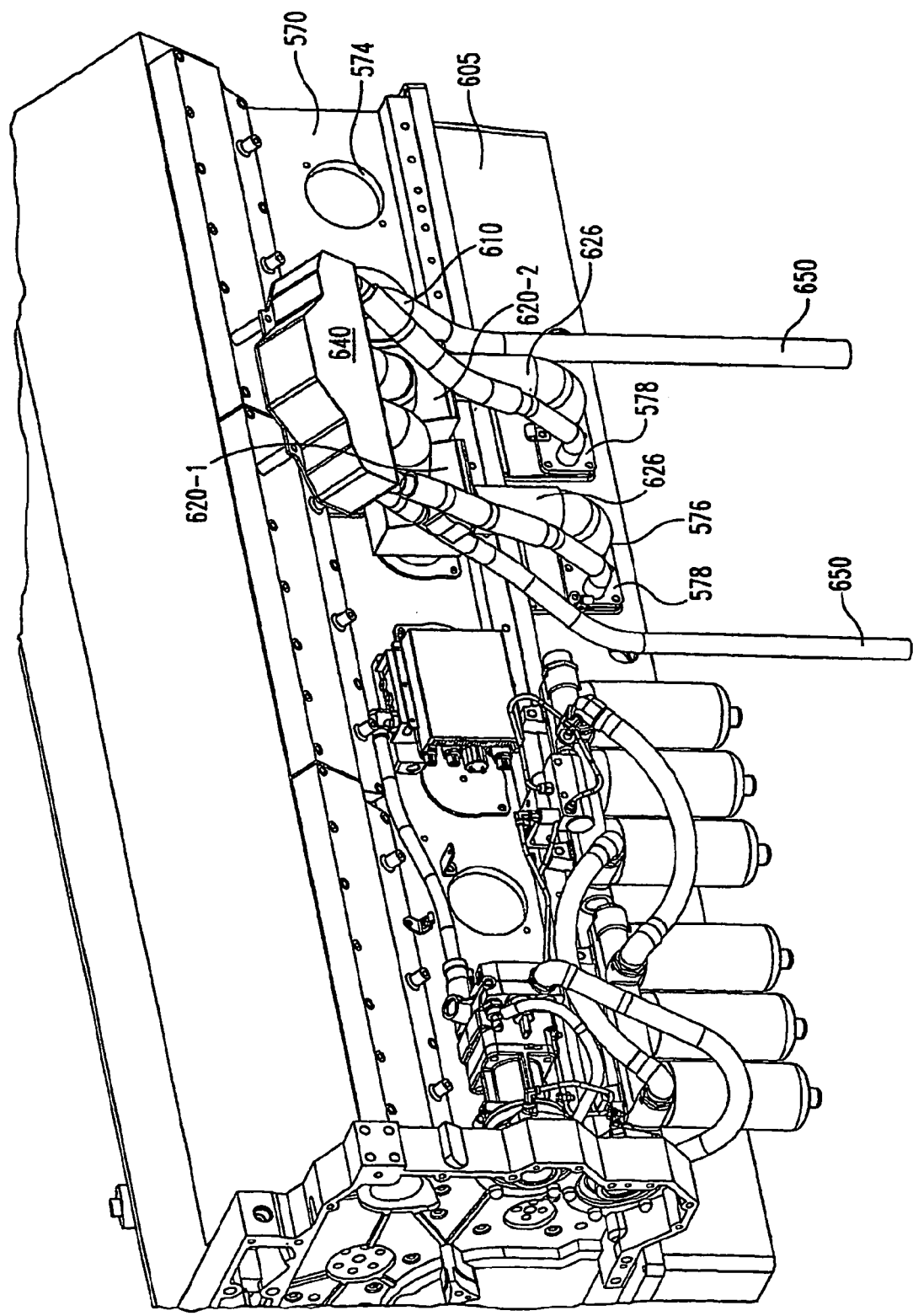
FIG. 12 is a perspective view of the left side of a partially assembled engine according to one embodiment of the present invention.
Figure 13:
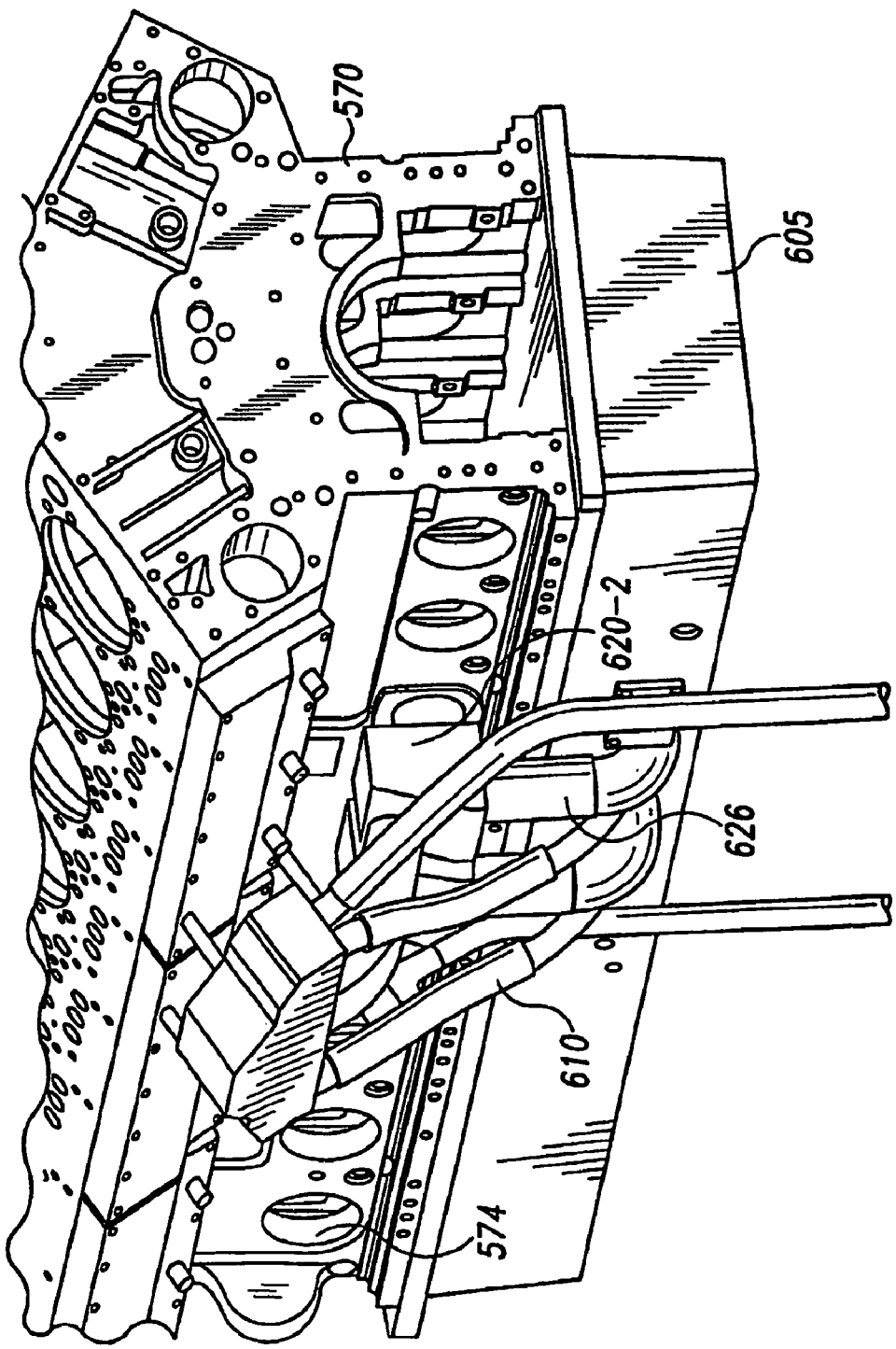
FIG. 13 is another perspective view of the engine of FIG. 12.
Figure 14:
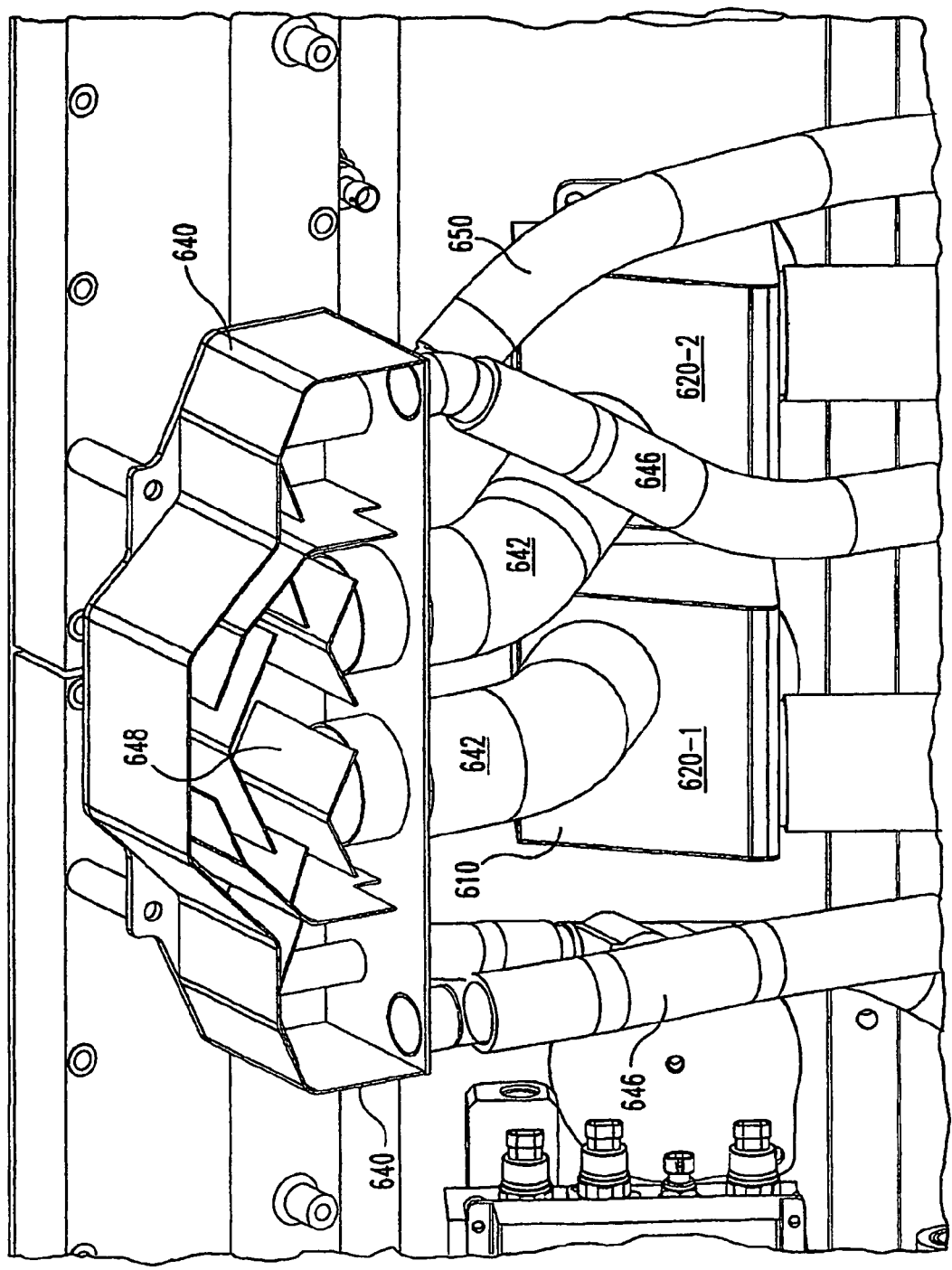
FIG. 14 is a perspective view of the apparatus of FIG. 13 partially exploded.

FIGS. 12, 13, and 14 show various views of a partially assembled engine according to one embodiment of the present inventions. These figures show an assembly of an engine block 520, an oil pan 605, and an oil scavenging system 610 according to one embodiment of the present invention. Oil scavenging system 610 is part of an oil system 600 which lubricates and cools engine 120. Oil scavenging system 610 separates oil from the air and oil mixture present within the engine crankcase, and returns the separated oil to oil pan 605 in a manner which will be described.

Oil scavenging assembly 610 includes a first air/oil separator 620 which receives an air/oil mixture from the engine crankcase, partially separates the oil from the air, and provides an air/oil mixture with reduced oil content to a second air/oil separator 640. Second separator 640 further reduces the oil content and provides an exhaust of crankcase blow-by air out to ambient by a pair of air/oil mist outlet ducts 650.

As is common in internal combustion engines, the engine crankcase contains a turbulent mixture of lubricating oil and gases that have blown by the piston rings. In one embodiment, engine block 570 includes a plurality of crankcase openings 574 which provide access to the internal crankcase atmosphere. The turbulent mixture of air and oil is provided through openings 574 into a first supply duct 622 of first separator 620. In some embodiments of the present invention, two or more first separators 620 are used in the first separation stage. However, the present invention also contemplates those applications with a single first stage separator, as well as multiple first stage separators.

Figure 16:
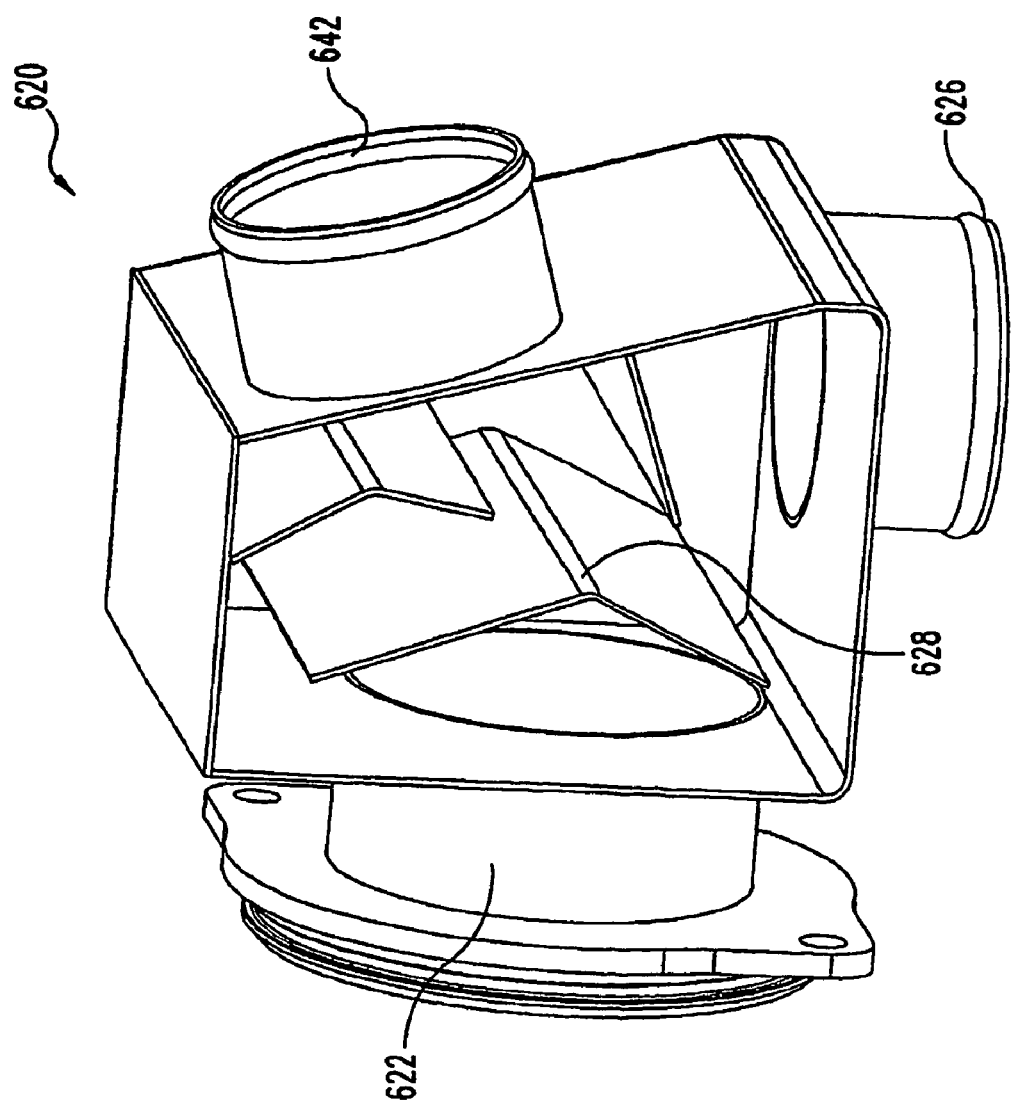
FIG. 16 is a partially exploded view of an air/oil separator according to one embodiment of the present invention.
Figure 17:
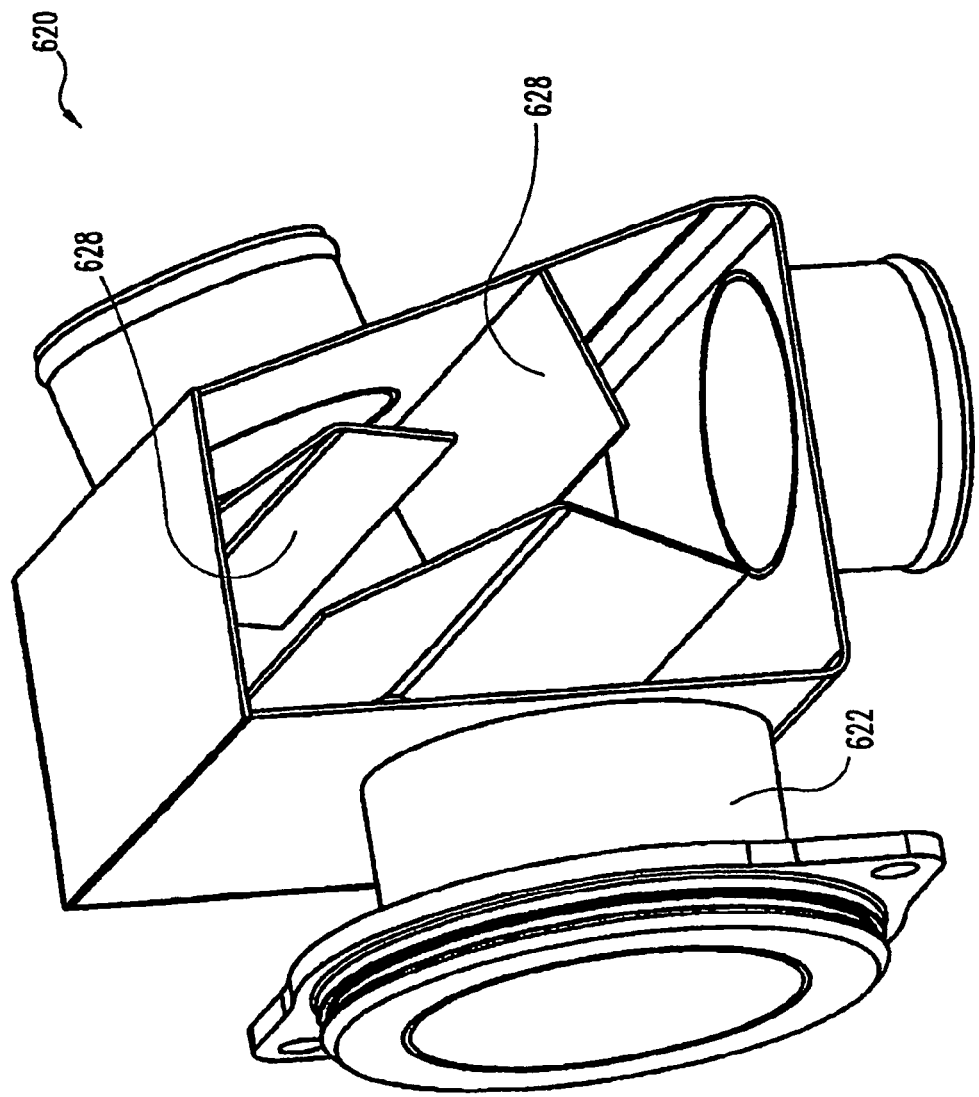
FIG. 17 is a perspective view of the air/oil separator of FIG. 16.

Referring to FIGS. 16 and 17, the mixture of air and oil from the crankcase flows through the supply duct 622 to the interior of first separator 620. The sidewalls of separator 620 have been removed in FIGS. 16 and 17 to improve visibility of the plurality of internal baffles 628 located within the interior of separator 620. A first baffle 628 is located to block any direct flow from inlet 622 to second supply duct 642. Baffles 628 are arranged and configured to inertially separate the heavy oil droplets from the higher velocity blow-by gases. Therefore, baffles 628 provide a circuitous route for flow of the partially separated mixture out through second supply duct 642 and into second oil/air separator 640. A first oil return duct 626 located in the bottom of separator 620 provides a direct flow for separated oil to flow into oil pan 605 through oil pan return opening 576.

Figure 15:
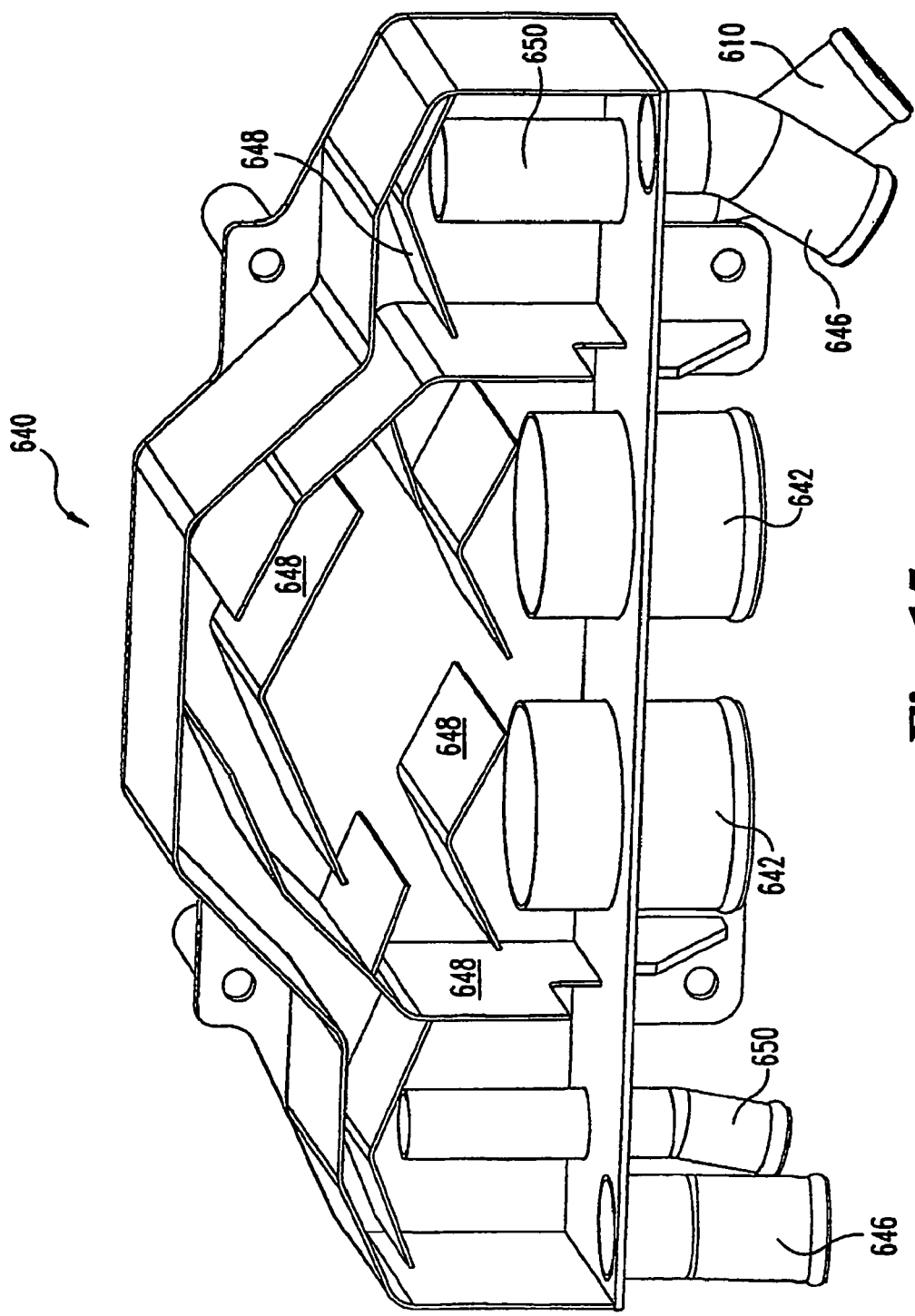
FIG. 15 is a partially exploded view of an air/oil separator according to one embodiment of the present invention.

The partially separated mixture flowing through second supply duct 642 enters second air/oil separator 640. FIGS. 14 and 15 depict secondary separator 640 with one or more external sides removed to permit viewing of internal baffling. Referring to FIG. 14, second supply ducts 642 provide the partially separated air/oil mixture into the bottom of second separator 640. The mixture first encounters an internal baffle 648 which is adapted and configured to promote inertial separation of the oil from the air. A plurality of other baffles 648 likewise aid in this inertial separation, and also shield the entrance to mist outlet duct 650. A pair of oil return ducts 648 provide the separated oil directly into oil pan 605 through a pair return openings 578.

Referring to FIG. 4, generator assembly 102 includes a generator 144 that is mounted cantilevered-style to engine 120 by way of flywheel housing 504. Because of this cantilever mounting, generator 144 can have a fundamental resonance frequency (cantilever movement) that is close to first engine order excitation. In some generator assemblies, the flywheel housing is bolted to the engine block in a semi-circular pattern, with the bottom circular segment of the pattern (of about 90 degrees) being unbolted. This lack of low-end support is associated with low frequency fundamental vibratory modes, and excessive vibratory amplitude.

Figure 18:
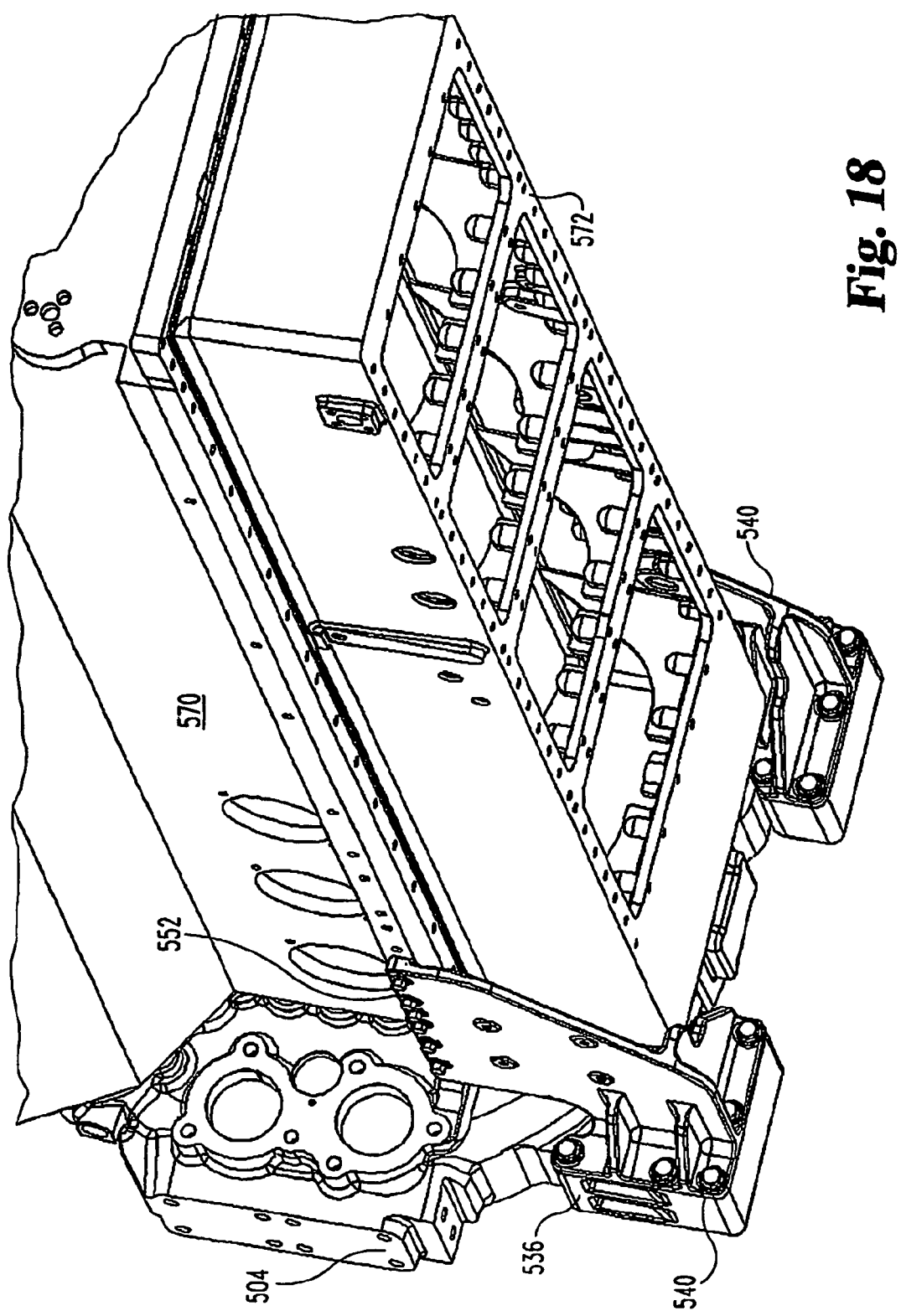
FIG. 18 is a rearward, bottom, right side perspective view of an apparatus according to one embodiment of the present invention.
Figure 20:
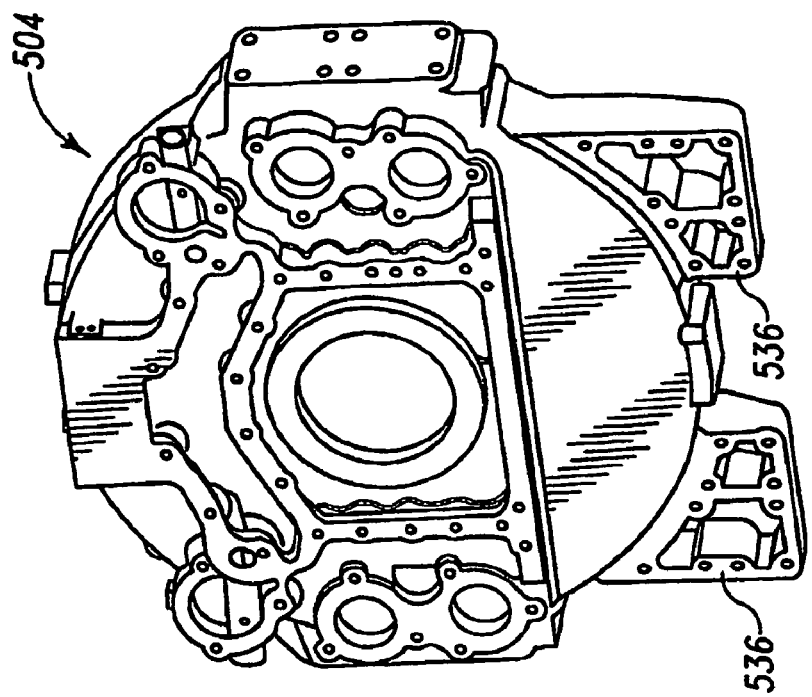
FIG. 20 is perspective view of the flywheel housing of FIG. 19.
Figure 19:
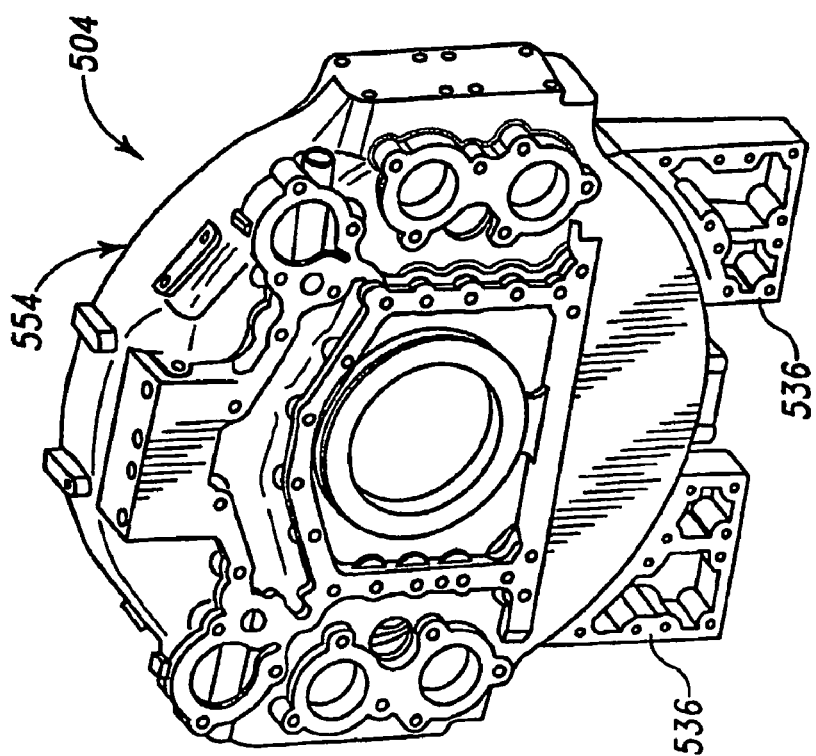
FIG. 19 is a perspective view of a flywheel housing according to one embodiment of the present invention.

Some embodiments of the present invention include structural support for the bottom portion of the flywheel housing that can significantly increase the fundamental vibratory mode of the cantilevered generator, and also reduce the degree of vibratory motion. Referring to FIG. 18, one embodiment of the present invention is depicted that includes such improved structural support. FIG. 18 is a perspective view of a partial assembly of an engine block 570, cast flywheel housing 504, and a pair of support brackets 540.

Figure 22:
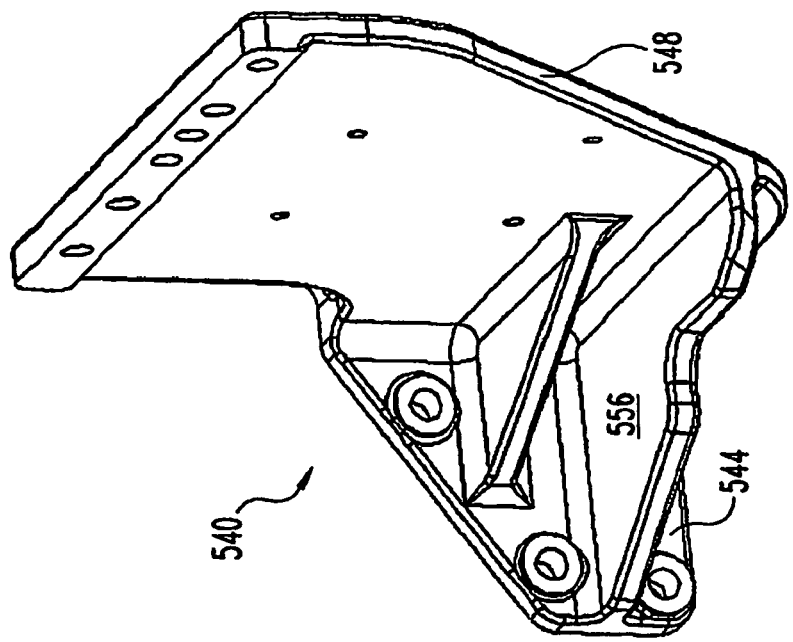
FIG. 22 is a perspective view of a bracket that is a mirror image of the bracket of FIG. 21.
Figure 21:
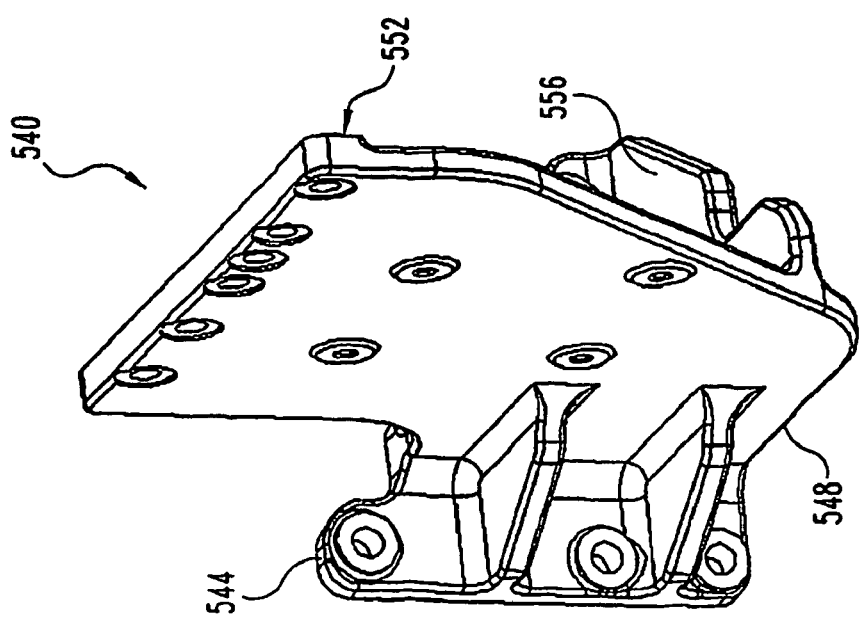
FIG. 21 is a perspective view of a bracket according to one embodiment of the present invention.

Referring to FIGS. 18-22, flywheel housing 504 is attached by a semi-circular bolt pattern 554 to a face of block 570. In some embodiments, attachment pattern 554 extends for about 270 degrees such that there is no attachment pattern for the lower quadrant. In such embodiments, flywheel housing 504 includes a pair of integrally cast attachment flanges 536 that project downward from the circular portion of housing 504, and generally on either side of crankcase 572. Attachment flanges 536 include a forward facing surface which mates with a support flange 544 of bracket 540. Bracket 540 also includes a block support flange 548 which is coupled by fasteners along a block lateral attachment pattern 552 to block 570. As best seen in FIGS. 21 and 22, in one embodiment of the present invention, support flange 544 is roughly perpendicular to block support flange 548. One or more support webs 556 minimize any relative bending of flange 548 with respect to flange 544.

Referring again to FIG. 18, bracket 540 provides a stiff structural link between block 570 and flywheel housing 504. Bracket 504 transitions from an axial (fore to aft) bolt pattern to a laterally facing bolt pattern 552. Bracket 540 minimizes cantilever motion of a generator by supporting the bending motion of the generator (as expressed as fore and aft movement of attachment flange 536) by attachment to a lateral bolt pattern 552 that extends along a predetermined length of block 570. However, other embodiments of the present invention include attachments of a modified block support flanges 548' (not shown) to a block attachment pattern 552' (not shown) which faces downward (i.e. fastener holes parallel to a vertical axis).

Figure 23:
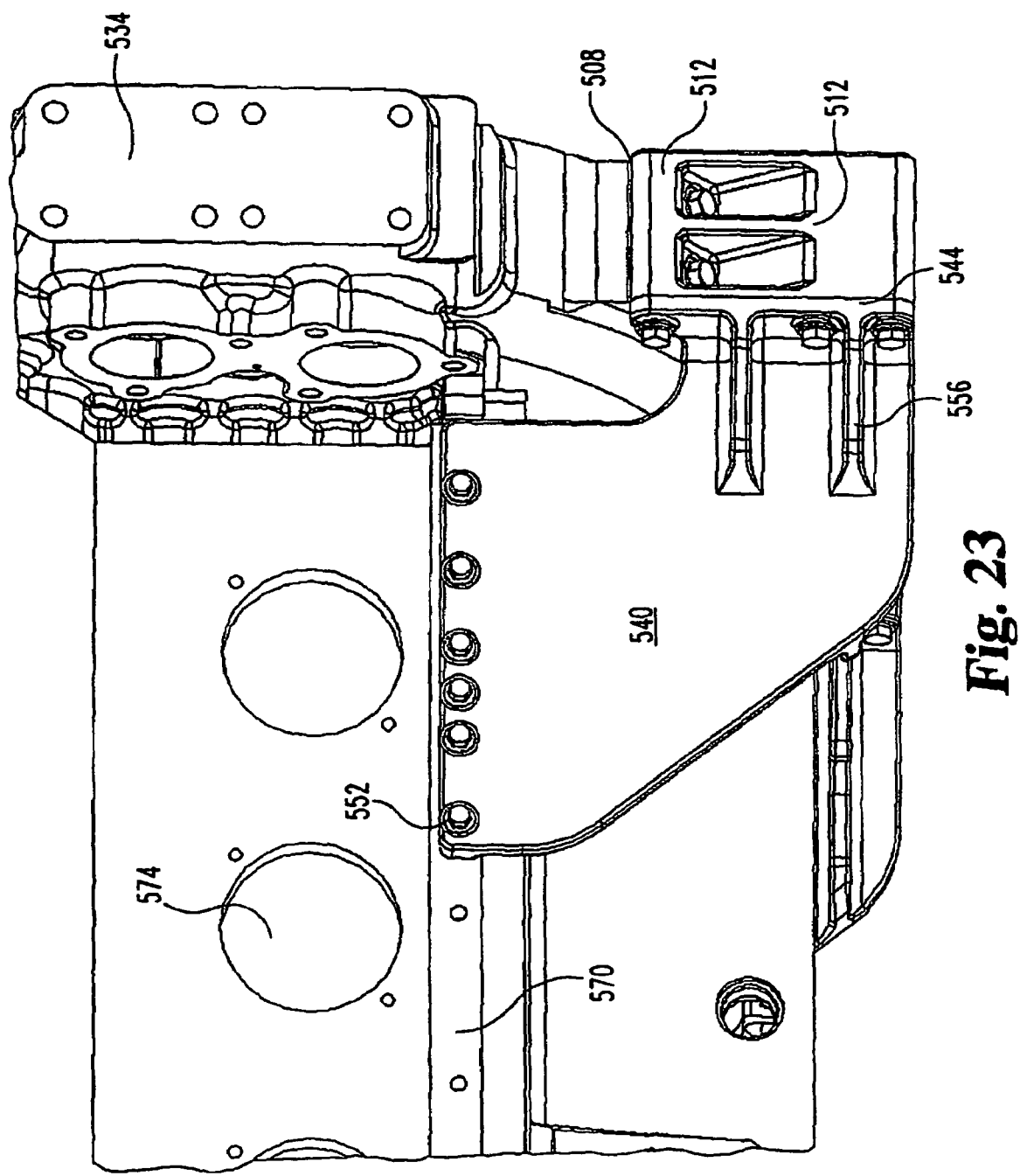
FIG. 23 is a rearward, left side perspective view of an apparatus according to another embodiment of the present invention.
Figure 24A:
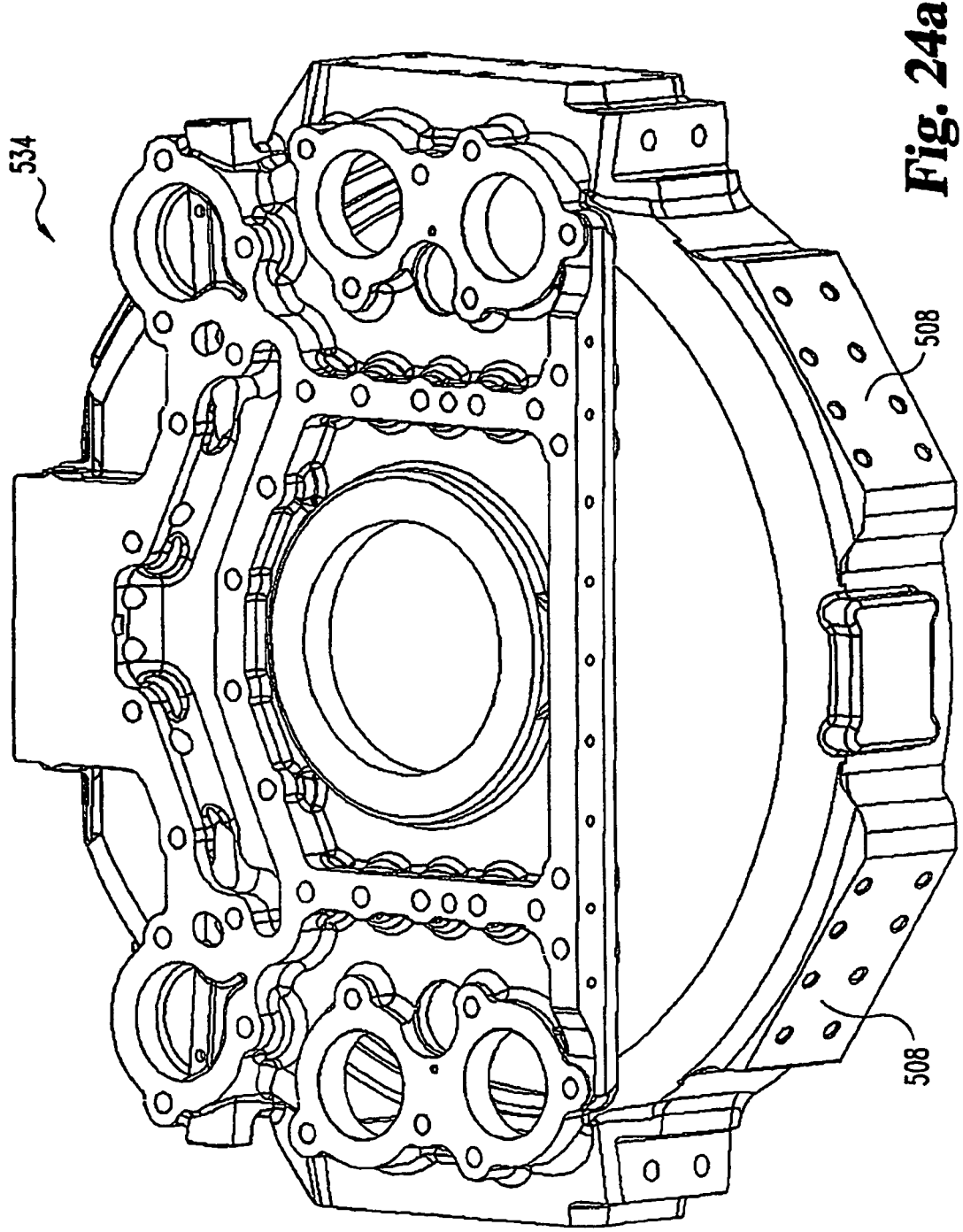
FIG. 24A is a perspective view of a flywheel housing according to one embodiment of the present invention.
Figure 24B:
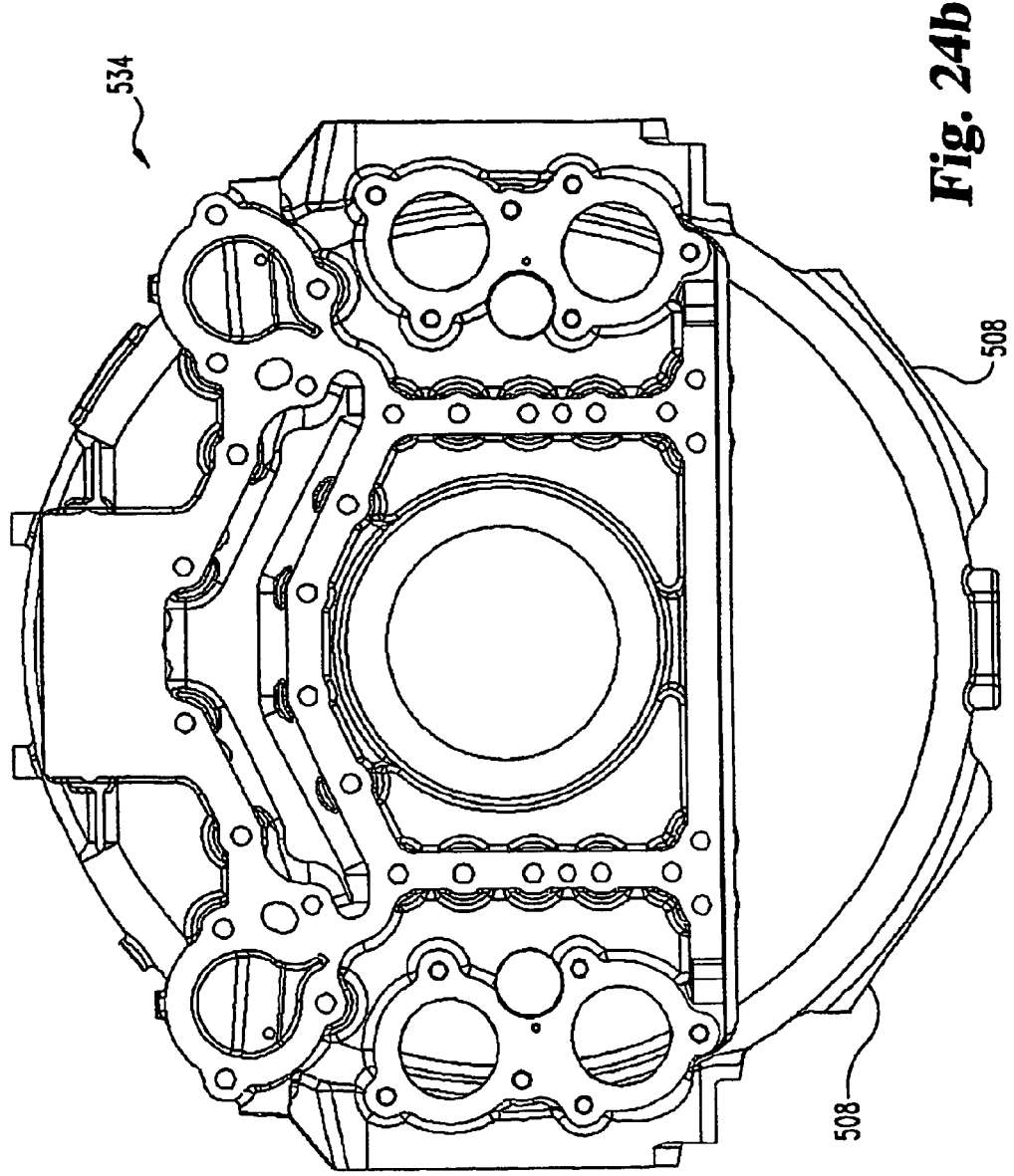
FIG. 24B is a plan schematic view of the housing of FIG. 24A.
Figure 25:
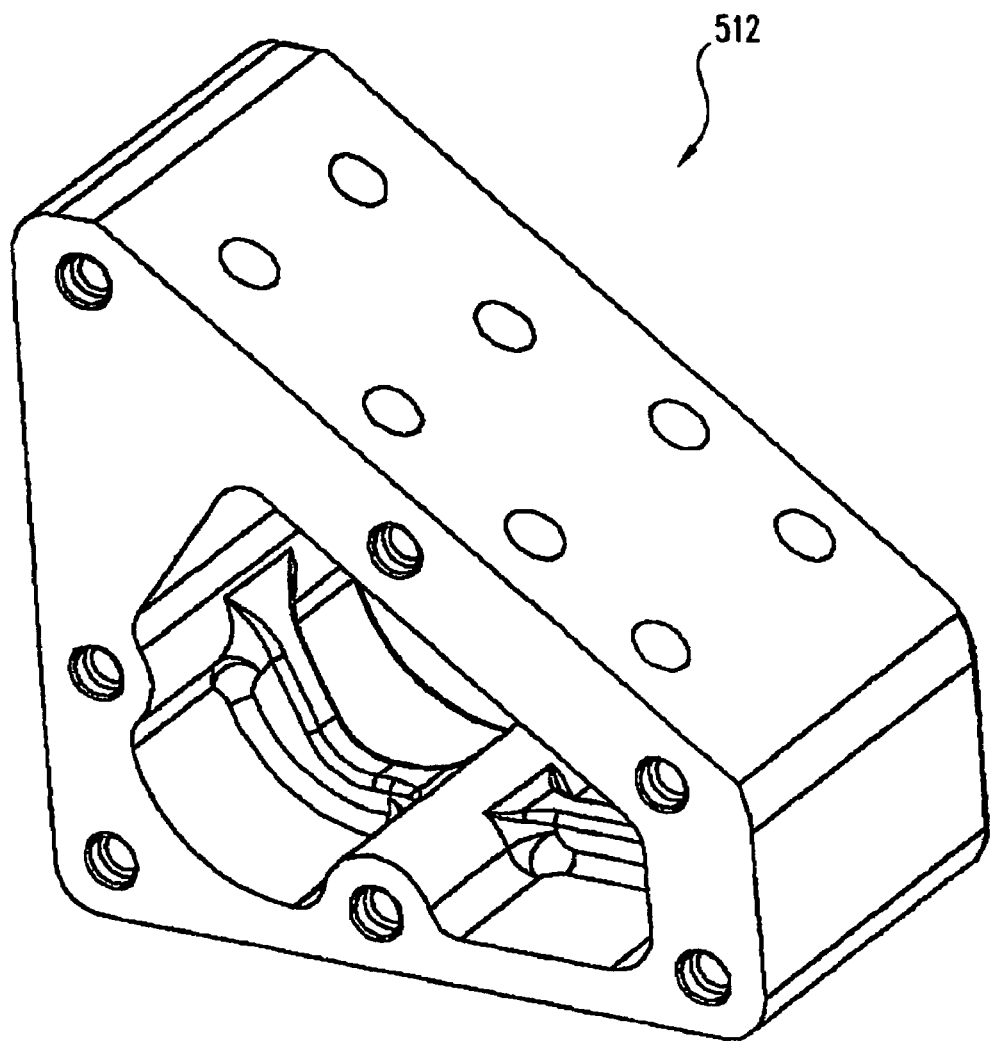
FIG. 25 is a perspective view of a foot according to one embodiment of the present invention.

FIGS. 23, 24A, 24B, and 25 depict support apparatus according to another embodiment of the present invention. FIG. 23 depicts a block 570 coupled to a flywheel support housing 534. Flywheel housing 534 is the same as flywheel housing 504, except that housing 534 does not include the downward depending attachment flanges 536. Instead, flywheel housing 534 includes a pair of machined housing pads 508 as best shown in FIGS. 24A and 24B. These housing pads do not extend downward sufficiently to couple to bracket 540. In this embodiment, a foot 512 (as best seen in FIG. 25) is coupled by fasteners to both pad 508 along an inclined surface, and also along a perpendicular face to support flange 544 of bracket 540.

Figure 26:
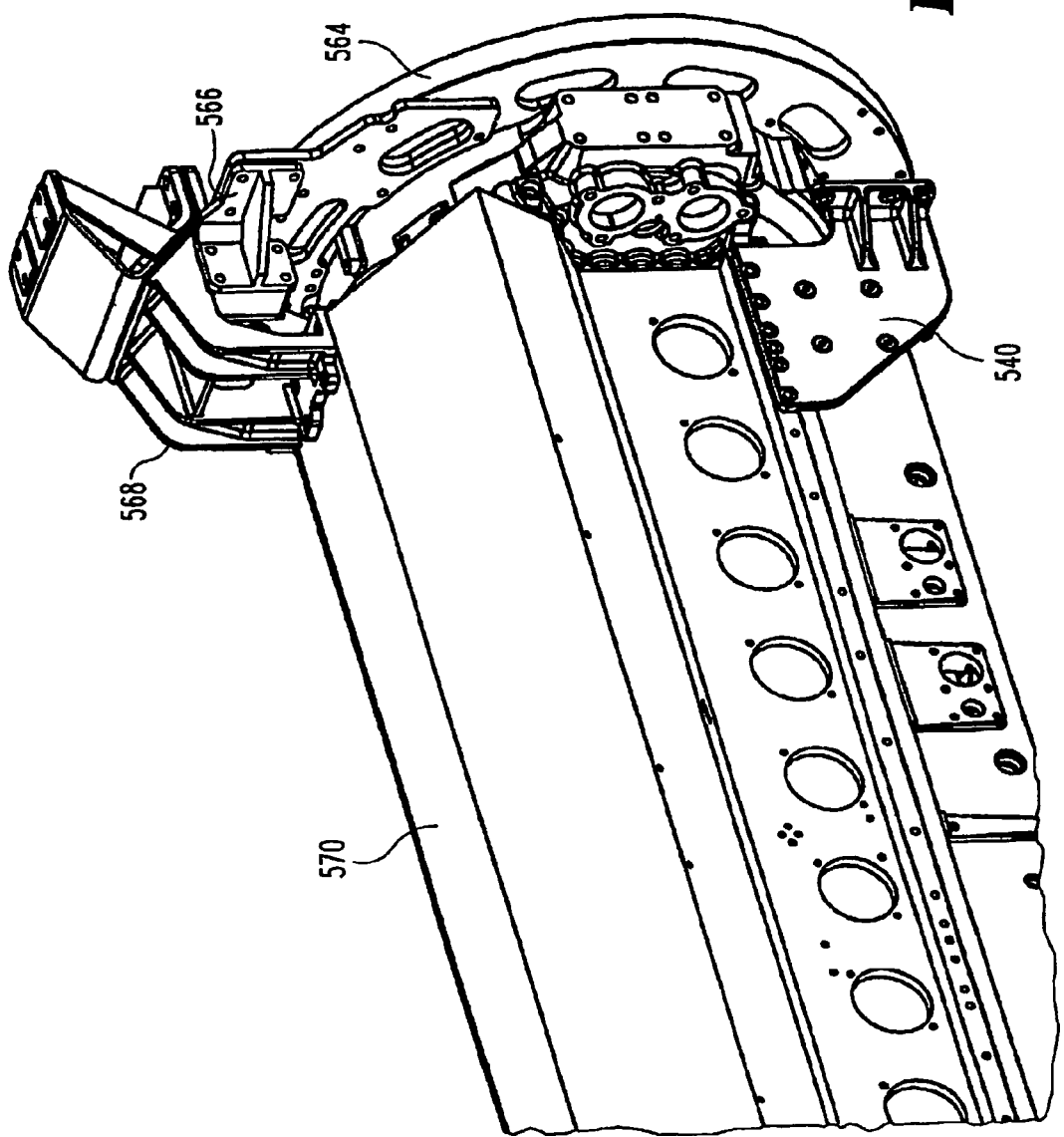
FIG. 26 is a top, left side and rearward facing perspective view of an apparatus according to another embodiment of the present invention.
Figure 27:
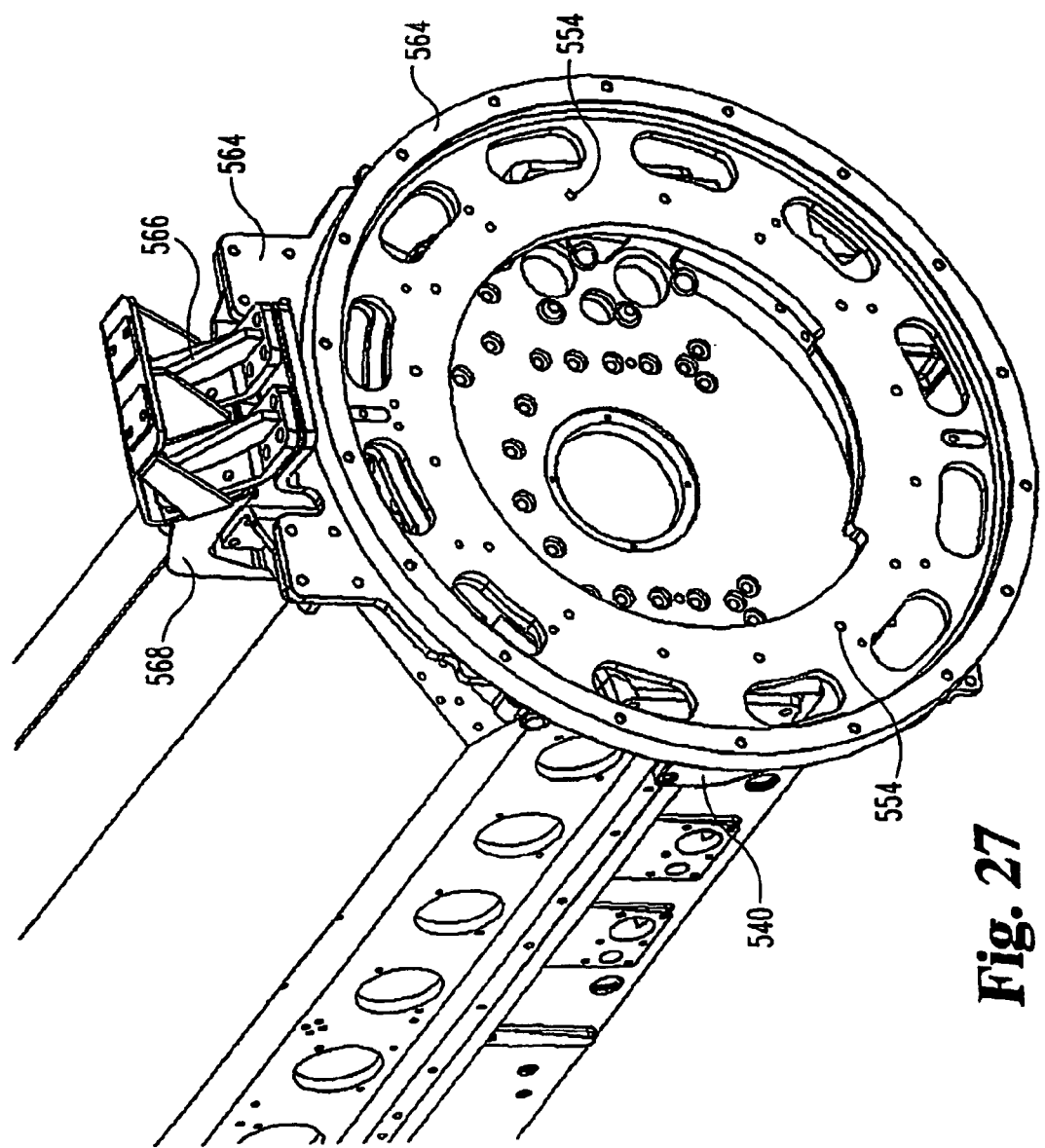
FIG. 27 is a forward facing view of the apparatus of FIG. 26.

FIGS. 26 and 27 depict additional brackets that support a very large diameter generator according to another embodiment of the present invention. A flywheel housing 564 supports a very large generator (not shown). The upper portion of flywheel housing 564 is attached to a generator bracket 566 that is coupled by fasteners to an engine block bracket 568. These brackets reduce before and aft motion of flywheel housing 564 induced by cantilever motion of the generator.

FIGS. 40-45 depict a subassembly of apparatus for supporting a generator according to another embodiment of the preset invention. The use of a prime (') designation following an element number refers to an element that is the same as the non-prime element, except for those differences shown and/or described.

Figure 28:
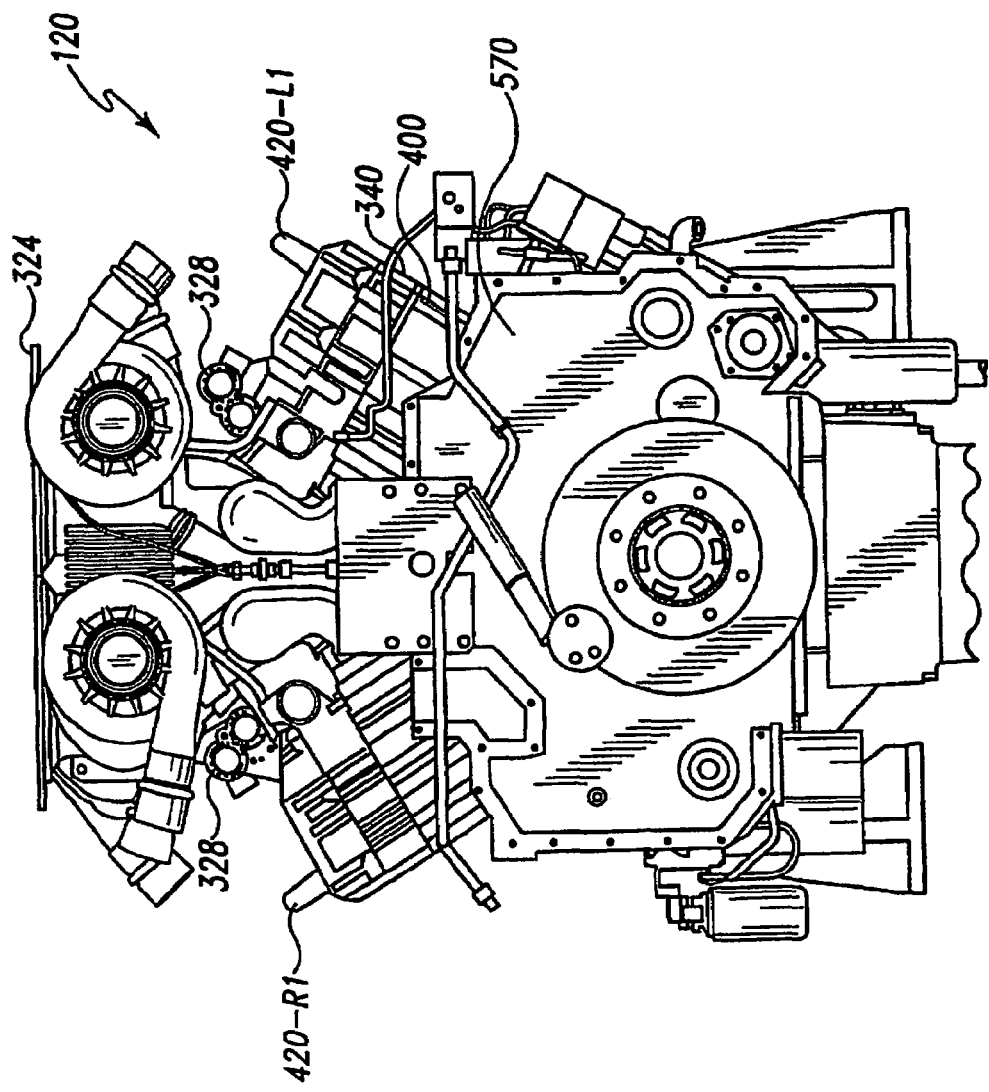
FIG. 28 is a frontal view of a partially assembled engine 120.
Figure 29:
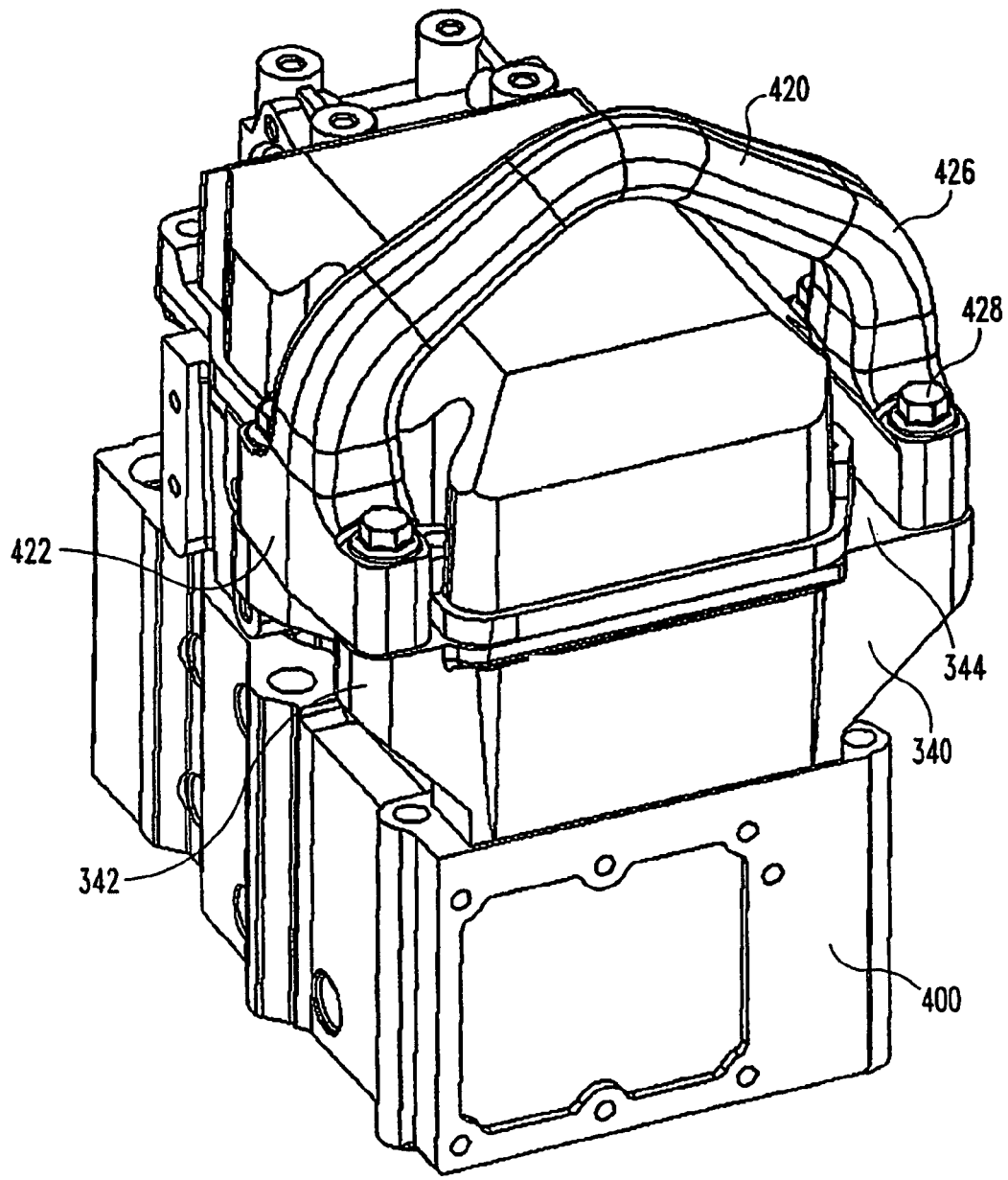
FIG. 29 is a perspective view of a subassembly including a cylinder head, rocker housing, valve cover, and lifting bracket.
Figure 30:
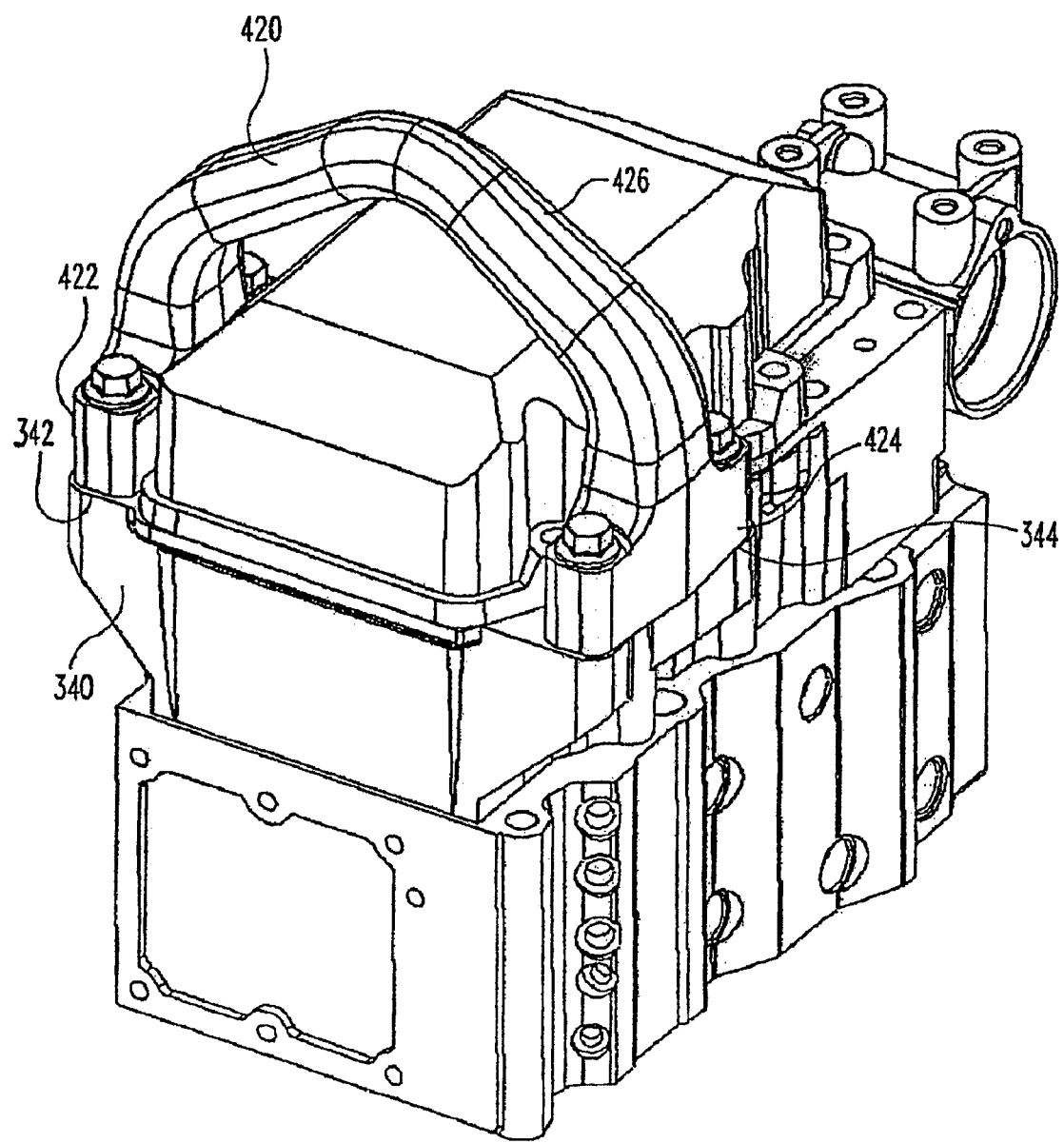
FIG. 30 is a perspective view of the apparatus of 29.

FIGS. 28, 29, and 30 depict an embodiment of the present invention which includes a plurality of lifting brackets 420 for lifting engine 120. Referring briefly to FIG. 9, lifting brackets 420-L2, 420-L8, 420-R2, and 420-R8, are located on engine 120 approximately straddling cylinder locations L2, L8, R2, and R8, respectively. Although what is shown and discussed includes four lifting brackets attached an engine at specific locations, the present invention also contemplates those embodiments in which a different number of lifting brackets are attached at different locations.

FIGS. 29 and 30 show a typical mounting of a lifting bracket to a portion of engine 120 according to one embodiment of the present invention. Lifting bracket 420 includes a central transverse member 426 which is raised slightly in the center. This central member includes a pair of left and right attachment legs 422 and 424, respectively. Each attachment leg is attached by fasteners 428 to left and right bosses 342 and 344, respectively, of a rocker housing 340. Rocker housing 340 is attached by fasteners (not shown) to a cylinder head 400, which in turn is attached to engine block 570. A valve cover is attached to the top of the rocker housing 340 between attachment legs 422 and 424.

In contrast to other designs where a lifting bracket is attached to two adjacent rocker arm housings (or two adjacent cylinder heads, or two adjacent valve covers), in the present invention, the lifting bracket is preferably attached to opposite sides of a single rocker housing 340. In this embodiment of the present invention the tolerance stack-up problem of other designs is avoided by attaching lifting bracket to bosses of a single rocker arm. Particularly, the tolerance stack for those lifting brackets mounted to two adjacent rocker housings includes the tolerance stack-up between multiple cylinder heads and multiple rocker arm housings. In some embodiments of the present invention, attachments occurs on a single rocker arm housing, therefore, it is possible to control the accuracy of the location of mounting bosses 342 and 344 without the use of shims.

Figure 31:
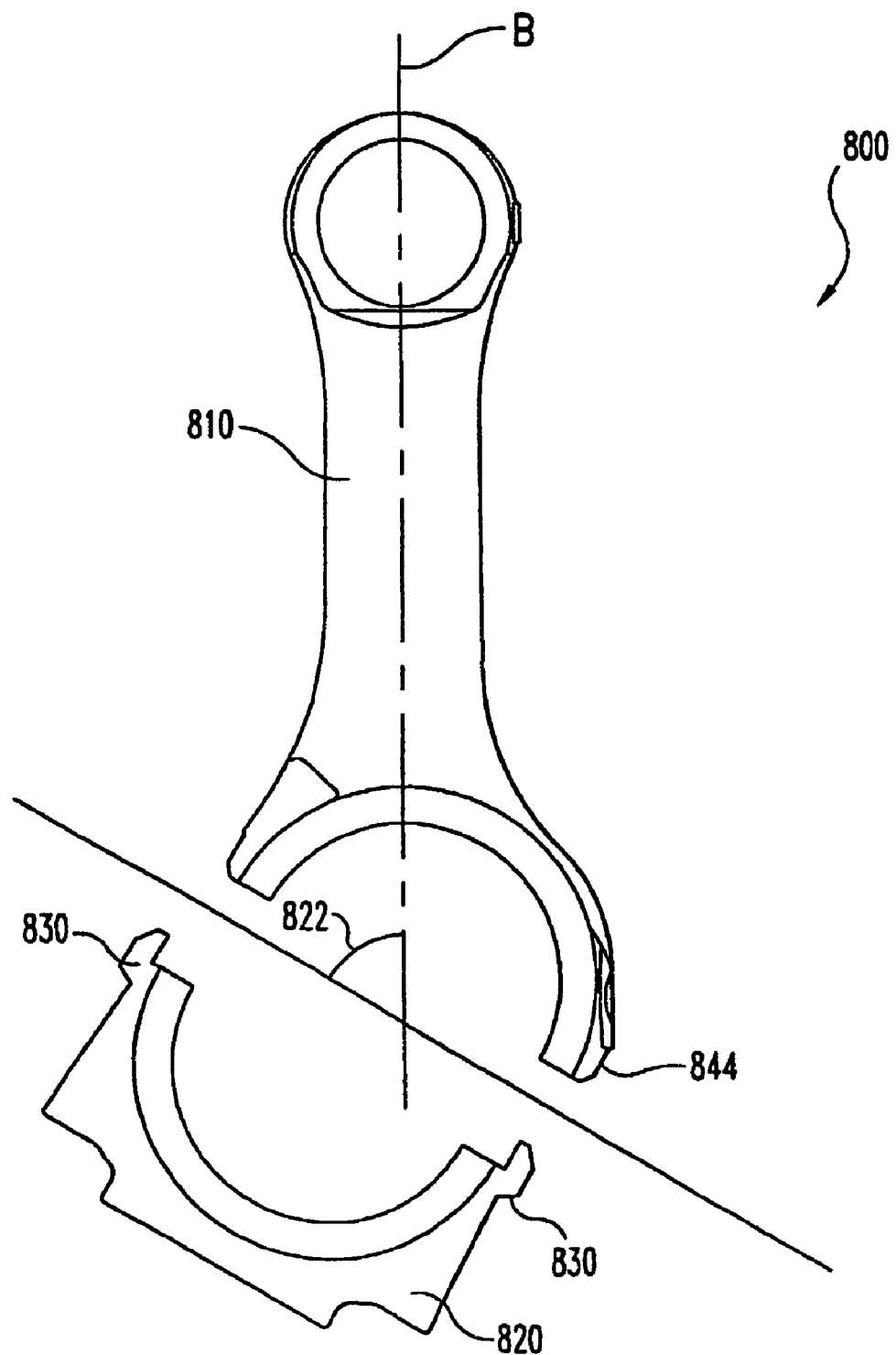
FIG. 31 is a exploded plan view of a two-piece connecting rod according to one embodiment of the present invention.

FIGS. 31-35 depict an embodiment of the present invention that relates to a connecting rod for an internal combustion engine. Referring to FIG. 31, there is shown a connecting rod assembly 800 with the shank 810 shown exploded from the cap 820. Connecting rod 800 is of the angled-split design. In one embodiment, there is an angle 822 (e.g. by approximately 90 degree, by less than 90 degree, by approximately 60 degree) as shown in FIG. 31 between a line A parallel to the split plane and line B, which intersects the centerline of the shank. The split line of connecting rod assembly 800 is angled as shown so that a large crankpin can be included on crankshaft 700, yet still allow removal of the piston (not shown) and shank 810 through the cylinder without removing the crankshaft. However, the use of an angled split line tends to increase sheer forces on the fasteners 806 that hold cap 820 onto shank 810, and which sheer forces cause fretting of the interface between the cap and the shank.

To better resist shear forces acting along the split plane between the shank 810 and cap 820, some embodiments of the present invention include projections 830 on either side of cap 820. Projections 830 extend toward shank 810. In this embodiment, surfaces of the cap that mate with the surfaces of the shank are both flat.

Figure 33:
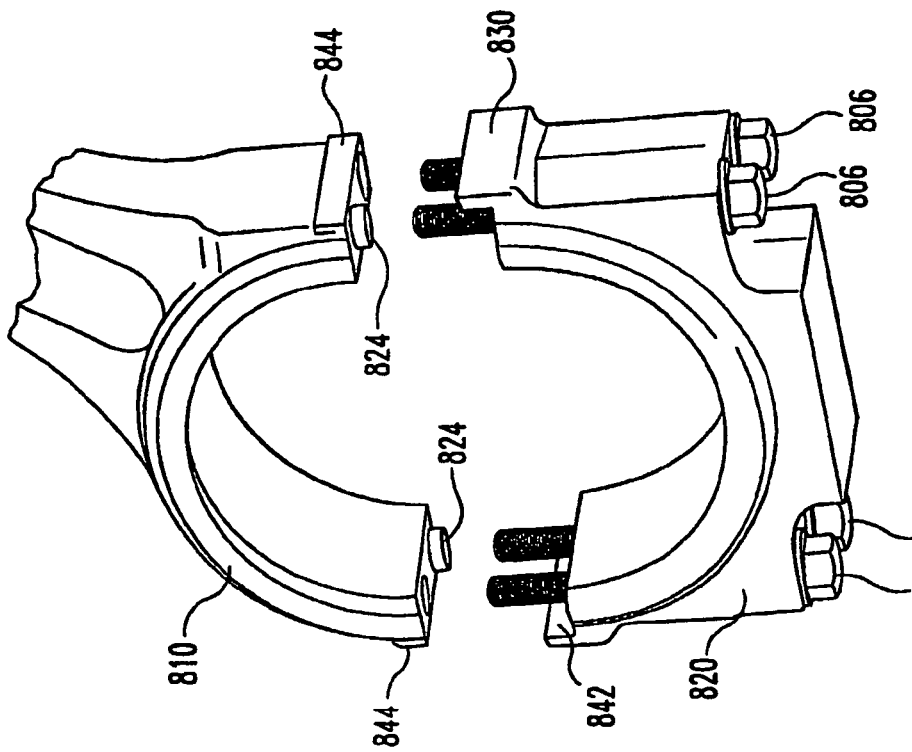
FIG. 33 is an exploded perspective view of the rod of FIG. 32.
Figure 35:
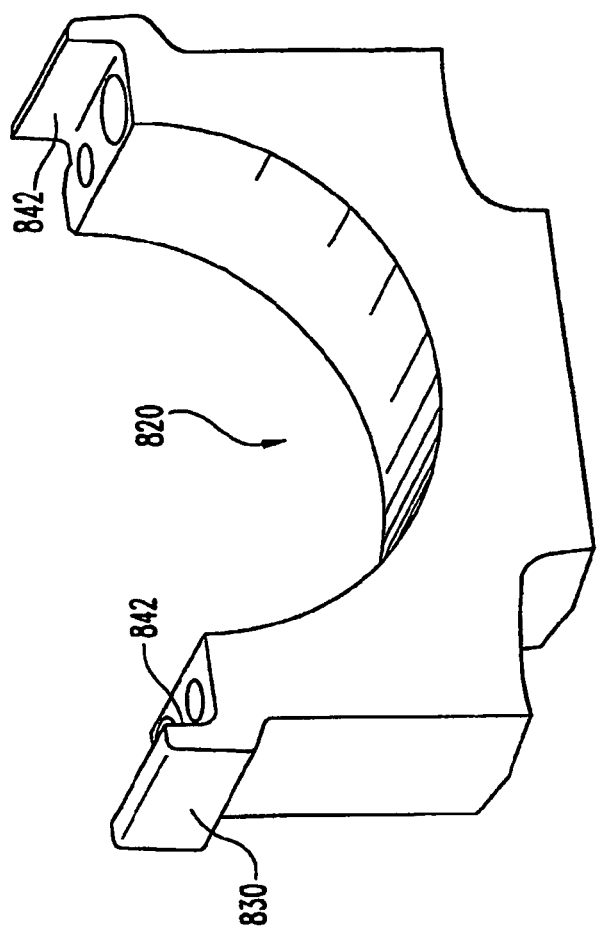
FIG. 35 is a perspective view of the cap of FIG. 34.
Figure 34:
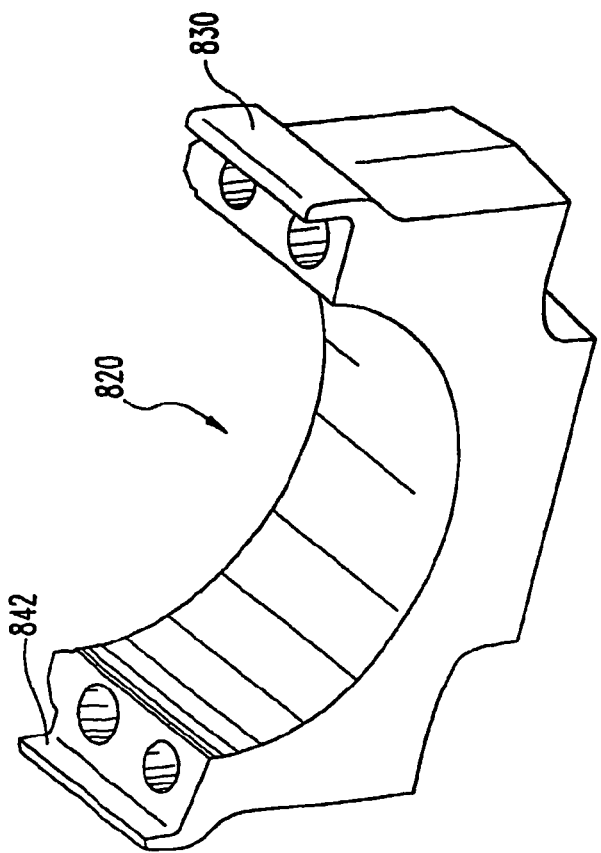
FIG. 34 is a perspective view of the connecting rod cap of FIG. 31.

Referring to FIG. 33, four fasteners 806 attach cap 820 to shank 810. Preferably, fasteners 806 are torqued during assembly until the fasteners yield. A pair of opposing pilots 824 help to accurately locate the shank and the cap together. When assembled, a laterally flattened surface area 842 of cap 820 (as best shown in FIGS. 34 and 35), presses against compression surfaces 844 on either side of shank 810 (as best seen in FIG. 33). Shank 810 and cap 820 are adapted and configured such that there is a light press fit (interference fit) between ears, or projections 830 and the mating sides of shank 810. In one embodiment, the tolerances for the interference fit are established so that there is a light interference between cap 820 and shank 810 even in a worst case tolerance stack-up FIGS. 46-52 depict an alternate embodiment of the present invention that relates to a connecting rod for an internal combustion engine. Referring generally to FIGS. 46-49, there is shown a connecting rod assembly 850 with a shank 860 and a cap 870. Connecting rod 850 is of the angled-split design and is similar to the embodiment depicted in FIGS. 31-35 except as otherwise indicated. Shank 860 includes two ends. One end of shank 860 includes piston connection portion 853 which connects connecting rod 850 to reciprocating piston 835 by a wrist pin (as best seen in FIG. 52). The other end of shank 860 is attached to crankpin 837 and includes bearing support surface, or shank inner surface, 862. Shank 860 further includes shank installation clearance surface 863, shank outer, or laterally facing, surface 864 and shank attachment, or abutting, surfaces 861. Shank attachment surfaces 861 each have a width 868 and shank outer surfaces 864 are separated by distance 865. Other embodiments may have different values of width 868 for each shank attachment surface 861. Split angle 852 is the angular difference between a split-line A', parallel to the split plane, and centerline B', which intersects the central line of the shank. Shank 860 includes fastener recesses 855 into which fasteners 856, used to attach shank 860 and cap 870, are placed. Shank 860 further includes alignment pin recesses 857 into which alignment pilot pins 825 are placed to aid alignment of shank 860 and cap 870 during installation into an engine.

Figure 50:
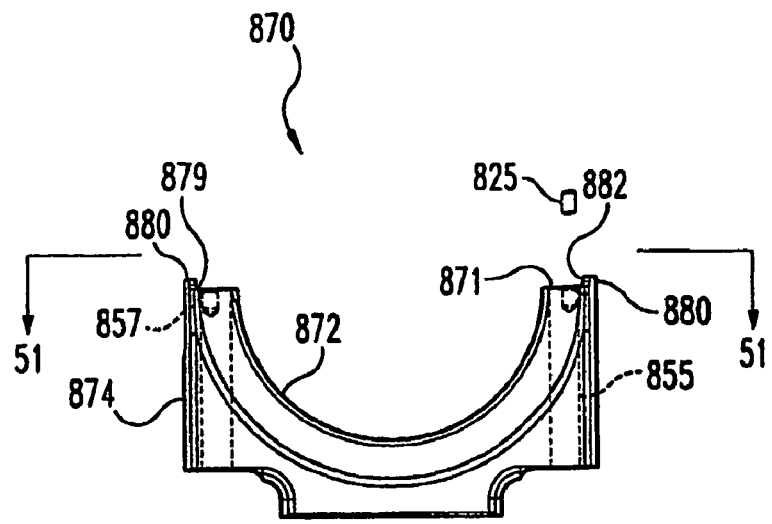
FIG. 50 is a plan view of the cap portion of the rod of FIG. 50.
Figure 51:
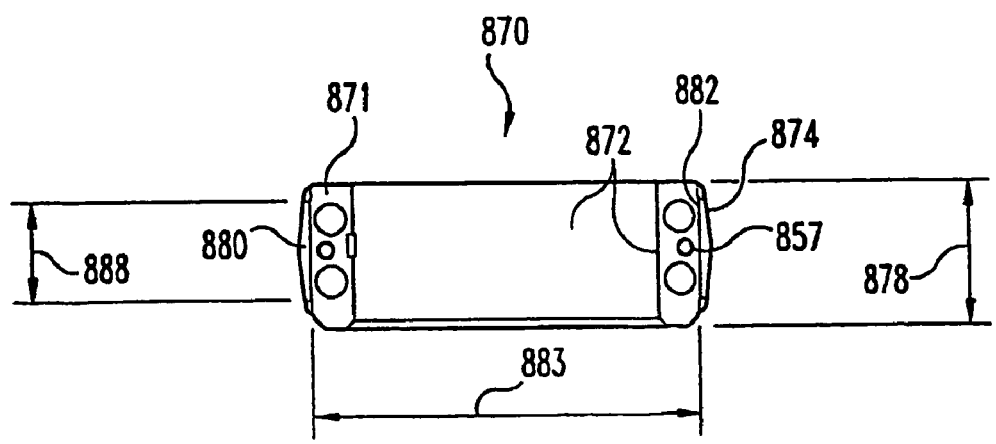
FIG. 51 is an end view of the cap portion of FIG. 50 as taken along line 51-51 of FIG. 50.
Figure 52:
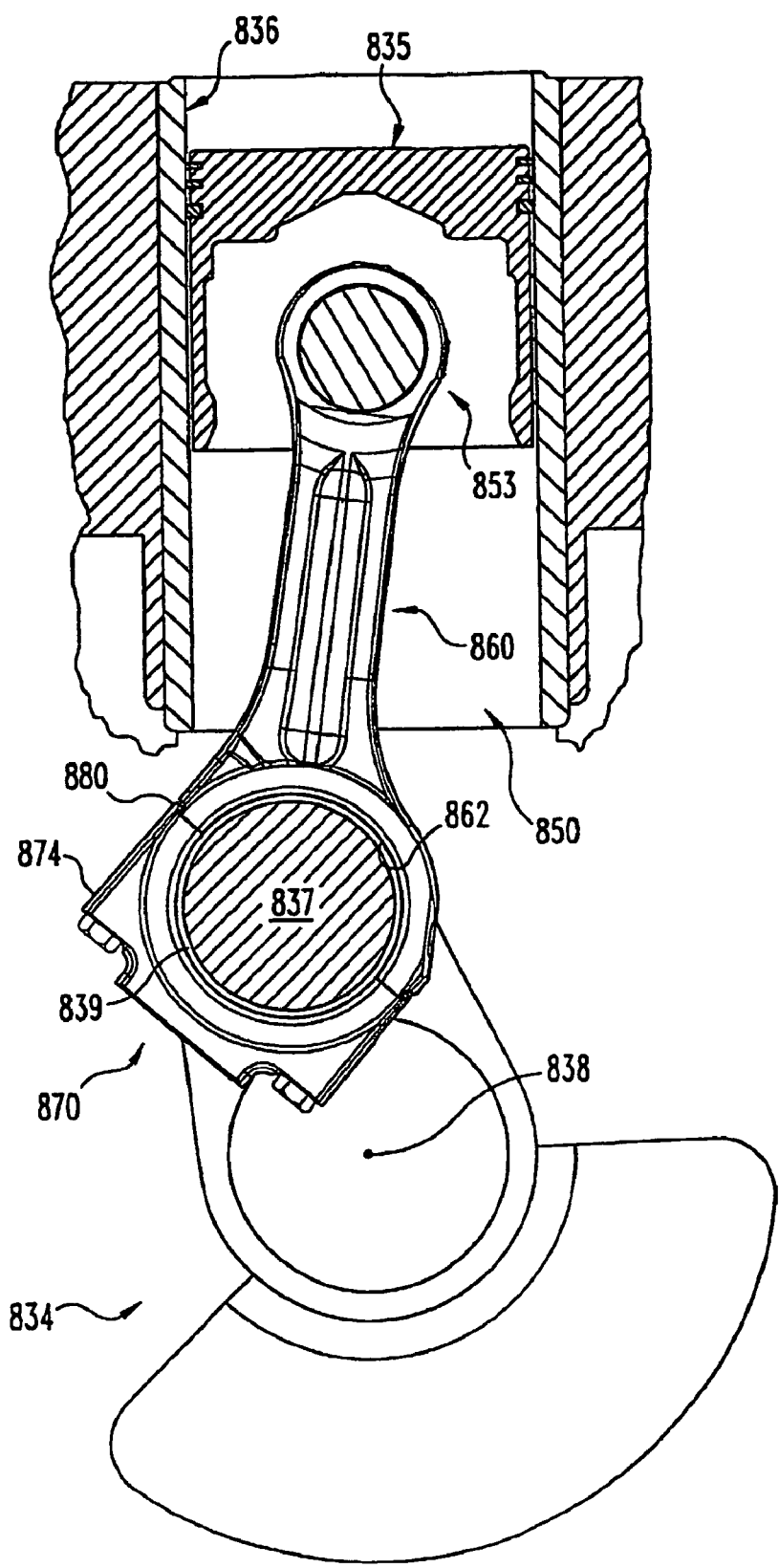
FIG. 52 is a cut-away view of the rod of FIG. 46 as installed in a typical internal combustion engine.

Referring generally to FIGS. 50 and 51, cap 870 includes cap attachment, or abutting, surfaces 871, cap inner, or bearing support, surface 872 and cap outer surface 874. Cap attachment surfaces 871 each have a width 878. Cap 870 includes ear projections 880, which are blended with cap outer surface 874 and have inner surfaces 882, each with a width 888. Other embodiments may have different values of width 888 for each inner surface 882. Cap 870 further includes juncture 879 between cap attachment surface 871 and projection 880.

Reciprocating piston 835 of the internal combustion engine is pivotally attached to piston connection portion 853 at one end of connecting rod assembly 850 (as best seen in FIG. 52). Cap attachment surface 871 is attached to shank attachment surface 861 utilizing fasteners 856. Fasteners 856 are depicted as partially threaded bolts which are inserted through fastener recesses 855 in cap 870 and rotated into fastener recesses 855 in shank 860. When attaching cap 870 to shank 860, pilot pins 825 are inserted into alignment pin recesses 857 in order to align shank 860 and cap 870 in the axial direction (direction along crankshaft axis 838) and the direction parallel to split-line A'. Once they engage, projection 880 and shank outer surface 864 further align shank 860 and cap 870 in the direction parallel to split-line A'.

Figure 32:
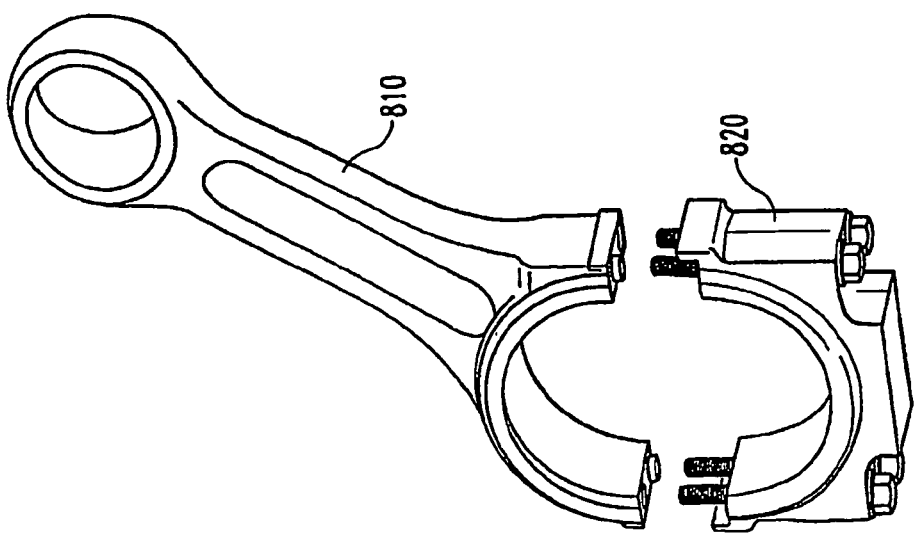
FIG. 32 is an exploded perspective view of the rod of FIG. 31.
Figure 48:
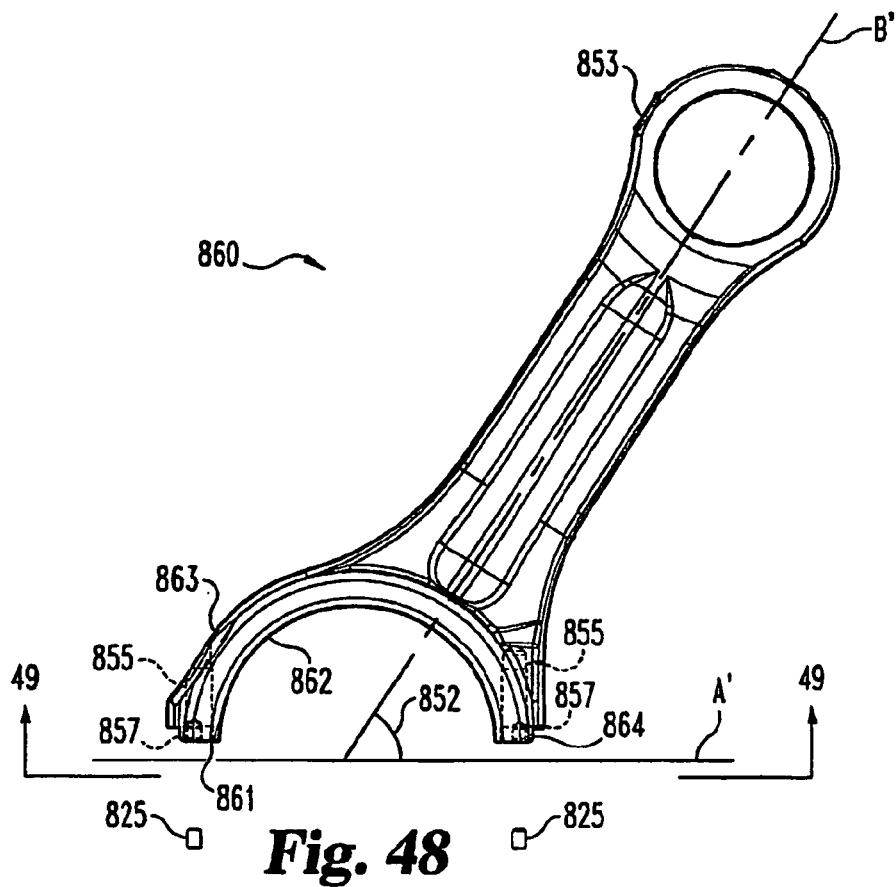
FIG. 48 is a plan view of the shank portion of FIG. 50.
Figure 49:
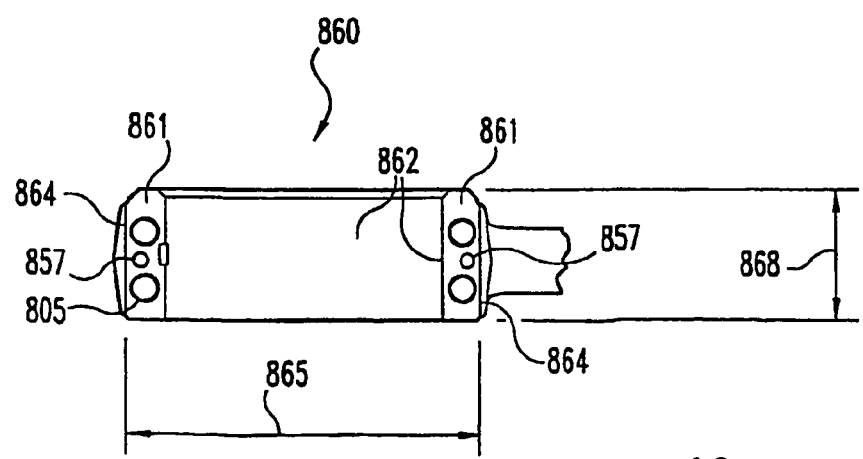
FIG. 49 is an end view of the shank portion of FIG. 48 as taken along line 4949 of FIG. 48.

The alignment pins utilized with connecting rod assembly 850 may be either hollow (as depicted by pilots 824 in FIG. 33) or solid (as depicted by pilot 825 in FIG. 48). Hollow pilots 824 may be utilized with fasteners 806 passing through the center (as depicted in FIGS. 32 and 33). Different embodiments may have different total numbers and locations of pilot pins.

Pilot pins 824 and 825 are utilized to align shank 860 and cap 870 during installation and are not load-bearing once connecting rod 850 is fully installed; however, pilot pins 824 and 825 may be load bearing in other embodiments. Pilot pins 824 and 825 may be placed into either shank 860 or cap 870 utilizing different fit tolerances, for example, an interference fit or sliding fit. An interference fit is where two mating parts include mating surfaces that are dimensioned such that a first mating surface having a larger dimension is placed within a second mating surface having a smaller dimension, such that the first mating surface is contained within, or restrained by the second mating surface when assembled. Typically, two mating parts with an interference fit cannot be mated easily by hand and require the use of tools and/or processes to assist forcing the first mating part into assembly with the second mating part. In contrast, a sliding fit is where two mating parts may be easily mated by hand. Additionally, the same pilot pin may be placed in shank 860 and cap 870 using different fit tolerances between the attachment pin recesses 857 in the shank and the attachment pin recesses 857 in the cap. Certain advantages are realized when utilizing solid pilot pins 825 instead of hollow pilot pins 824, such as requiring smaller alignment pin recesses 857 that do not encroach upon juncture 879 between cap 870 and projection 880 and allowing utilization of larger fasteners 856.

Once shank 860 and cap 870 are attached, crankpin 837 of crankshaft 834 is rotatably held within the aperture formed by shank inner, or bearing support, surface 862 and cap inner, or bearing support, surface 872. Bearing 839 is typically utilized between inner surfaces 862 and 872 and crankpin 837.

In use, forces parallel to split-line A' are exerted causing relative movement between shank attachment, or abutting, surface 861 and cap attachment, or abutting, surface 871. This relative movement is primarily restrained by the friction between cap attachment surface 871 and shank attachment surface 861, which increases as the torque on fasteners 856 is increased, thereby increasing the pressure between shank attachment surface 861 and cap attachment surface 871. However, other embodiments use the friction between cap attachment surface 871 and shank attachment surface 861 as a secondary means of restraining this relative movement.

Projections 880 provide an additional method and structure by which the relative movement between shank 860 and cap 870 is resisted. Cap 870 is mounted to shank 860 in one embodiment of the present invention with an interference fit. This interference occurs because the distance 865 between shank outer, or laterally facing, surfaces 864 is greater than distance 883, which is the distance between inner surfaces 882 of projections 880. Because of the pressure exerted due to the interference fit between projection inner surface 882 and shank outer surface 864, there is no relative looseness between shank 860 and cap 870 after assembly, and movement between shank 860 and cap 870 is further resisted along the split line. Since an interference fit between projection inner surface 882 and shank outer surface 864 is utilized in some embodiments of the present invention, pressure is exerted to place cap attachment surfaces 871 in contact with shank attachment surfaces 861. As non-limiting example dimensions for the interference fit, in one embodiment of the present invention the distance 883 between projection inner surfaces 882 is 162.5+/−0.013 mm, and the distance 865 between shank outer surfaces 864 is 162.525+/−0.025 mm. Various methods may be utilized to force cap 870 onto shank 860, such as utilizing the pressure exerted by fasteners 856, utilizing an external jack or clamp, heating and expanding cap 870, or other methods.

Shank attachment surface 861 and cap attachment surface 871 are parallel to line A'. To prevent additional stresses over those required for the interference fit on projection 880, projection inner surface 882 and shank outer surface 864 are parallel to each other and perpendicular to cap attachment surfaces 861. Additionally, juncture 879 between projection 880 and cap attachment surface 871 is blended to prevent additional stress risers that would occur if the juncture were at a sharp right angle. Shank attachment surface 861, shank outer surface 864, cap attachment surface 871 and projection inner surface 882 are substantially flat, which minimizes non-functional stresses as well as simplifying the manufacturing process. Other embodiments utilize surfaces that are not substantially flat.

Projection width 888 is substantially equal to both cap attachment surface width 878 and shank attachment width 868. Providing a wider projection width 888 increases the contact area between projection inner surface 882 and shank outer surface 864, thereby providing greater resistance to movement between shank attachment surface 861 and cap attachment surface 871. As a non-limiting example in one embodiment of the present invention, the projection width 888 is greater than or equal to approximately 60% of the attachment surface width 878. As a non-limiting example in another embodiment of the present invention, the projection width 888 is 41.27+/−0.3 mm, and attachment surface width 878 is 60.27+/−0.3 mm.

Referring to FIG. 52, installation of connecting rod assembly 850 into an engine initially includes rotatably connecting piston connection portion 853 of shank 860 to reciprocating piston 835. The connected shank 860 and reciprocating piston 835 are then inserted into cylinder 836. Angling the split-line, and thus increasing split angle 852, allows greater clearance when shank 860 is passed through cylinder 836 during installation, thereby facilitating the use of shanks with larger distances 865 between the shank outer surfaces 864 and thus, larger crankpins 837. Increased engine durability may be realized when crankpin 837 (the portion of crankshaft 834 to which connecting rod assembly 850 is attached) is large. Installation clearance surface 863 is further utilized to increase the clearance between shank 860 and cylinder 836 during installation, thereby allowing a larger crankpin 837.

Once reciprocating piston 835 and shank 860 are inserted into cylinder 836, shank inner surface 862, with bearing 839 attached, is placed on crankpin 837. Alignment pins 825 are then inserted into alignment pin recesses 857. Cap 860, with bearing 839 attached, is then placed over crankpin 837 with the alignment pins aligning recesses 857 in cap 870 with recesses 857 in shank 860, thus aligning shank attachment surfaces 861 and cap attachment surfaces 871. Due to the interference fit between projection inner surface 882 and shank outer surface 864, shank attachment surfaces 861 and cap attachment surfaces 871 are typically not in physical contact until shank 860 and cap 870 are forcibly joined.

Fasteners 856 are then inserted through fastener recesses 855 in cap 870 and into fastener recesses 855 in shank 860. Fastener recesses 855 in shank 860 are narrowed such that the threaded portions of fasteners 856 forcibly engage shank 860 as fasteners 856 are rotated. Other means of fastening shank 860 and cap 870 may be utilized, such as by way of non-limiting example, nuts and bolts or other means of fastening that are known, or may be known, in the art. As fasteners 856 are rotated, cap 870 is drawn onto shank 860. Fasteners 856 are rotated until reaching a specified torque. Fasteners 856 are then backed-off slightly by rotating fasteners 856 in a loosening direction. Fasteners 856 are then rotated back in the original tightening direction until the specified torque is once again reached. This process of backing-off fasteners 856 prior to re-torquing helps ensure that the forces exerted by fasteners 856 are carried by shank attachment surfaces 861 and cap attachment surfaces 871, and not carried by the interface between projection inner surface 882 and shank outer surface 864.

Figure 53:
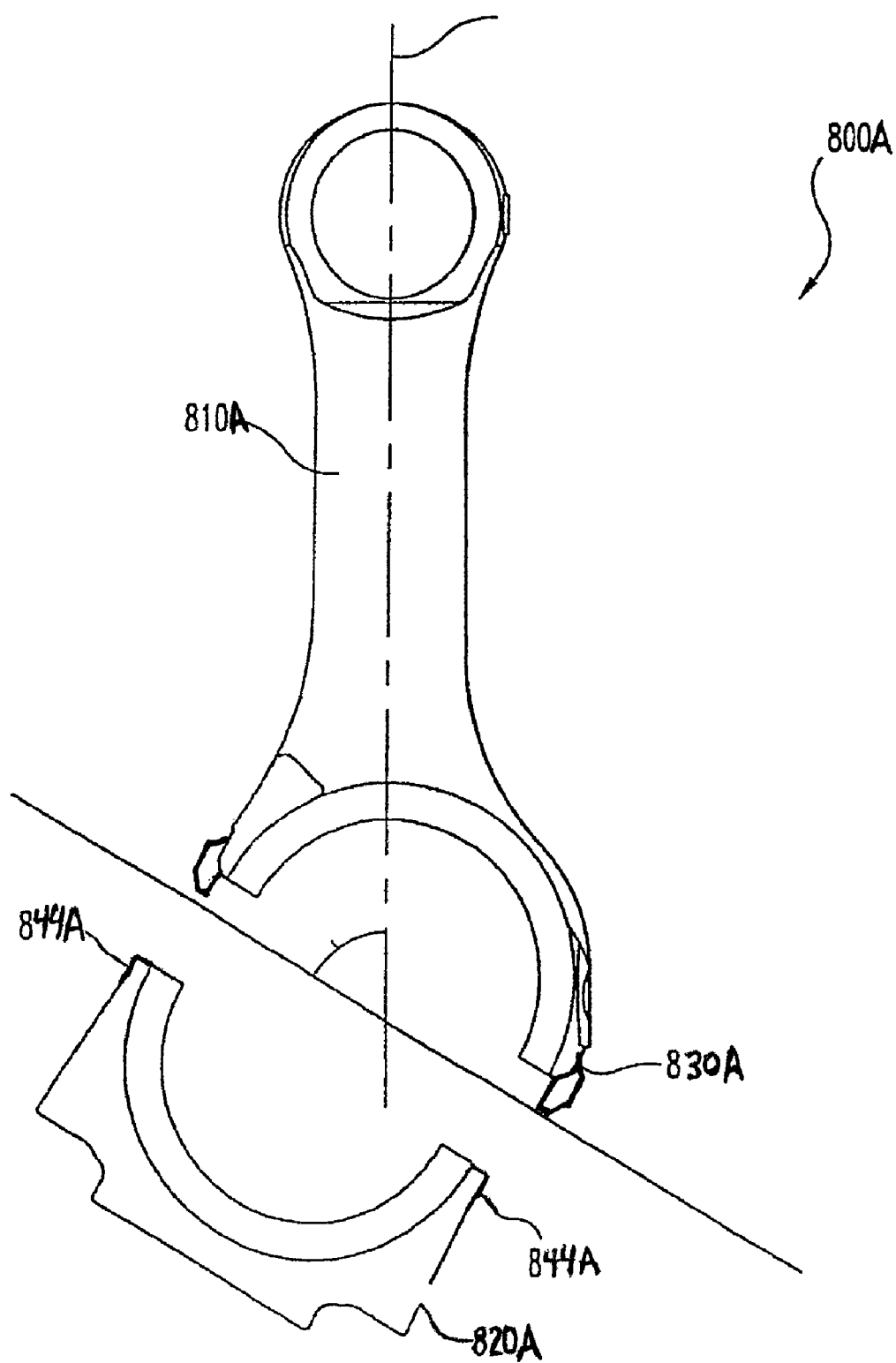
FIG. 53 is an exploded plan view of a two-piece connecting rod apparatus according to one embodiment.

Although what has been shown and described is a cap with projecting ears that are a press fit against mating surfaces of the shank, the present invention also contemplates those embodiments of a connecting rod apparatus (800A in FIG. 53) in which the ears (830A of FIG. 53) project from the shank (810A of FIG. 53) toward the cap (820A of FIG. 53), and these ears of the shank press laterally against flanged surfaces (844A of FIG. 53) of the cap. Additionally, although what has been shown and described are a cap or a shank with two projections mounted thereon, the present invention also contemplates those embodiments in which a cap or a shank has one projection mounted thereon. Furthermore, although an angled-split connecting rod has been shown and described, the present invention also contemplates embodiments utilizing a straight-split connecting rod.

FIGS. 36-39 depict an exhaust outlet collector according to one embodiment of the present invention. Referring briefly to FIGS. 1-4, engines 120 preferably include a plurality of turbochargers 300. Turbochargers 300-L1, 300-L2, and 300 L3, provide compressed air to the nine cylinders of the left bank, each turbocharger providing air to three such cylinders.

Engine 120 preferably includes turbochargers 300-R1, 300-R2, and 300-R3, which likewise provide compressed air to the nine cylinders of the right side of engine 120, each right side turbocharger providing air to three right side cylinders. Each turbocharger is driven with engine exhaust provided from a pair of engine exhaust manifolds 313 located on either side of the centerline of the engine Vee. After the turbine 312 of each turbocharger has extracted energy to drive the corresponding turbine 312, the cooler, lower pressure turbocharger exhaust gas is provided to either of two exhaust outlet collectors 320. Exhaust collector 320-1 receives exhaust from turbochargers 300-L1, 300-L2, and 300-R1. Exhaust collector 320-2 receives exhaust from turbochargers 300-L3, 300-R2, and 300-R3.

Figure 36:
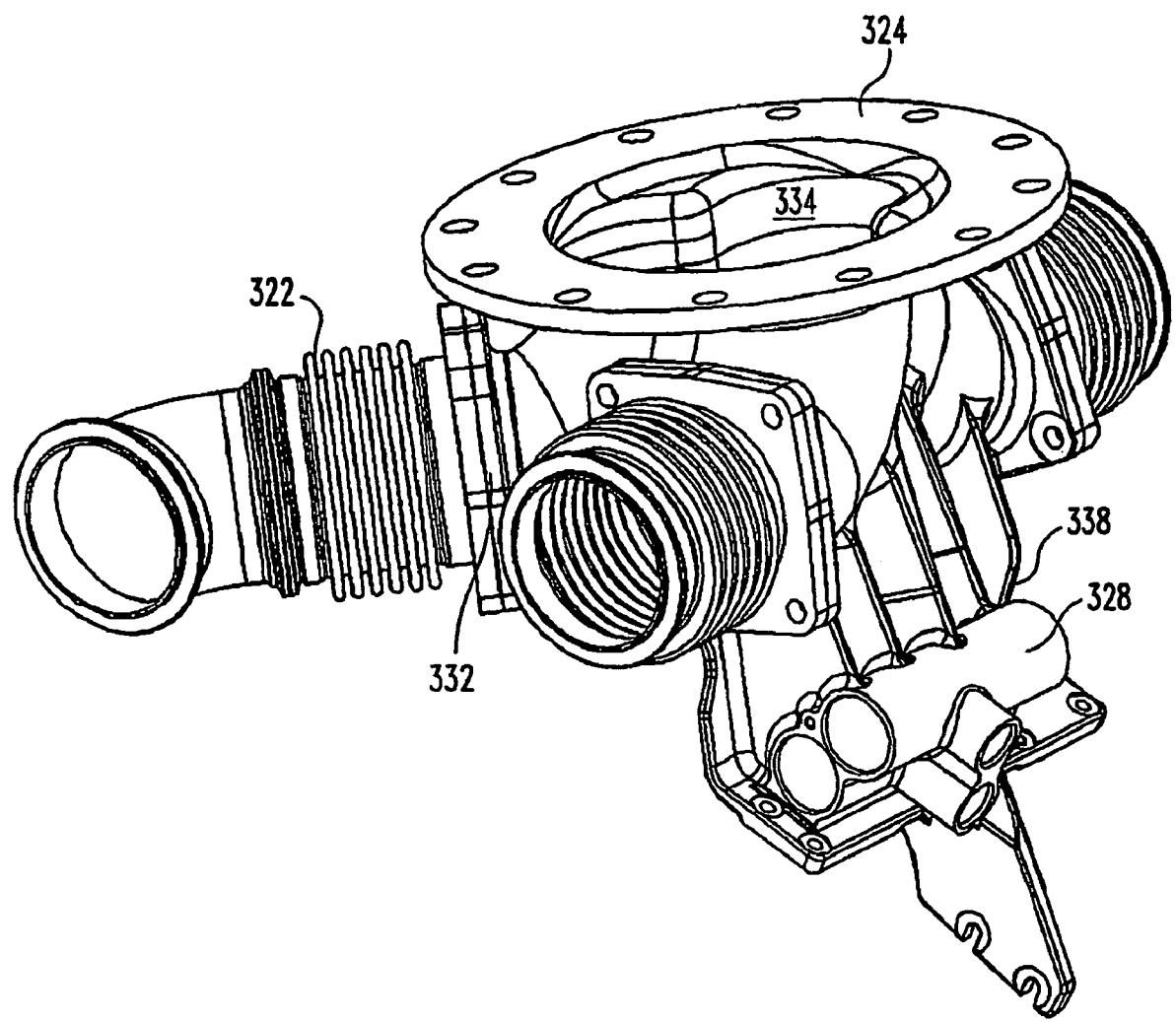
FIG. 36 is a perspective view of an exhaust outlet collector according to one embodiment of the present invention.
Figure 37:
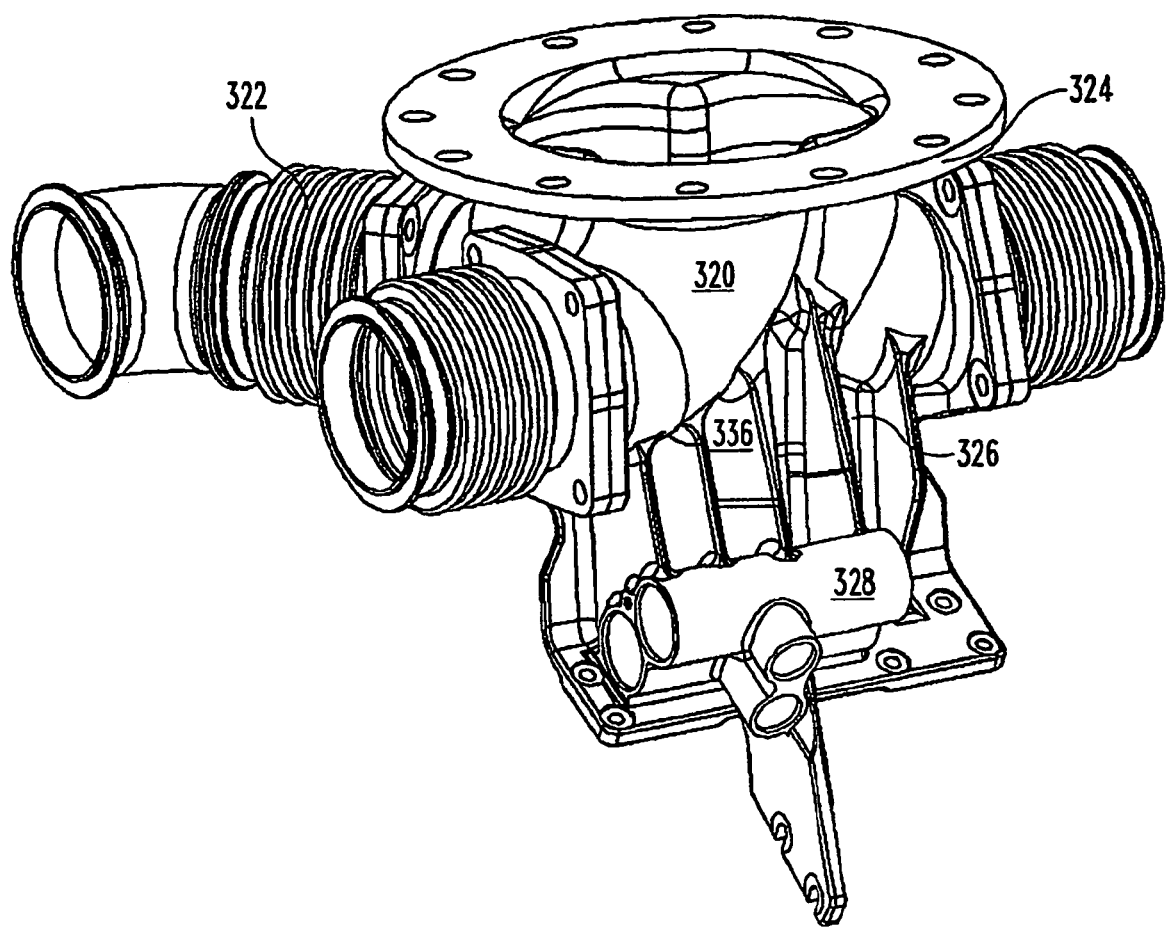
FIG. 37 is a perspective view of the apparatus of FIG. 36.
Figure 38:
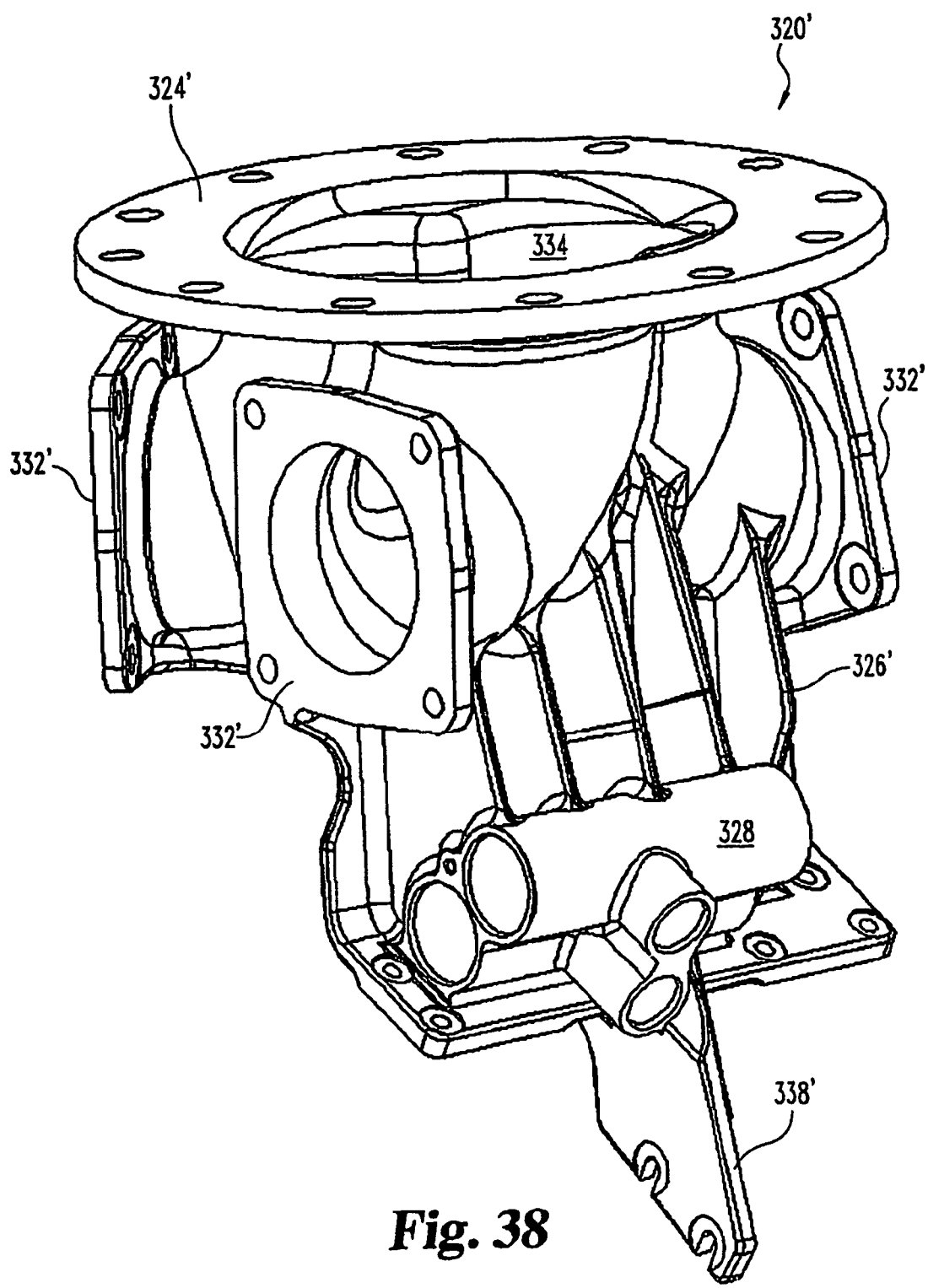
FIG. 38 is a perspective view of an exhaust outlet collector according to another embodiment of the present invention.
Figure 39:
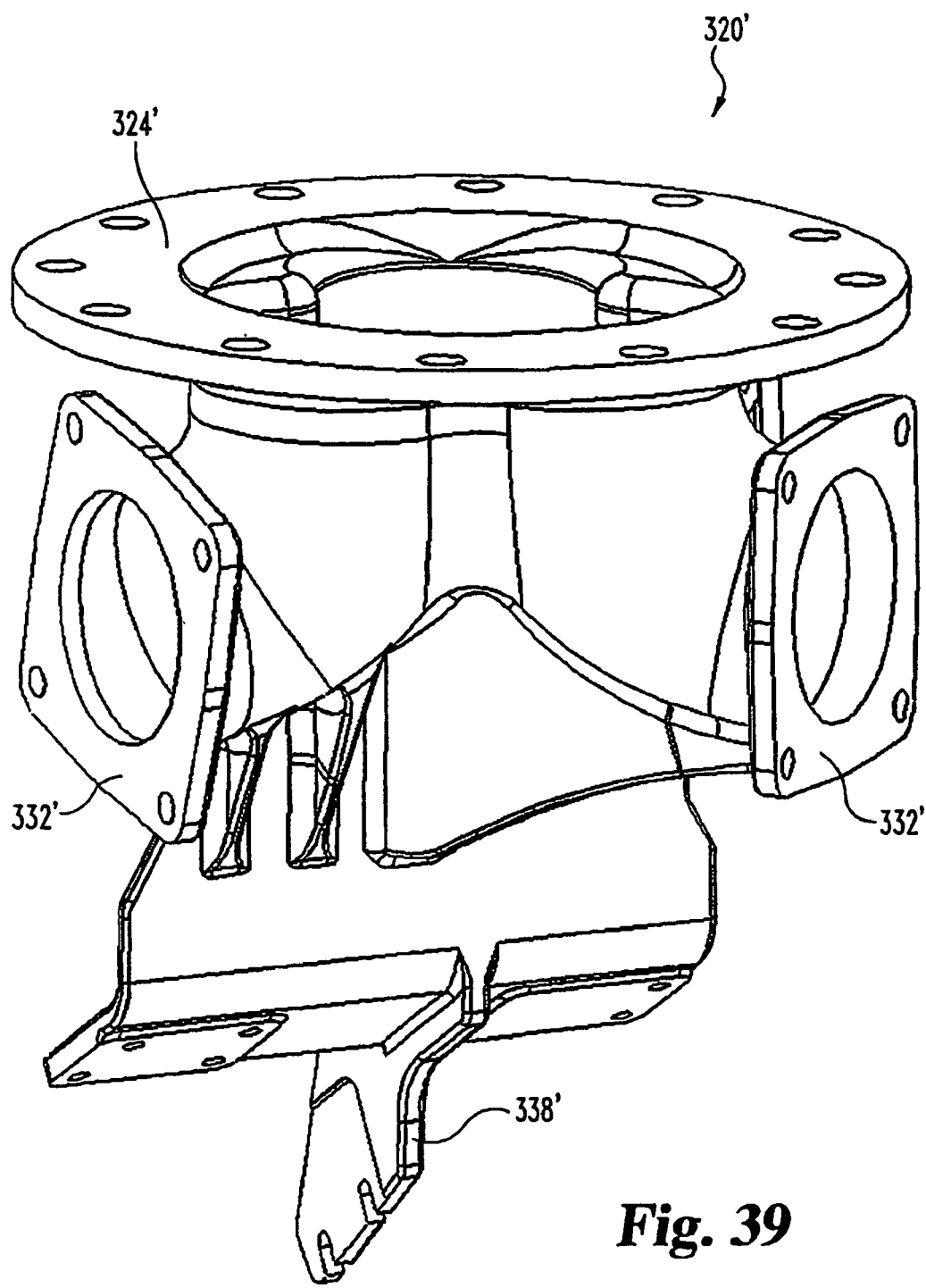
FIG. 39 is a perspective view of the apparatus of FIG. 38.
Figure 40:
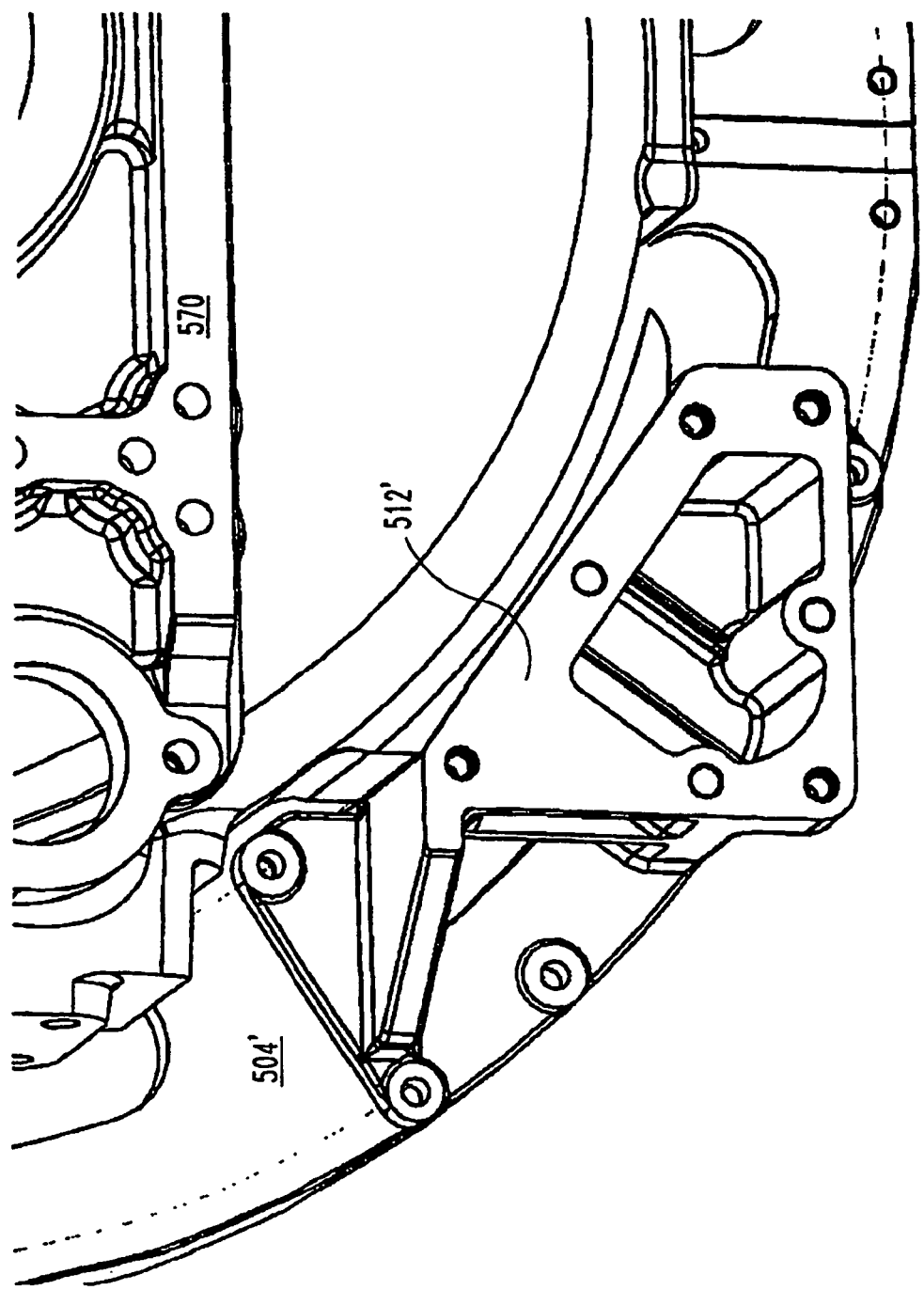
FIG. 40 is a perspective view of an apparatus according to one embodiment of the present invention.
Figure 41:
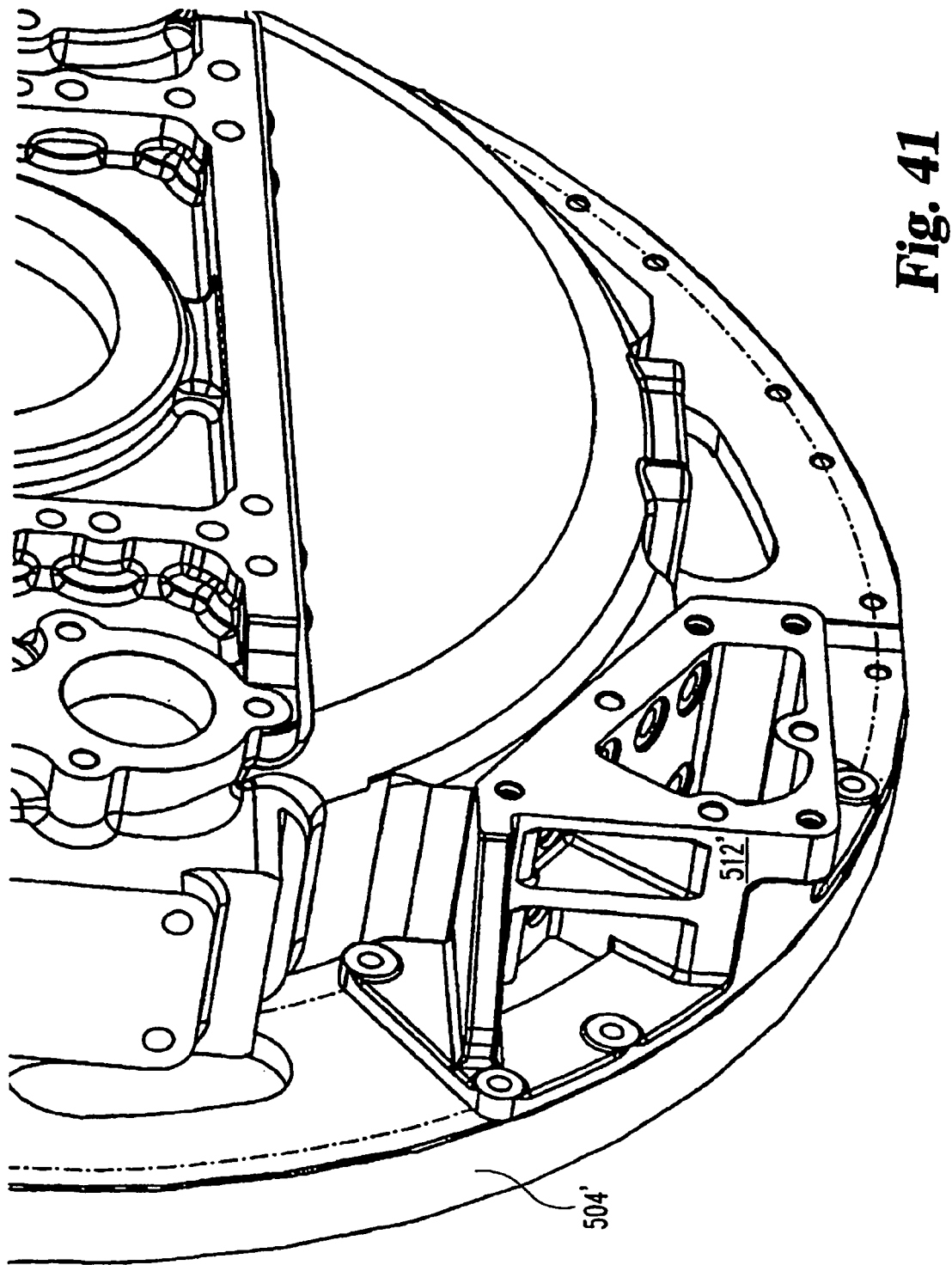
FIG. 41 is a perspective view of the apparatus of FIG. 40.
Figure 42:
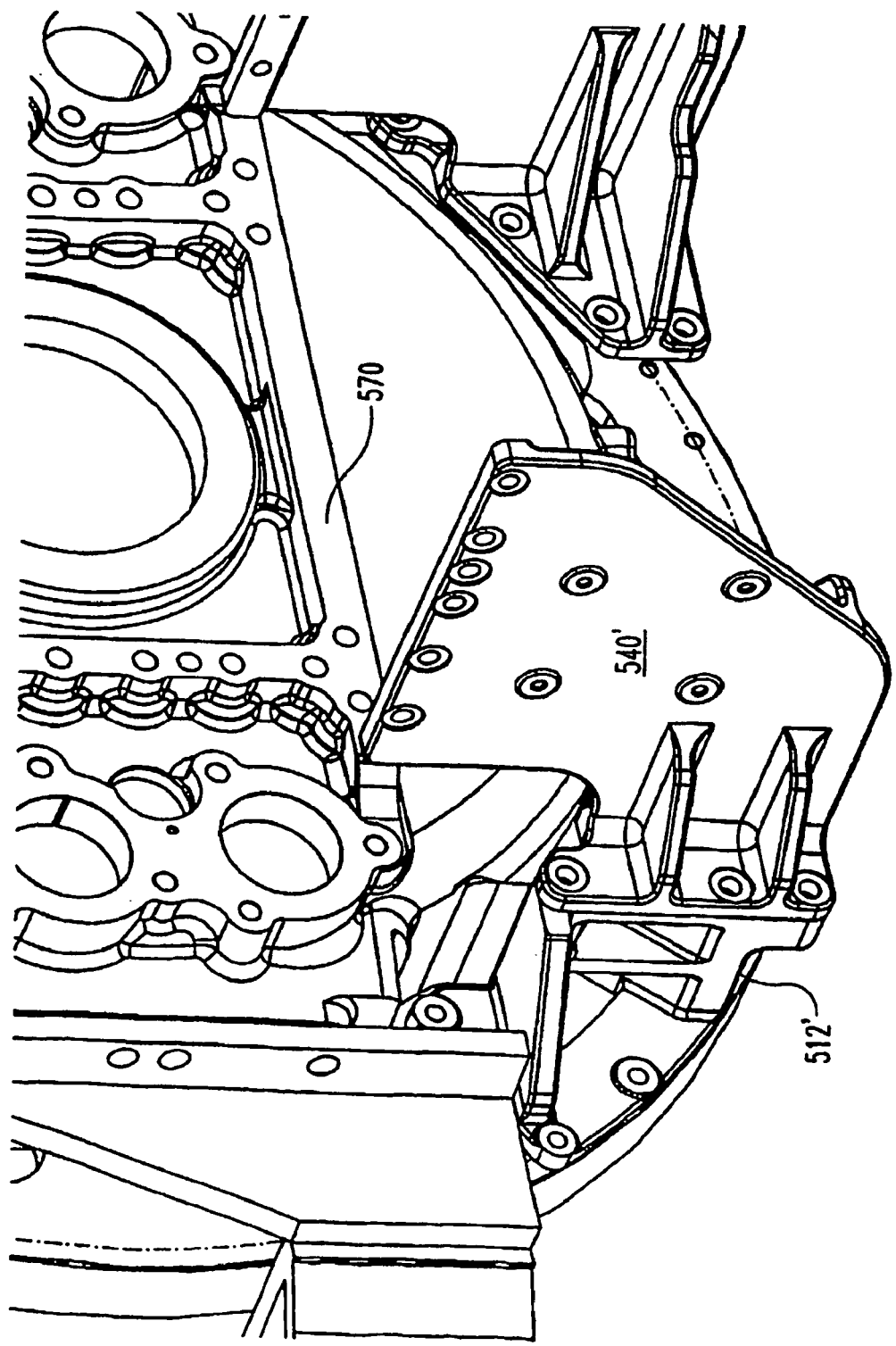
FIG. 42 is a perspective view of the apparatus of FIG. 40.
Figure 43:
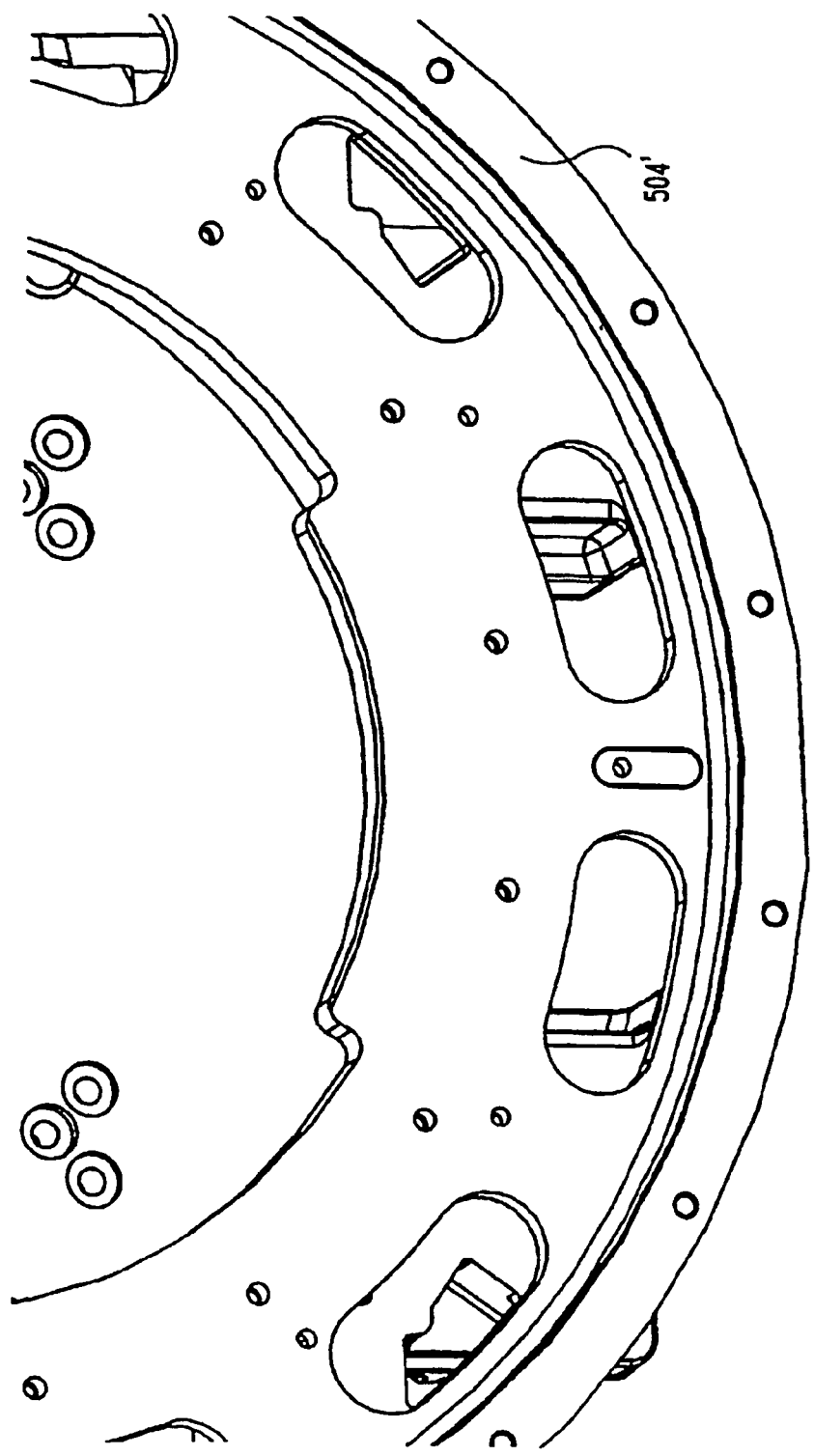
FIG. 43 is a perspective view of the apparatus of FIG. 40.
Figure 44:
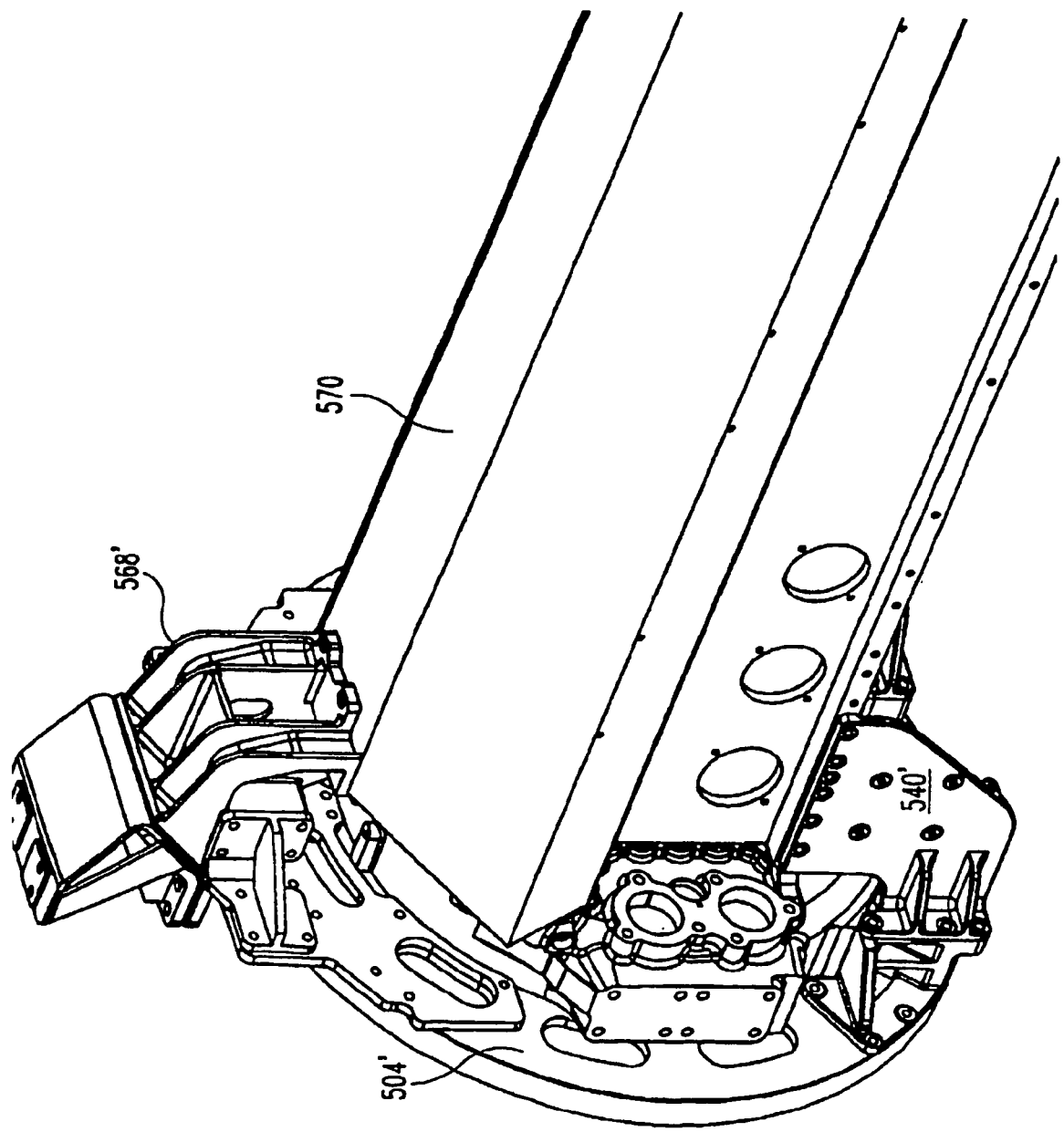
FIG. 44 is a perspective view of the apparatus of FIG. 40.
Figure 45:
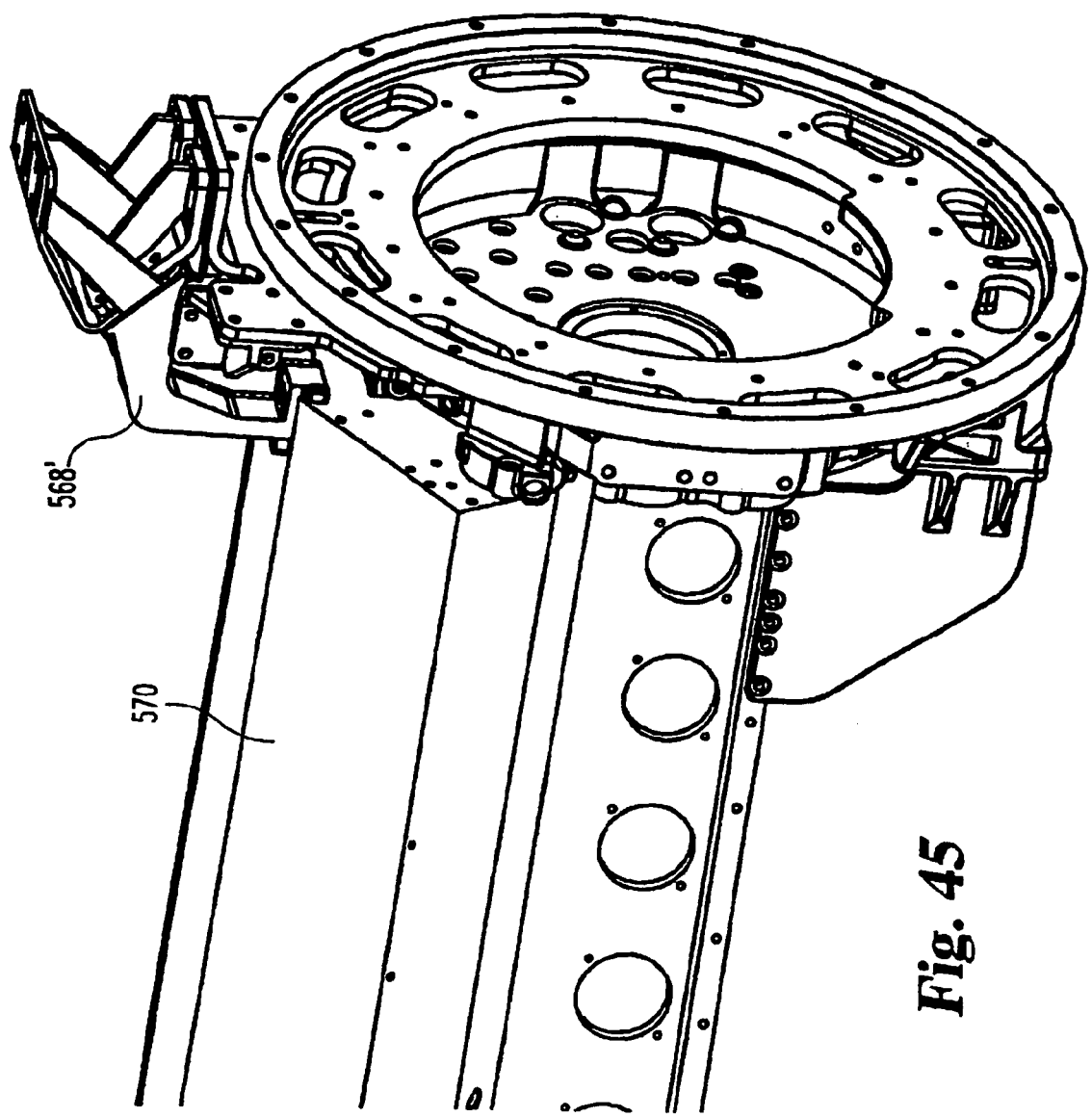
FIG. 45 is a perspective view of the apparatus of FIG. 40.

Referring now to FIGS. 36 and 37, a typical exhaust collector 320 is depicted. Each collector 320 includes three exhaust inlet ports 332, each of which is preferably connected by a bellows 322 to a corresponding turbocharger exhaust duct (not shown). Exhaust entering each of the three inlet ports 332 flows into a central plenum 334. In one embodiment of the present invention, an operator of generator assembly 100 or 120 connects an exhaust evacuator to flange 324 of collector 322 to remove a combined exhaust from the generator area.

In one embodiment of the present invention, exhaust collector 320 is cast as a single unit. It includes an integrally cast mounting bracket 326 which couples to the various exhaust passages by one or more stiffening ribs 336. Also integrally cast into the attachment flange are one or more integral cooling passageways 328. In one embodiment, each passageway is of a T-shape, with one inlet and two outlets. When installed on engine 120, the inlet of each passageway 328 is connected by a tube into a portion of the engine cooling system. Other tubes of the engine cooling system are connected to the outlets of the passageway are similarly connected by tubing to other portions of the engine cooling system. Tubes of the cooling system are preferably connected to the passageways 328 with o-rings for seals.

While the invention has been illustrated and described in detail in the foregoing description, the same is to be considered as illustrative and not restrictive in character, it being understood that only the preferred embodiments have been described and that all changes and modifications that come within the spirit of the invention are desired to be protected.

What is claimed is:

1. An apparatus for an internal combustion engine with a crankshaft, a cylinder and a reciprocating piston located within the cylinder, comprising:
    a shank with two ends, a first pair of abutting surfaces, a first bearing support surface and a pair of laterally facing surfaces, each one of said laterally facing surfaces being substantially perpendicular from a different one of said first pair of abutting surfaces and being disposed at outermost sides of the shank, one end of said shank being attachable to the reciprocating piston and the other end of said shank being mountable to a crankpin of the crankshaft along said first bearing support surface; and
    a cap with a second pair of abutting surfaces, a second bearing support surface and a pair of projections, each one of said projections extending substantially normally from a different one of said second pair of abutting surfaces, said projections being adapted and configured to slidingly receive therebetween in an interference fit said laterally facing surfaces, said cap being mountable to the crankpin along said second bearing support surface with said abutting surfaces disposed on opposite sides of the crankpin;
    wherein said interference fit enabling said projections of said cap to compress said laterally facing surfaces of said shank from the outermost sides of the shank, when said cap and said shank are mounted to the crankpin and each one of said first abutting surfaces are in contact with a different one of said second abutting surfaces.

2. The apparatus of claim 1, wherein said cap abutting surfaces and said shank abutting surfaces are substantially flat.

3. The apparatus of claim 1, wherein said shank defines a split-line and said shank further defines a centerline, wherein said split-line and said centerline are separated by approximately 90 degree.

4. The apparatus of claim 1, wherein said shank defines a split line and said shank further defines a centerline, wherein said split-line and said centerline are separated by less than 90 degree.

5. The apparatus of claim 1, wherein said shank defines a split-line and said shank further defines a centerline, wherein said split-line and said centerline are separated by approximately 60 degree.

6. The apparatus of claim 1, wherein said shank defines a split-line and wherein said cap abutting surfaces and said shank abutting surfaces are substantially parallel to said split-line.

7. The apparatus of claim 1, wherein said shank defines a split-line and said projections resist movement between said cap and said shank parallel to said split-line.

8. The apparatus of claim 1, wherein each of said projections includes at least one substantially flat surface, and wherein no more than one substantially flat surface of each of said projections is acted upon said laterally facing surfaces of said shank from the outermost sides of the shank.

9. The apparatus of claim 1, further comprising:
    at least one pilot pin; and
    at least two pilot pin recesses, wherein said first pair of abutting surfaces and said second pair of abutting surfaces each include at least one pilot pin recess, and wherein said shank and said cap are aligned by coaction of said at least one pilot pin and said at least two pilot pin recesses as said first abutting surfaces are brought into contact with said second abutting surfaces.

10. An apparatus for an internal combustion engine with a crankshaft, a cylinder and a reciprocating piston located within the cylinder, comprising:
    a shank with two ends, a first pair of abutting surfaces, a first bearing support surface, and a pair of projections, each one of said projections extending substantially normally from a different one of said first pair of abutting surfaces, one end of said shank being attachable to the reciprocating piston and the other end of said shank being mountable to a crankpin of the crankshaft along said first bearing support surface;
    a cap with a second pair of abutting surfaces, a second bearing support surface, and a pair of laterally facing surfaces, each one of said laterally facing surfaces being substantially perpendicular from a different one of said second pair of abutting surfaces and being disposed at outermost sides of the cap, said cap being mountable to the crankpin along said second bearing support surface;
    wherein said projections being adapted and configured to slidingly receive therebetween in an interference fit said laterally facing surfaces, and wherein said interference fit enabling said projections of said shank to compress said laterally facing surfaces of said cap from the outermost sides of the cap, when said shank and said cap are mounted to the crankpin and each one of said first abutting surfaces are in contact with a different one of said second abutting surfaces.

11. The apparatus of claim 10, wherein said cap abutting surfaces and said shank abutting surfaces are substantially flat.

12. The apparatus of claim 10, wherein said shank defines a split-line and said shank further defines a centerline, wherein said split-line and said centerline are separated by approximately 90 degree.

13. The apparatus of claim 10, wherein said shank defines a split-line and said shank further defines a centerline, wherein said split-line and said centerline are separated by less than 90 degree.

14. The apparatus of claim 10, wherein said shank defines a split-line and said shank further defines a centerline, wherein said split-line and said centerline are separated by approximately 60 degree.

15. The apparatus of claim 10, wherein said shank defines a split-line and wherein said cap abutting surfaces and said shank abutting surfaces are substantially parallel to said split-line.

16. The apparatus of claim 10, wherein said shank defines a split-line and said projections resist movement between said cap and said shank parallel to said split-line.

17. An apparatus for an internal combustion engine with a crankshaft and a cylinder with a reciprocating piston located therein, comprising:
a shank with an attachment portion, wherein said attachment portion has a width in the axial direction of a crankshaft in use with the apparatus, and wherein said shank is attachable to the reciprocating piston and said shank is mountable to the crankshaft:
a cap with an attachment portion, wherein said attachment portion has a width in the axial direction of a crankshaft in use with the apparatus and wherein said cap is mountable to the crankshaft and said attachment portion of the cap is attached to said attachment portion of the shank to provide an angled-split plane between the attachment portion of the cap and the attachment portion of the shank, wherein said shank and said cap form a sleeve around a segment of the crankshaft and the crankshaft is rotatably held therein;
a projection on the outermost side of the attachment portion of the cap and extending toward the shank, the projection having a width in the axial direction of a crankshaft in use with the apparatus wherein said projection width is substantially equal to one or more of said width of said attachment portion of the cap and said width of said attachment portion of the shank, and further wherein the projection provides an interference fit between the cap and the shank to resist shear forces acting along the angled-split plane between the attachment portion of the cap and the attachment portion of the shank, said interference fit enabling said projection to compress the shank from an outermost side of the shank.

18. The apparatus of claim 17, wherein said cap includes an outer surface, said projection is an integral portion of said cap outer surface.

19. The apparatus of claim 17, wherein said outermost side of the shank being substantially flat.

20. A method for attaching a connecting rod to a crankshaft of an internal combustion engine, comprising:
providing a two-piece connecting rod including a shank and a cap, one of the shank or the cap having a pair of spaced-apart opposing substantially flat projections disposed at outermost surfaces of one of the shank or cap and configured to receive therebetween the other of the shank or the cap, the shank and cap forming a bearing pocket when brought together for rotatable connection to a crankpin of the crankshaft with said projections on opposite sides of said bearing pocket;
placing one of the shank or the cap proximate to one side of the crankpin;
placing the other of the shank or the cap proximate to the other side of the crankpin;
bringing together the cap and the shank around the crankpin and forming the bearing pocket around the crankpin; and
compressing with the projections one of the shank or the cap around the crankpin the other of the shank or the cap, said compressing produces an interference fit between said cap and said shank, said interference fit enabling said projections to compress one of said shank and said cap from an outermost side of the connecting rod.

21. The method of claim 20, wherein said providing includes a plurality of fasteners, and said bringing together is by fastening together the shank and the cap with the fasteners.

22. The method of claim 20, wherein the cap includes the projections, and the shank is compressed by the cap.

23. The method of claim 20, wherein the shank includes the projections, and the cap is compressed by the shank.

24. The method of claim 20, wherein the shank defines a split-line and the projections resist relative motion along a split-line between the shank and the cap.

25. The method of claim 20, wherein said compressing is performed by each projection of one of the shank or the cap exerting a force on no more than one substantially flat surface of the other of the shank or the cap.

26. The method of claim 20, further comprising aligning the cap with the shank, wherein said aligning includes the coaction between at least one pilot pin, at least one pilot pin recess on the shank, and at least one pilot pin recess on the cap.

* * * * *